(12) United States Patent
Kitamura

(10) Patent No.: US 7,680,187 B2
(45) Date of Patent: *Mar. 16, 2010

(54) CODING SYSTEM AND METHOD, ENCODING DEVICE AND METHOD, DECODING DEVICE AND METHOD, RECORDING DEVICE AND METHOD, AND REPRODUCING DEVICE AND METHOD

(75) Inventor: Takuya Kitamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 118 days.

This patent is subject to a terminal disclaimer.

(21) Appl. No.: 11/811,797

(22) Filed: Jun. 12, 2007

(65) Prior Publication Data

US 2007/0253488 A1 Nov. 1, 2007

Related U.S. Application Data

(63) Continuation of application No. 09/647,960, filed as application No. PCT/JP00/00720 on Feb. 9, 2000, now Pat. No. 7,236,526.

(30) Foreign Application Priority Data

Feb. 9, 1999 (JP) ................................. 11-031944

(51) Int. Cl.
H04N 7/12 (2006.01)
H04N 11/02 (2006.01)
H04N 11/04 (2006.01)
H04B 1/66 (2006.01)

(52) U.S. Cl. ................................. 375/240.16
(58) Field of Classification Search ........................ None
See application file for complete search history.

(56) References Cited

U.S. PATENT DOCUMENTS 4,292,651 A 9/1981 Kretz et al.

(Continued)

FOREIGN PATENT DOCUMENTS

EP 0 349 847 1/1990

(Continued)

OTHER PUBLICATIONS

Transcoder Architectures For Video coding, Bjork and Christoopoulos, Ericsson Telecom AB, Compression Lab, HF/ETX/PN/XML, 9-12625 Stockholm, Sweden, IEEE Transcoder on Consumer Electronics, vol. 44, No. 1, pp. 88-98, Feb. 1998.

(Continued)

Primary Examiner—Nhon T Diep
(74) Attorney, Agent, or Firm—Frommer Lawrence & Haug LLP; William S. Frommer; Thomas F. Presson

(57) ABSTRACT

A transcoder for executing a re-coding process on an encoded stream generated based on an MPEG standard to generate a re-coded stream having a different GOP (Group of Pictures) structure or bit rate. A decoding device of a transcoder decodes a source encoded stream to generate decoded video data and extracts past coding parameters superposed in the encoded stream as history_stream( ). An encoding device receives the decoded video data and the past coding parameters and uses the past coding parameters to carry out an encoding process in a manner such that this process will not degrade image quality, thereby generating a re-coded stream. The encoding device superposes, as re_coding_stream—info( ), information indicating the selected past coding parameters.

13 Claims, 70 Drawing Sheets

U.S. PATENT DOCUMENTS

| | | | |
|---|---|---|---|
| 4,825,285 A | 4/1989 | Speidel et al. | |
| 4,893,317 A | 1/1990 | Critchlow et al. | |
| 5,148,272 A | 9/1992 | Alampora | |
| 5,212,549 A | 5/1993 | Ng et al. | |
| 5,227,878 A | 7/1993 | Puri et al. | |
| 5,260,783 A | 11/1993 | Dixit | |
| 5,289,190 A | 2/1994 | Shimoda et al. | |
| 5,291,484 A | 3/1994 | Tomita et al. | |
| 5,327,520 A | 7/1994 | Chen | |
| 5,452,006 A | 9/1995 | Auld | |
| 5,473,380 A | 12/1995 | Tahara | |
| 5,479,212 A | 12/1995 | Kurobe et al. | |
| 5,500,678 A | 3/1996 | Puri | |
| 5,532,746 A | 7/1996 | Chang | |
| 5,534,937 A | 7/1996 | Zhu et al. | |
| 5,537,440 A | 7/1996 | Eyuboglu et al. | |
| 5,541,852 A | 7/1996 | Eyuboglu et al. | |
| 5,543,847 A | 8/1996 | Kato | |
| 5,544,266 A | 8/1996 | Koppelmans et al. | |
| 5,563,593 A | 10/1996 | Puri | |
| 5,657,086 A | 8/1997 | Tahara et al. | |
| 5,715,009 A | 2/1998 | Tahara et al. | |
| 5,729,293 A | 3/1998 | Keesman | |
| 5,754,235 A | 5/1998 | Urano | |
| 5,754,698 A | 5/1998 | Suzuki et al. | |
| 5,757,421 A | 5/1998 | Kato et al. | |
| 5,774,206 A | 6/1998 | Wasserman et al. | |
| 5,805,224 A | 9/1998 | Keesman et al. | |
| 5,812,194 A * | 9/1998 | Wilkinson | 375/240.15 |
| 5,831,688 A | 11/1998 | Yamada et al. | |
| 5,870,146 A | 2/1999 | Zhu | |
| 5,889,561 A | 3/1999 | Kwok et al. | |
| 5,907,374 A * | 5/1999 | Liu | 375/240.26 |
| 5,940,130 A | 8/1999 | Nilsson et al. | |
| 6,081,295 A | 6/2000 | Adolph et al. | |
| 6,088,393 A | 7/2000 | Knee et al. | |
| 6,100,940 A | 8/2000 | Dieterich | |
| 6,125,140 A | 9/2000 | Wilkinson | |
| 6,160,844 A | 12/2000 | Wilkinson | |
| 6,163,573 A | 12/2000 | Mihara | |
| 6,167,084 A | 12/2000 | Wang et al. | |
| 6,201,844 B1 | 3/2001 | Bailleul | |
| 6,285,716 B1 | 9/2001 | Knee et al. | |
| 6,369,722 B1 | 4/2002 | Murgia et al. | |
| 6,418,167 B1 | 7/2002 | Kato et al. | |
| 6,442,207 B1 | 8/2002 | Nishikawa et al. | |
| 6,493,384 B1 | 12/2002 | Mihara | |
| 6,556,627 B2 | 4/2003 | Kitamura et al. | |
| 6,560,282 B2 | 5/2003 | Tahara et al. | |
| 6,567,128 B1 | 5/2003 | Webb et al. | |
| 6,574,274 B2 | 6/2003 | Obata et al. | |
| 6,661,843 B2 | 12/2003 | Kato et al. | |
| 6,704,363 B1 | 3/2004 | Kim | |
| 6,839,384 B2 | 1/2005 | Yamada | |
| 6,856,650 B1 | 2/2005 | Takishima et al. | |
| 6,987,535 B1 | 1/2006 | Matsugu et al. | |
| 7,236,526 B1 | 6/2007 | Kitamura | |
| 7,257,264 B2 | 8/2007 | Nakayama et al. | |
| 2003/0016755 A1 | 1/2003 | Tahara et al. | |
| 2003/0128766 A1 | 7/2003 | Tahara et al. | |
| 2004/0101041 A1 | 5/2004 | Alexandre et al. | |

FOREIGN PATENT DOCUMENTS

| | | |
|---|---|---|
| EP | 0 618 734 | 10/1994 |
| EP | 0 710 030 | 5/1996 |
| EP | 0 889 650 | 1/1999 |
| EP | 0 942 605 | 9/1999 |
| FR | 2 809 573 | 11/2001 |
| GB | 2318246 | 4/1998 |
| GB | 2 333 656 | 7/1999 |
| JP | 6 70178 | 3/1994 |
| JP | 7 107461 | 4/1995 |
| JP | 7-288804 | 10/1995 |
| JP | 8-98181 | 4/1996 |
| JP | 8-111870 | 4/1996 |
| JP | 8-130743 | 5/1996 |
| JP | 10 32829 | 2/1998 |
| JP | 10 32830 | 2/1998 |
| JP | 10 503895 | 4/1998 |
| JP | 10-136386 | 5/1998 |
| JP | 11-74798 | 3/1999 |
| JP | 2000-59784 | 2/2000 |
| JP | 2000-341686 | 12/2000 |
| JP | 2001-169292 | 6/2001 |
| JP | 3694888 | 7/2005 |
| JP | 2005 304065 | 10/2005 |
| WO | WO 95 35628 | 12/1995 |
| WO | WO 96 01023 | 1/1996 |
| WO | WO 96 24222 | 8/1996 |
| WO | WO 96 25823 | 8/1996 |
| WO | WO 98 03017 | 1/1998 |
| WO | WO 98 51077 | 11/1998 |
| WO | WO 99 38314 | 7/1999 |

OTHER PUBLICATIONS

AT&T Technical Journal, vol. 72, No. 1, Feb. 1993, New York, pp. 67-89, Aravind et al., "Image and Video Coding Standards".

D. G. Morrison et al., "Reduction of the bit-rate of compressed video while in its coded form," $6^{th}$ International Workshop on Packet Video, 1994, D17.1-D17.4.

Gertjan Keesman et al., "Transcoding of MPED bitstreams," Signal Processing: Image Communication, Elsevier Science B.V., Sep. 1996, vol. 8, No. 6, pp. 481-500.

P. N. Tudor et al., "Real-Time Transcoding of MPEG-2 Video Bit Streams," BBC R&D—IBC '97, Amsterdam.

Niklas Bjork et al., "Transcoder Architectures for Video Coding," IEEE Transactions on Consumer Electronics, vol. 44, No. 1, Feb. 1998.

Keiichi Hibi, "A Study on Coding Control Scheme for Video Transcoding," PCSJ93, Oct. 4, 1993, pp. 27-28.

Oliver Morgan (SMPTE): "SMPTE 328M Video Elementary Stream Editing Information" Joint Video Team (JVT) of ISO/IEC MPEG & ITU-T VCEG(ISO/IEC JTC1/SC29/WG11 and ITU-T SG16 06), XX, XX, No. M5924, Mar. 14, 2000, XP030035101.

* cited by examiner

FIG. 4 PRINCIPLE OF MOTION SIGNAL ENCODING METHOD

FIELD DCT MODE

——————— FIRST-FIELD DATA

------------ SECOND-FIELD DATA

| 0 | 1 | 2 | ............ | 13 | 14 | 15 |
|---|---|---|---|---|---|---|
| 16 | 17 | 18 | ............ | 29 | 30 | 31 |
| 32 | 33 | 34 | ............ | 45 | 46 | 47 |
| ⋮ | ⋮ | ⋮ | | ⋮ | ⋮ | ⋮ |
| 208 | 209 | 210 | ............ | 221 | 222 | 223 |
| 224 | 225 | 226 | ............ | 237 | 238 | 239 |
| 240 | 241 | 242 | ............ | 251 | 254 | 255 |

MACROBLOCK

FIG. 17

| | | | | | | | |
|---|---|---|---|---|---|---|---|
| D9 | Cb[0][9] | Y[0][9] | Cr[0][9] | Y[1][9] | Cb[1][9] | Y[2][9] | Cr[1][9] | Y[3][9] |
| D8 | Cb[0][8] | Y[0][8] | Cr[0][8] | Y[1][8] | Cb[1][8] | Y[2][8] | Cr[1][8] | Y[3][8] |
| D7 | Cb[0][7] | Y[0][7] | Cr[0][7] | Y[1][7] | Cb[1][7] | Y[2][7] | Cr[1][7] | Y[3][7] |
| D6 | Cb[0][6] | Y[0][6] | Cr[0][6] | Y[1][6] | Cb[1][6] | Y[2][6] | Cr[1][6] | Y[3][6] |
| D5 | Cb[0][5] | Y[0][5] | Cr[0][5] | Y[1][5] | Cb[1][5] | Y[2][5] | Cr[1][5] | Y[3][5] |
| D4 | Cb[0][4] | Y[0][4] | Cr[0][4] | Y[1][4] | Cb[1][4] | Y[2][4] | Cr[1][4] | Y[3][4] |
| D3 | Cb[0][3] | Y[0][3] | Cr[0][3] | Y[1][3] | Cb[1][3] | Y[2][3] | Cr[1][3] | Y[3][3] |
| D2 | Cb[0][2] | Y[0][2] | Cr[0][2] | Y[1][2] | Cb[1][2] | Y[2][2] | Cr[1][2] | Y[3][2] |
| D1 | FIRST GENERATION | | SECOND GENERATION | | THIRD GENERATION | | | |
| D0 | Cb[0][x] | Y[0][x] | Cr[0][x] | Y[1][x] | Cb[1][x] | Y[2][x] | Cr[1][x] | Y[3][x] |

IMAGE DATA AREA / HISTORY INFORMATION AREA

FIG. 18 stream with history data

| video_sequence ( ){ | No. of bits | Mnemonic |
|---|---|---|
| next_start_code ( ) | | |
| sequence_header ( ) | | |
| sequence_extension ( ) | | |
| do { | | |
|   extension_and_user_data (0) | | |
|   do { | | |
|     if(nextbits( )= = group_start_code){ | | |
|       group_of_pictures_header(1) | | |
|       extension_and_user_data (1) | | |
|     } | | |
|     picture_header( ) | | |
|     picture_coding_extension( ) | | |
|     while((nextbits( )= =extension_start_code)ll | | |
|     (nextbits( )= =user_data_start_code)){ | | |
|     if(nextbits( )= =extension_start_code)) | | |
|       extension_data(2) | | |
|     if(nextbits( )= =user_data_start_code){ | | |
|       user_data_start_code | 32 | bslbf |
|       if(nextbits( )= =History_Data_ID){ | | |
|         History_Data_ID | 8 | bslbf |
|         converted_history_stream( ) | | |
|       } | | |
|       else{ | | |
|         user_data( ) | | |
|       } | | |
|     } | | |
|   } | | |
|   picture_data( ) | | |
|   }while((nextbits( )= =picture_start_code)ll | | |
|   (nextbits( )= =groupe_start_code)) | | |
|   if(nextbits( ) !=sequence_end_code){ | | |
|     sequence_header ( ) | | |
|     sequence_extension ( ) | | |
|   } | | |
|   }while(nextbits( ) !=sequence_end_code) | | |
| sequence_end_code | | |
| } | 32 | bslbf |

FIG. 38 history stream(40-1)

| history_stream( ){ | bits | value |
|---|---|---|
| sequence_header | | |
|    sequence_header_code | 32 | 000001B3 |
|    sequence_header_present_flag | 1 | |
|    horizontal_size_value | 12 | |
|    marker_bit | 1 | 1 |
|    vertical_size_value | 12 | |
|    aspect_ratio_information | 4 | |
|    frame_rate_code | 4 | |
|    marker_bit | 1 | 1 |
|    bit_rate_value | 18 | |
|    marker_bit | 1 | 1 |
|    vbv_buffer_size_value | 10 | |
|    constrained_parameter_flag | 1 | 0 |
|    load_intra_quantiser_matrix | 1 | |
|    load_non_intra_quantiser_matrix | 1 | |
|    marker_bits | 5 | 1F |
|    intra_quantiser_matrix[64] | 8*64 | |
|    non_intra_quantiser_matrix[64] | 8*64 | |
| | | |
| sequence_extension | | |
|    extension_start_code | 32 | 000001B5 |
|    extension_start_code_identifier | 4 | 1 |
|    sequence_extension_present_flag | 1 | |
|    profile_and_level_indication | 8 | |
|    progressive_sequence | 1 | |
|    chroma_format | 2 | |
|    horizontal_size_extension | 2 | |
|    vertical_size_extension | 2 | |
|    marker_bit | 1 | 1 |
|    bit_rate_extension | 12 | |
|    vbv_buffer_size_extension | 8 | |
|    low_delay | 1 | |
|    marker_bit | 1 | 1 |

FIG. 40 history stream(40-2)

|  | bits | value |
|---|---|---|
| frame_rate_extension_n | 2 | |
| frame_rate_extension_d | 5 | |
| marker_bits | 6 | 3F |
|  | | |
| sequence_display_extension | | |
| extension_start_code | 32 | 000001B5 |
| extension_start_code_identifier | 4 | 2 |
| sequence_display_extension_present_flag | 1 | |
| video_format | 3 | |
| colour_description | 1 | |
| colour_primaries | 8 | |
| transfer_characteristics | 8 | |
| marker_bit | 1 | 1 |
| matrix_coefficients | 8 | |
| display_horizontal_size | 14 | |
| marker_bit | 1 | 1 |
| display_vertical_size | 14 | |
| marker_bit | 1 | 1 |
|  | | |
| macroblock_assignment_in_user_data | | |
| macroblock_assignment_present_flag | 1 | |
| marker_bit | 7 | 7F |
| v_phase | 8 | |
| h_phase | 8 | |
|  | | |
| group_of_picture_header | | |
| group_start_code | 32 | 000001B8 |
| group_of_picture_header_present_flag | 1 | |
| time_code | 25 | |
| closed_gop | 1 | |
| broken_link | 1 | |
| marker_bits | 4 | F |
|  | | |
| picture_header | | |
| picture_start_code | 32 | 00000100 |

FIG. 41 history stream(40-3)

| | bits | value |
|---|---|---|
| temporal_reference | 10 | |
| picture_coding_type | 3 | |
| marker_bit | 1 | 1 |
| vbv_delay | 16 | |
| full_pel_forward_vector | 1 | |
| forward_f_code | 3 | |
| full_pel_backward_vector | 1 | |
| marker_bit | 1 | 1 |
| backward_f_code | 3 | |
| marker_bit | 1 | 1 |
| picture_coding_extension | | |
| extension_start_code | 32 | 000001B5 |
| extension_start_code_identifier | 4 | 8 |
| f_code[0][0] | 4 | |
| f_code[0][1] | 4 | |
| f_code[1][0] | 4 | |
| f_code[1][1] | 4 | |
| intra_dc_precision | 2 | |
| picture_structure | 2 | |
| top_field_first | 1 | |
| frame_pred_frame_dct | 1 | |
| concealment_motion_vectors | 1 | |
| q_scale_type | 1 | |
| marker_bit | 1 | 1 |
| intra_vlc_format | 1 | |
| alternate_scan | 1 | |
| repeart_first_field | 1 | |
| chroma_420_type | 1 | |
| progressive_frame | 1 | |
| composite_display_flag | 1 | |
| v_axis | 1 | |
| field_sequence | 3 | |
| sub_carrier | 1 | |
| burst_amplitude | 7 | |

FIG. 42 history stream(40-4)

| | bits | value |
|---|---|---|
| marker_bits | 1 | 1 |
| sub_carrier_phase | 8 | |
| | | |
| quant_matrix_extension | | |
| extension_start_code | 32 | 000001B5 |
| extension_start_code_identifier | 4 | 3 |
| quant_matrix_extension_present_flag | 1 | |
| load_intra_quantiser_matrix | 1 | |
| marker_bits | 2 | 3 |
| intra_quantiser_matrix[64] | 8*64 | |
| load_non_intra_quantiser_matrix | 1 | |
| marker_bits | 7 | 7F |
| non_intra_quantiser_matrix[64] | 8*64 | |
| load_chroma_intra_quantiser_matrix | 1 | |
| marker_bits | 7 | 7F |
| chroma_intra_quantiser_matrix[64] | 8*64 | |
| load_chroma_non_intra_quantiser_matrix | 1 | |
| marker_bits | 7 | 7F |
| chroma_non_intra_quantiser_matrix[64] | 8*64 | |
| | | |
| copyright_extension | | |
| extension_start_code | 32 | 000001B5 |
| extension_start_code_identifier | 4 | 4 |
| copyright_extension_present_flag | 1 | |
| copyright_flag | 1 | |
| copyright_identifier | 8 | |
| original_or_copy | 1 | |
| marker_bit | 1 | |
| copyright_number_1 | 20 | |
| marker_bit | 1 | |
| copyright_number_2 | 22 | |
| marker_bit | 1 | |
| copyright_number_3 | 22 | 3F |
| marker_bits | 6 | |
| | | |

FIG. 43 history stream(40-5)

| | bits | value |
|---|---|---|
| picture_display_extension | | |
|     extension_start_code | 32 | 000001B5 |
|     extension_start_code_identifier | 4 | 7 |
|     picture_display_extension_present_flag | 1 | |
|     frame_centre_horizontal_offset_1 | 16 | |
|     marker_bit | 1 | 1 |
|     frame_centre_vertical_offset_1 | 16 | |
|     marker_bit | 1 | 1 |
|     frame_centre_horizontal_offset_2 | 16 | |
|     marker_bit | 1 | 1 |
|     frame_centre_vertical_offset_2 | 16 | |
|     marker_bit | 1 | 1 |
|     frame_centre_horizontal_offset_3 | 16 | |
|     marker_bit | 1 | 1 |
|     frame_centre_vertical_offset_3 | 16 | |
|     marker_bit | 6 | 3F |
| | | |
| re_coding_stream_information | | |
|     user_data_start_code | 32 | 000001B2 |
|     re_coding_stream_info_ID | 16 | 91EC |
|     red_bw_flag | 1 | |
|     red_bw_indicator | 2 | |
|     marker_bit | 5 | 1F |
| | | |
| user_data | | |
|     user_data_start_code | 32 | 000001B2 |
|     user_data | 2048 | |
| | | |
| while(macroblock i=macroblock_count){ | | |
| macroblock | | |
|     macroblock_address_h | 8 | |
|     macroblock_address_v | 8 | |
|     slice_header_present_flag | 1 | |
|     skipped_macroblock_flag | 1 | |
|     marker_bit | 1 | 1 |
| | | |
| macroblock_modes( ) | | |
|     macroblock_quant | 1 | |
|     macroblock_motion_forward | 1 | |
|     macroblock_motion_backward | 1 | |
|     macroblock_pattern | 1 | |
|     macroblock_intra | 1 | |

FIG. 44 history stream(40-6)

| | bits | value |
|---|---|---|
| spatial_temporal_weight_code_flag | 1 | |
| frame_motion_type | 2 | |
| field_motion_type | 2 | |
| dct_type | 1 | |
| marker_bits | 2 | 3 |
| | | |
| quantiser_scale_code | 5 | |
| marker_bits | 3 | 7 |
| | | |
| PMV[0][0][0] | 14 | |
| marker_bits | 2 | 3 |
| PMV[0][0][1] | 14 | |
| motion_vertical_field_select[0][0] | 1 | |
| marker_bit | 1 | 1 |
| PMV[0][1][0] | 14 | |
| marker_bits | 2 | 3 |
| PMV[0][1][1] | 14 | |
| motion_vertical_field_select[0][1] | 1 | |
| marker_bit | 1 | 1 |
| PMV[1][0][0] | 14 | |
| marker_bits | 2 | 3 |
| PMV[1][0][1] | 14 | |
| motion_vertical_field_select[1][0] | 1 | |
| marker_bit | 1 | 1 |
| PMV[1][1][0] | 14 | |
| marker_bits | 2 | 3 |
| PMV[1][1][1] | 14 | |
| motion_vertical_field_select[1][1] | 1 | |
| marker_bit | 1 | 1 |
| | | |
| coded_block_pattern | 12 | |
| marker_bits | 4 | F |
| num_mv_bits | 8 | |
| num_coef_bits | 14 | |
| marker_bits | 2 | 3 |

FIG. 45 history stream(40-7)

|  | bits | value |
|---|---|---|
| num_other_bits | 7 | |
| marker_bit | 1 | 1 |
| } | | |

FIG. 46

| history_stream( ){ | No. of bits | Mnemonic |
|---|---|---|
| next_start_code ( ) | | |
| sequence_header ( ) | | |
| sequence_extension ( ) | | |
| extension_and_user_data (0) | | |
| if(nextbits( )= = group_start_code){ | | |
| group_of_pictures_header( ) | | |
| extension_and_user_data (1) | | |
| } | | |
| picture_header( ) | | |
| picture_coding_extension( ) | | |
| re_coding_stream_info( ) | | |
| extensions_and_user_data (2) | | |
| picture_data( ) | | |
| sequence_end_code | 32 | bslbf |
| } | | |

FIG. 47

| sequence_header( ){ | No. of bits | Mnemonic |
|---|---|---|
| sequence_header_code ( ) | 32 | bslbf |
| horizontal_size_value | 12 | uimsbf |
| vertical_size_value | 12 | uimsbf |
| aspect_ratio_information | 4 | uimsbf |
| frame_rate_code | 4 | uimsbf |
| bit_rate_value | 18 | uimsbf |
| marker_bit | 1 | bslbf |
| vbv_buffer_size_value | 10 | uimsbf |
| constrained_parameters_flag | 1 | bslbf |
| load_intra_quantiser_matrix | 1 | uimsbf |
| if(load_intra_quantiser_matrix) | | |
| intra_quantiser_matrix[64] | 8*64 | uimsbf |
| load_non_intra_quantiser_matrix | 1 | uimsbf |
| if(load_non_intra_quantiser_matrix) | | |
| non_intra_quantiser_matrix[64] | 8*64 | uimsbf |
| next_start_code ( ) | | |
| } | | |

FIG. 48

| sequence_extension( ){ | No. of bits | Mnemonic |
|---|---|---|
| extension_start_code | 32 | bslbf |
| extension_start_code_identifier | 4 | uimsbf |
| profile_and_level_indication | 8 | uimsbf |
| progressive_sequence | 1 | uimsbf |
| chroma_format | 2 | uimsbf |
| horizontal_size_extension | 2 | uimsbf |
| vertical_size_extension | 2 | uimsbf |
| bit_rate_extension | 12 | uimsbf |
| marker_bit | 1 | bslbf |
| vbv_buffer_size_extension | 8 | uimsbf |
| low_delay | 1 | uimsbf |
| frame_rate_extension_n | 2 | uimsbf |
| frame_rate_extension_d | 5 | uimsbf |
| next_start_code ( ) | | |
| } | | |

FIG. 49

| extension_and_user_data (i){ | No. of bits | Mnemonic |
|---|---|---|
| while((nextbits( )= =extension_start_code)ll | | |
| (nextbits( )= =user_data_start_code)){ | | |
| if((i==2)&&(nextbits( )==extension_start_code)) | | |
| extension_data( ) | | |
| if(nextbits( )==user_data_start_code) | | |
| user_data( ) | | |
| } | | |
| } | | |

FIG. 50

| user_data ( ){ | No. of bits | Mnemonic |
|---|---|---|
| user_data_start_code | 32 | bslbf |
| while(nextbits( )!='0000 0000 0000 0000 0000 0001'){ | | |
| user_data | 8 | uimsbf |
| } | | |
| next_start_code( ) | | |
| } | | |

FIG. 51

| group_of_pictures_header( ){ | No. of bits | Mnemonic |
|---|---|---|
| group_start_code | 32 | bslbf |
| time_code | 25 | bslbf |
| closed_gop | 1 | uimsbf |
| broken_link | 1 | uimsbf |
| next_start_code( ) | | |
| } | | |

FIG. 52

| picture_header( ){ | No. of bits | Mnemonic |
|---|---|---|
| picture_start_code | 32 | bslbf |
| temporal_reference | 10 | uimsbf |
| picture_coding_type | 3 | uimsbf |
| vbv_delay | 16 | uimsbf |
| if(picture_coding_type==2 II picture_coding_type==3){ | | |
| full_pel_forward_vector | 1 | bslbf |
| forward_f_code | 3 | bslbf |
| } | | |
| if(picture_coding_type==3){ | | |
| full_pel_forward_vector | 1 | bslbf |
| backward_f_code | 3 | bslbf |
| } | | |
| while(nextbits( )=='1'){ | | |
| extra_bit_picture/*with the value'1'*/ | 1 | uimsbf |
| extra_information_picture | 8 | uimsbf |
| } | | |
| extra_bit_picture/*with the value'0'*/ | 1 | uimsbf |
| next_start_code( ) | | |
| } | | |

FIG. 53

| picture_coding_extension( ){ | No. of bits | Mnemonic |
|---|---|---|
| extension_start_code | 32 | bslbf |
| extension_start_code_identifier | 4 | uimsbf |
| f_code [0] [0] /*forward horizontal*/ | 4 | uimsbf |
| f_code [0] [1] /*forward vertical*/ | 4 | uimsbf |
| f_code [1] [0] /*backward horizontal*/ | 4 | uimsbf |
| f_code [1] [1] /*backward vertical*/ | 4 | uimsbf |
| intra_dc_precision | 2 | uimsbf |
| picture_structure | 2 | uimsbf |
| top_field_first | 1 | uimsbf |
| frame_pred_frame_dct | 1 | uimsbf |
| concealment_motion_vectors | 1 | uimsbf |
| q_scale_type | 1 | uimsbf |
| intra_vlc_format | 1 | uimsbf |
| alternate_scan | 1 | uimsbf |
| repeat_first_field | 1 | uimsbf |
| chroma_420_type | 1 | uimsbf |
| progressive_frame | 1 | uimsbf |
| composite_display_flag | 1 | uimsbf |
| if(composite_display_flag){ | | |
| v_axis | 1 | uimsbf |
| field_sequence | 3 | uimsbf |
| sub_carrier | 1 | uimsbf |
| burst_amplitude | 7 | uimsbf |
| sub_carrier_phase | 8 | uimsbf |
| } | | |
| next_start_code( ) | | |
| } | | |

FIG. 54

| extension_data( ){ | No. of bits | Mnemonic |
|---|---|---|
| while(nextbits( )==extension_start_code) { | | |
| extension_start_code | 32 | bslbf |
| if (nextbits( )=="Quant Matrix Extension ID") | | |
| quant_matrix_extension( ) | | |
| else if (nextbits( )=="Copyright Extension ID") | | |
| copyright_extension( ) | | |
| else | | |
| picture_display_extension( ) | | |
| } | | |
| } | | |

FIG. 55

| quant_matrix_extension( ) { | No. of bits | Mnemonic |
|---|---|---|
| extension_start_code_identifier | 4 | uimsbf |
| load_intra_quantiser_matrix | 1 | uimsbf |
| if (load_intra_quantiser_matrix) | | |
| intra_quantiser_matrix [64] | 8*64 | uimsbf |
| load_non_intra_quantiser_matrix | 1 | uimsbf |
| if (load_non_intra_quantiser_matrix) | | |
| non_intra_quantiser_matrix [64] | 8*64 | uimsbf |
| load_chroma_intra_quantiser_matrix | 1 | uimsbf |
| if (load_chroma_intra_quantiser_matrix) | | |
| chroma_intra_quantiser_matrix [64] | 8*64 | uimsbf |
| load_chroma_non_intra_quantiser_matrix | 1 | uimsbf |
| if (load_chroma_non_intra_quantiser_matrix) | | |
| chroma_non_intra_quantiser_matrix [64] | 8*64 | uimsbf |
| next_start_code( ) | | |
| } | | |

FIG. 56

| copyright_extension( ) { | No. of bits | Mnemonic |
|---|---|---|
| extension_start_code_identifier | 4 | uimsbf |
| copyright_flag | 1 | bslbf |
| copyright_identifier | 8 | uimsbf |
| original_or_copy | 1 | bslbf |
| reserved | 7 | uimsbf |
| marker_bit | 1 | bslbf |
| copyright_number_1 | 20 | uimsbf |
| marker_bit | 1 | bslbf |
| copyright_number_2 | 22 | uimsbf |
| marker_bit | 1 | bslbf |
| copyright_number_3 | 22 | uimsbf |
| next_start_code( ) | | |
| } | | |

FIG. 57

| picture_display_extension( ) { | No. of bits | Mnemonic |
|---|---|---|
| extension_start_code_identifier | 4 | uimsbf |
| for(i=0;i;number_of_frame_centre_offsets;i++) { | | |
| frame_centre_horizontal_offset | 16 | simsbf |
| marker_bit | 1 | bslbf |
| frame_centre_vertical_offset | 16 | simsbf |
| marker_bit | 1 | bslbf |
| } | | |
| next_start_code( ) | | |
| } | | |

FIG. 58

| picture_data( ) { | No. of bits | Mnemonic |
|---|---|---|
| while(nextbits( )==slice_start_code) { | | |
| slice( ) | | |
| } | | |
| next_start_code( ) | | |
| } | | |

FIG. 59

| slice( ) { | No. of bits | Mnemonic |
|---|---|---|
| slice_start_code | 32 | bslbf |
| slice_quantiser_scale_code | 5 | uimsbf |
| if (nextbit( )=='1') { | | |
| intra_slice_flag | 1 | bslbf |
| intra_slice | 1 | uimsbf |
| reserved_bits | 7 | uimsbf |
| while(nextbits( )=='1') { | | |
| extra_bit_slice/*with the value'1'*/ | 1 | uimsbf |
| extra_information_slice | 8 | uimsbf |
| } | | |
| } | | |
| extra_bit_slice/*with the value'0'*/ | 1 | uimsbf |
| do { | | |
| macroblock( ) | | |
| } while(nextbit( )!='000 0000 0000 0000 0000 0000') | | |
| next_start_code( ) | | |
| } | | |

FIG. 60

| macroblock( ) { | No. of bits | Mnemonic |
|---|---|---|
| while(nextbits( )=='0000 0001 000') | | |
| macroblock_escape | 11 | bslbf |
| macroblock_address_increment | 1-11 | vlclbf |
| macroblock_modes( ) | | |
| if (macroblock_quant) | | |
| macroblock_quantiser_scale_code | 5 | uimsbf |
| if (macroblock_motion_forward II | | |
| (macroblock_intra && concealment_motion_vectors)) | | |
| motion_vectors(0) | | |
| if (macroblock_motion_backward) | | |
| motion_vectors(1) | | |
| if (macroblock_intra && concealment_motion_vectors) | | |
| marker_bit | 1 | bslbf |
| } | | |
| } | | |

FIG. 61

| macroblock_modes( ) { | No. of bits | Mnemonic |
|---|---|---|
| macroblock_type | 1-9 | vlclbf |
| if (macroblock_motion_forward II | | |
| macroblock_motion_backward) { | | |
| if (picture_structure=='frame') { | | |
| if (frame_pred_frame_dct==0) | | |
| frame_motion_type | 2 | uimsbf |
| } else { | | |
| field_motion_type | 2 | uimsbf |
| } | | |
| } | | |
| if ((picture_structure=="Frame picture") && | | |
| (frame_pred_frame_dct==0) && | | |
| (dct_type_flag==1)) { | | |
| dct_type | 1 | uimsbf |
| } | | |
| } | | |

FIG. 62

| motion_vectors(s) { | No. of bits | Mnemonic |
|---|---|---|
| if (motion_vector_count==1) { | | |
| if ((mv_format==field)&&(dmv!=1) | | |
| motion_vertical_field_select [0][s] | 1 | uimsbf |
| motion_vector(0,s) | | |
| } else { | | |
| motion_vertical_field_select [0][s] | 1 | uimsbf |
| motion_vector(0,s) | | |
| motion_vertical_field_select [1][s] | 1 | uimsbf |
| motion_vector(1,s) | | |
| } | | |
| } | | |

FIG. 63

| motion_vectors(r, s) { | No. of bits | Mnemonic |
|---|---|---|
| motion_code[r][s][0] | 1-11 | vlclbf |
| if ((f_code[s][0]!=1)&&(motion_code[r][s][0]!=0) | | |
| motion_residual [r][s][0] | 1-8 | uimsbf |
| if (dmv==1) | | |
| dmvector [0] | 1-2 | vlclbf |
| motion_code[r][s][1] | 1-11 | vlclbf |
| if ((f_code[s][1]!=1)&&(motion_code[r][s][1]!=0) | | |
| motion_residual [r][s][1] | 1-8 | uimsbf |
| if (dmv==1) | | |
| dmvector [1] | 1-2 | vlclbf |
| } | | |

FIG. 64

| macroblock_type VLC code | macroblock_quant | dct_type_flag | macroblock_motion_forward | macroblock_motion_backward | Description |
|---|---|---|---|---|---|
| 1 | 0 | 1 | 0 | 0 | Intra |
| 01 | 1 | 1 | 0 | 0 | Intra, Quant |

FIG. 65

| macroblock_type VLC code | macroblock_quant | dct_type_flag | macroblock_motion_forward | macroblock_motion_backward | Description |
|---|---|---|---|---|---|
| 1 | 0 | 1 | 1 | 0 | MC, Coded |
| 01 | 0 | 1 | 0 | 0 | No MC, Coded |
| 001 | 0 | 0 | 0 | 0 | MC, Not Coded |
| 0001 1 | 0 | 1 | 0 | 0 | Intra |
| 0001 0 | 1 | 1 | 1 | 0 | MC, Coded, Quant |
| 0000 1 | 1 | 1 | 0 | 0 | No MC, Coded, Quant |
| 0000 01 | 1 | 1 | 0 | 0 | Intra, Quant |

FIG. 66

| macroblock_type VLC code | macroblock_quant | dct_type_flag | macroblock_motion_forward | macroblock_motion_backward | Description |
|---|---|---|---|---|---|
| 10 | 0 | 0 | 0 | 0 | Interp, Not Coded |
| 11 | 0 | 1 | 1 | 1 | Interp, Coded |
| 010 | 0 | 0 | 0 | 0 | Bwd, Not Coded |
| 011 | 0 | 1 | 0 | 1 | Bwd, Coded |
| 0010 | 0 | 0 | 0 | 0 | Fwd, Not Coded |
| 0011 | 0 | 1 | 1 | 0 | Fwd, Coded |
| 0001 1 | 0 | 1 | 0 | 0 | Intra |
| 0001 0 | 1 | 1 | 1 | 1 | Interp, Coded, Quant |
| 0000 11 | 1 | 1 | 1 | 0 | Fwd, Coded, Quant |
| 0000 10 | 1 | 1 | 0 | 1 | Bwd, Coded, Quant |
| 0000 01 | 1 | 1 | 0 | 0 | Intra, Quant |

FIG. 67

| re_coding_stream_info ( ) { | No. of bits | Mnemonic |
|---|---|---|
| user_data_start_code | 32 | bslbf |
| re_coding_stream_info_ID | 16 | bslbf |
| red_bw_flag | 1 | uimsbf |
| if (red_bw_flag) | | |
| red_bw_indicator | 2 | uimsbf |
| if (!red_bw_flag) { | | |
| for(i=0;i<number_of_macroblock;++) { | | |
| marker_bit | 3 | bslbf |
| num_other_bits | 7 | uimsbf |
| num_mv_bits | 8 | uimsbf |
| num_coef_bits | 14 | uimsbf |
| } | | |
| } | | |
| next_start_code( ) | | |
| } | | |

FIG. 68

| Data Set | red_bw_flag | |
|---|---|---|
| | | red_bw_indicator |
| Data Set 1 | 0 | – |
| Data Set 2 | 1 | 0 |
| Data Set 3 | 1 | 1 |
| Data Set 4 | 1 | 2 |
| Data Set 5 | 1 | 3 |

FIG. 69

| Data Set | num_coef_bits, num_mv_bits, num_other_bits | q_scale_code, q_scale_type | motion_type, mv_vert_field_sel[][], mv[][][] | mb_mfwd, mb_mbwd | mb_pattern | coded_block_pattern | mb_intra | slice_start | dct_type | mb_quant | skipped_mb |
|---|---|---|---|---|---|---|---|---|---|---|---|
| Data Set 1 | 2 | 2 | 2 | 2 | 2 | 2 | 2 | 2 | 2 | 2 | 2 |
| Data Set 2 | 0 | 2 | 2 | 2 | 2 | 2 | 2 | 2 | 2 | 2 | 2 |
| Data Set 3 | 0 | 2 | 2 | 2 | 2 | 0 | 2 | 1 | 2 | 1 | 1 |
| Data Set 4 | 0 | 2 | 0 | 1 | 1 | 0 | 1 | 1 | 0 | 1 | 1 |
| Data Set 5 | 0 | 0 | 0 | 0 | 0 | 0 | 0 | 0 | 0 | 0 | 0 |

COMBINATION OF HISTORY
INFORMATION ITEMS

FIG. 70

| Frame Coding | Line Field Coding | | | | | | | | | | | | | | | |
|---|---|---|---|---|---|---|---|---|---|---|---|---|---|---|---|---|
| 0 | 0 | SRIB_sync_code=1111₂ | Reserved | 0 | fr_ft_SRIB | SRIB_top_field_first | SRIB_repeat_field_first | 422-420-chroma | 0 |
| | 1 | rolling_SRIB_mb_ref [15:0] | | | | | | | |
| 1 | 2 | picrate_element [picrate_element_index][31:16] | | | | | | | |
| | 3 | picrate_element [picrate_element_index][15:0] | | | | | | | |
| 2 | 4 | mb_quant | mb_mfwd | mb_mbwd | | mv [0][0][0][12:0] | | | | mv [0][0][1][8:0] |
| | 5 | mb_pattern | mb_intra | slice_start_flag | mv_vert_field_sel[r][s] [1][1][1][0][0][1][0][0] | mv [0][1][0][12:0] | | | | mv [0][1][1][8:0] |
| 3 | 6 | DCT_type | motion_type | | | mv [1][0][0][12:0] | | | | mv [1][0][1][8:0] |
| | 7 | skip_mb | q_scale_type | q_scale_code[4:0] | | mv [1][1][0][12:0] | | | | mv [1][1][1][8:0] |
| 4 | 8 | Reserved | | | | Reserved | | | | |
| | 9 | coded_block_pattern [7:0] | | | | | | | | |
| 5 | 10 | Reserved | | | | Reserved | | | | |
| | 11 | coded_block_pattern [3:0] | | | | | | | | |
| 6 | 12 | Reserved | | | | num_other_bits[6:0] | | | | num_mv_bits[7:2] |
| | 13 | num_mv_bits [1:0] | | | | num_coef_bits[13:0] | | | | |
| 7 | 14 | SRIB_crc[31:16] | | | | | | | | |
| | 15 | SRIB_crc[15:0] | | | | | | | | |

FIG. 71 picture rate elements(72-1)

| parameter | number format | number of bits | bit offset from | bit offset to | data category | details |
|---|---|---|---|---|---|---|
| MPEG standard flag | 1bit flag | 1 | 0 | 0 | 3 | 1=>MPEG 1:0=>MPEG2 |
| red_bw_flag | 1bit flag | 1 | 1 | 1 | 3 | Default="0" |
| red_bw_indicator | 2bit ui | 3 | 2 | 4 | 3 | Default="000" |
| header present flags | 2bit flags | 2 | 5 | 6 | 3 | sequence header present flag, GOP header present flag |
| Extension start code flags | 16 flags | 16 | 7 | 22 | 3 | Indicates if a given extension start code exists. The 16 flags correspond to the 16 entries in table 6.2 of the ISO/IEC 13818-2: 1996 standard in the order they are listed. |
| Other start codes | 3 flags | 3 | 23 | 25 | 3 | user_data_start_code, sequence_error_code, sequence_end_code |
| sequence header | | | | | | |
| horizontal_size | 14bit uimsbf | 14 | 26 | 39 | 2 | includes extension |
| vertical_size | 14bit uimsbf | 14 | 40 | 53 | 2 | includes extension |
| aspect_ratio_information | 4bit uimsbf | 4 | 54 | 57 | 2 | |
| frame_rate_code | 4bit uimsbf | 4 | 58 | 61 | 2 | |
| bit_rate | 30bit uimsbf | 30 | 62 | 91 | 2 | includes extension, correct value should be calculated |
| vbv_buffer_size | 18bit uimsbf | 18 | 92 | 109 | 2 | includes extension |
| constrained_parameters_flag | 1bit flag | 1 | 110 | 110 | 2 | |
| sequence extension | | | | | | |
| profile_and_level_indication | 8bit uimsbf | 8 | 111 | 118 | 2 | |
| progressive_sequence | 1bit flag | 1 | 119 | 119 | 2 | |
| chroma_format | 2bit uimsbf | 2 | 120 | 121 | 2 | |
| low_delay | 1bit flag | 1 | 122 | 122 | 2 | |
| sequence display extension | | | | | | |
| video_format | 3bit uimsbf | 3 | 123 | 125 | 2 | |
| colour_description | 1bit flag | 1 | 126 | 126 | 2 | |
| colour_primaries | 8bit uimsbf | 8 | 127 | 134 | 2 | |
| transfer_characteristics | 8bit uimsbf | 8 | 135 | 142 | 2 | |
| matrix_coefficients | 8bit uimsbf | 8 | 143 | 150 | 2 | |
| display_horizontal_size | 14bit uimsbf | 14 | 151 | 164 | 2 | |
| display_vertical_size | 14bit uimsbf | 14 | 165 | 178 | 2 | |
| group of pictures header | | | | | | |
| time_code | 25bit flag | 25 | 179 | 203 | 2 | |
| closed_gop | 1bit flag | 1 | 204 | 204 | 2 | |

FIG. 72 picture rate elements(72-2)

| | | | | | | |
|---|---|---|---|---|---|---|
| broken_link | 1bit flag | 1 | 205 | 205 | 2 | |
| picture header | | | | | | |
| temporal_reference | 10bit uimsbf | 10 | 206 | 215 | 1 | |
| picture_coding_type | 3bit uimsbf | 3 | 216 | 218 | 1 | |
| vbv_delay | 16bit uimsbf | 16 | 219 | 234 | 1 | should be calculated if not present in bitstream |
| full_pel_forward_vector | 1bit flag | 1 | 235 | 235 | 1 | |
| forward_f_code | 3bit uimsbf | 3 | 236 | 238 | 1 | |
| full_pel_backward_vector | 1bit flag | 1 | 239 | 239 | 1 | |
| backward_f_code | 3bit uimsbf | 3 | 240 | 242 | 1 | |
| picture coding extension | | | | | | |
| forward_horizontal_f_code | 4bit uimsbf | 4 | 243 | 246 | 1 | |
| forward_vertical_f_code | 4bit uimsbf | 4 | 247 | 250 | 1 | |
| backward_horizontal_f_code | 4bit uimsbf | 4 | 251 | 254 | 1 | |
| backward_vertical_f_code | 4bit uimsbf | 4 | 255 | 258 | 1 | |
| intra_dc_precision | 2bit uimsbf | 2 | 259 | 260 | 1 | |
| picture_structure | 2bit uimsbf | 2 | 261 | 262 | 1 | |
| top_field_first | 1bit flag | 1 | 263 | 263 | 1 | |
| frame_pred_frame_dct | 1bit flag | 1 | 264 | 264 | 1 | |
| concealment_motion_vectors | 1bit flag | 1 | 265 | 265 | 1 | |
| q_scale_type | 1bit flag | 1 | 266 | 266 | 1 | |
| intra_vlc_format | 1bit flag | 1 | 267 | 267 | 1 | |
| alternate scan | 1bit flag | 1 | 268 | 268 | 1 | |
| repeat_first_field | 1bit flag | 1 | 269 | 269 | 1 | |
| chroma_420_type | 1bit flag | 1 | 270 | 270 | 1 | |
| progressive_frame | 1bit flag | 1 | 271 | 271 | 1 | |
| composite_display_flag | 1bit flag | 1 | 272 | 272 | 1 | |
| v_axis | 1bit flag | 1 | 273 | 273 | 1 | |
| field_sequence | 3bit uimsbf | 3 | 274 | 276 | 1 | |
| sub_carrier | 1bit flag | 1 | 277 | 277 | 1 | |
| burst_amplitude | 7bit uimsbf | 7 | 278 | 284 | 1 | |
| sub_carrier_phase | 8bit uimsbf | 8 | 285 | 292 | 1 | |
| quant matrix extension | | | | | | |
| load_intra_quantiser_matrix | 1bit flag | 1 | 293 | 293 | 1 | (1) |
| load_non_intra_quantiser_matrix | 1bit flag | 1 | 294 | 294 | 1 | (1) |
| load_chroma_intra_quantiser_matrix | 1bit flag | 1 | 295 | 295 | 1 | (1) |
| load_chroma_non_intra_quantiser_matrix | 1bit flag | 1 | 296 | 296 | 1 | (1) |
| intra_quantiser_matrix[64] | 64*0...255 | 512 | 297 | 808 | 2 | (1) |
| non_intra_quantiser_matrix[64] | 64*0...255 | 512 | 809 | 1320 | 2 | (1) |
| chroma_intra_quantiser_matrix[64] | 64*0...255 | 512 | 1321 | 1832 | 2 | (1) |
| chroma_non_intra_quantiser_matrix[64] | 64*0...255 | 512 | 1833 | 2344 | 2 | (1) |
| picture_display_extension | | | | | | |
| frame_centre_horizontal_offset_1 | 16bit uimsbf | 16 | 2345 | 2360 | 2 | |
| frame_centre_vertical_offset_1 | 16bit uimsbf | 16 | 2361 | 2376 | 2 | |
| frame_centre_horizontal_offset_2 | 16bit uimsbf | 16 | 2377 | 2392 | 2 | |

FIG. 73 picture rate elements(72-3)

| | | | | | |
|---|---|---|---|---|---|
| frame_centre_vertical_offset_2 | 16bit uimsbf | 16 | 2393 | 2408 | 2 |
| frame_centre_horizontal_offset_3 | 16bit uimsbf | 16 | 2409 | 2424 | 2 |
| frame_centre_vertical_offset_3 | 16bit uimsbf | 16 | 2425 | 2440 | 2 |
| copyright extension | | | | | |
| copyright_flag | 1bit flag | 1 | 2441 | 2441 | 2 |
| copyright_identifier | 8bit code | 8 | 2442 | 2449 | 2 |
| original_or_copy | 1bit flag | 1 | 2450 | 2450 | 2 |
| copyright_number | 64bit uimsbf | 64 | 2451 | 2514 | 2 |
| PTS/DTS | | | | | |
| PTS_DTS_flag | 2bit flag | 2 | 2515 | 2516 | 1 |
| PTS_Value | 33bit uimsbf | 33 | 2517 | 2549 | 2 |
| DTS_Value | 33bit uimsbf | 33 | 2550 | 2582 | 2 |
| spare reserved bits | | | | | |
| spare | 41bit uimsbf | 41 | 2583 | 2623 | |
| user data area | | | | | |
| user_data | | 1664 | 2624 | 4287 | 2 |
| picture rate information CRC | | | | | |
| 32-bit_protection_CRT | 32bit uimsbf | 32 | 4288 | 4319 | |

FIG. 74

| D9 | Cb[0][9] | Y[0][9] | Cr[0][9] | Y[1][9] | Cb[1][9] | Y[2][9] | Cr[1][9] | Y[3][9] |
|---|---|---|---|---|---|---|---|---|
| D8 | Cb[0][8] | Y[0][8] | Cr[0][8] | Y[1][8] | Cb[1][8] | Y[2][8] | Cr[1][8] | Y[3][8] |
| D7 | Cb[0][7] | Y[0][7] | Cr[0][7] | Y[1][7] | Cb[1][7] | Y[2][7] | Cr[1][7] | Y[3][7] |
| D6 | Cb[0][6] | Y[0][6] | Cr[0][6] | Y[1][6] | Cb[1][6] | Y[2][6] | Cr[1][6] | Y[3][6] |
| D5 | Cb[0][5] | Y[0][5] | Cr[0][5] | Y[1][5] | Cb[1][5] | Y[2][5] | Cr[1][5] | Y[3][5] |
| D4 | Cb[0][4] | Y[0][4] | Cr[0][4] | Y[1][4] | Cb[1][4] | Y[2][4] | Cr[1][4] | Y[3][4] |
| D3 | Cb[0][3] | Y[0][3] | Cr[0][3] | Y[1][3] | Cb[1][3] | Y[2][3] | Cr[1][3] | Y[3][3] |
| D2 | Cb[0][2] | Y[0][2] | Cr[0][2] | Y[1][2] | Cb[1][2] | Y[2][2] | Cr[1][2] | Y[3][2] |
| D1 | Cb[0][1] | Y[0][1] | Cr[0][1] | Y[1][1] | Cb[1][1] | Y[2][1] | Cr[1][1] | Y[3][1] |
| D0 | Embedded Aligned MPEG-2 Re-Coding Information Bus | Y[0][0] | Embedded Aligned MPEG-2 Re-Coding Information Bus | Y[1][0] | Embedded Aligned MPEG-2 Re-Coding Information Bus | Y[2][0] | Embedded Aligned MPEG-2 Re-Coding Information Bus | Y[3][0] |

FIG. 75

CODING SYSTEM AND METHOD, ENCODING DEVICE AND METHOD, DECODING DEVICE AND METHOD, RECORDING DEVICE AND METHOD, AND REPRODUCING DEVICE AND METHOD

This is a continuation of application Ser. No. 09/647,960, filed Oct. 6, 2000 under 35 USC 371, which issued as U.S. Pat. No. 7,236,526 on Jun. 26, 2007, which claims priority from International Application PCT/JP00/00720 filed on Feb. 9, 2000, with a claim of priority under 35 USC 119 to Japanese Application 11-031944, filed in Japan on Feb. 9, 1999, the entirety thereof being incorporated herein by reference.

TECHNICAL FIELD

The present invention relates to a coding system and method, an encoding device and method, a decoding device and method, a recording device and method, and a reproducing device and method, and in particular, to a coding system and method, an encoding device and method, a decoding device and method, a recording device and method, and a reproducing device and method which are all suitable for use in a transcoder for carrying out a re-coding process on an encoded stream that has been encoded in accordance with the MPEG standard, to generate a re-coded stream having a different GOP (Group of Pictures) structure or bit rate.

BACKGROUND ART

In broadcasting stations for producing and broadcasting television programs, the MPEG (Moving Picture Experts Group) technique is commonly used to compress/encode video data. In particular, in the fields of recording of video data on a randomly accessible recording medium material such as a tape and transmission of video data via a cable or a satellite, the MPEG technique is becoming a de facto standard.

An example of processing carried out in a broadcasting station until a video program created therein is transmitted to each home will be described in brief. First, encoder provided in a camcoder comprising a video camera and a VTR (Video Tape Recorder) integrated together is used to encode and record source video data on a magnetic tape. In this case, the encoder of the camcoder encodes the source video data so as to be suited for a recording format for a VTR tape. For example, an MPEG bit stream recorded on the magnetic tape has a GOP structure in which one GOP is configured by two frames (for example, I, B, I, B, I, B, . . . ). In addition, the MPEG bit streams recorded on the magnetic tape has a bit rate of 18 Mbps.

Next, a main broadcasting station carries out an edition process to edit the video bit stream recorded on the magnetic tape. To achieve this, the GOP structure of the video bit stream recorded on the magnetic tape is converted into one suitable for the edition process. In the GOP structure suited for the edition process, one GOP is configured by one frame and all pictures are of the I type. This is because the I pictures, which have no correlations with other pictures, are most suitable for edition in frames. In an actual operation, the video stream recorded on the magnetic tape is decoded back into baseband video data. This baseband video signal is re-coded so that all pictures are converted into the I type. By carrying out the decoding and re-coding process in this manner, a bit stream having the GOP structure suited for the edition process can be generated.

Next, to transmit the edited video program generated by the above described edition process, from the main station to local stations, the bit stream of the edited video program is converted into a GOP structure and bit rate suitable for a transmission process. For example, in the GOP structure suited for transmission between broadcasting stations, one GOP is configured by 15 frames (for example, I, B, B, P, B, B, P, . . . ). In addition, the bit rate suitable for transmissions between broadcasting stations is preferably high, that is, 50 Mbps or higher because an exclusive line consisting of optical fibers and having a high transmission capacity is commonly provided between broadcasting stations. Specifically, the bit stream of the edited video program is decoded back into the baseband video data. Then, the baseband video data is re-coded to have the GOP structure and bit rate suited for transmissions between broadcasting stations.

In a local station, an edition process is carried out to insert commercial films specific to the locality into the video program transmitted from the main station. That is, as in the above described edition process, the video stream transmitted from the main stream is decoded back into the baseband video data. By re-coding the baseband video signal so that all pictures are converted into the I type, a bit stream having the GOP structure suited for the edition process can be generated.

Subsequently, to transmit the video program edited in the local station to each home via a cable or a satellite, conversion into the GOP structure and bit rate suited for the transmission process is carried out. For example, in the GOP structure suitable for transmissions to each home, one GOP is configured by 15 frames (for example, I, B, B, P, B, B, P, . . . ) and the bit rate suitable for transmissions to each home is low, that is, about 5 Mbps. Specifically, the bit stream of the edited video program is decoded back into the baseband video data. Then, the baseband video data is re-coded into the GOP structure and bit rate suitable for transmissions.

As understood from the above description, the plurality of decoding and encoding processes are repeated while the video program is being transmitted from the broadcasting station to each home. In fact, the broadcasting station requires various signaling processes other than those described above, so that the decoding and encoding processes must be repeated for each signaling process.

As is well known, however, the encoding and decoding processes based on the MPEG standard are not 100% reversible. That is, the baseband video data before encoding is not perfectly the same as the decoded video data and has its image quality degraded due to the encoding and decoding processes. Disadvantageously, repetition of the decoding and encoding processes may progressively degrade the image quality, as described above. In other words, repetition of the decoding/encoding processes may accumulate degradation of the image quality.

The present invention is provided in view of these circumstances, and it is an object of the present invention to provide a transcoding system that can prevent degradation of the image quality even if the decoding and encoding processes are repeated to change the structure of the GOP (Group of Pictures) in the encoded bit stream encoded based on the MPEG standard.

DISCLOSURE OF THE INVENTION

The present invention relates to a transcoder for re-coding an encoded stream generated based on the MPEG standard to generate a re-coded stream having a different GOP (Group of Pictures) and a different bit rate.

Specifically, a decoding device of a transcoder 106 decodes a source encoded stream to generate decoded video data and extracts past encoding parameters superposed in the encoded stream as history_stream( ). In this case, the decoding device extracts the past encoding parameters based on information superposed in the encoded stream as re_coding_stream_info( ).

An encoding device receives the decoded video data and the past encoding parameters and uses the latter to encode the decoded video data in such a manner as to prevent the re-coding process from degrading the image quality, thereby generating a re-coded stream. Further, the encoding device selects ones of the past encoding parameters which are optimal for an application located after the encoding device and connected thereto, and writes only the selected past encoding parameters into the encoded stream as history_stream( ). The encoding device superposes information indicating the selected past encoding parameters, in the encoded stream as re_coding_stream_info( ) so that the following application can adequately extract from the re-coded stream the encoding parameters concerning history_stream( ).

The transcoder according to the present invention can realize a coding system that can use a minimum number of encoding parameters adapted for the following application to minimize degradation of the image quality even if video data is repeatedly re-coded.

The transcoder according to the present invention comprises decoding means for decoding a source encoded stream to generate video data and extracting from the source encoded stream past encoding parameters generated by a past encoding process, encoding means for re-coding the video data to generate a re-coded video stream, and control means for receiving the past encoding parameters to control the re-coding process by the encoding means based on the past encoding parameters and selectively writing the past encoding parameters into a re-coded stream.

The encoding device of the transcoder according to the present invention selects ones of the past encoding parameters which are required by the application located after the encoding means and connected thereto and writes the selected past encoding parameters into the re-coded stream.

The encoding device of the transcoder according to the present invention selectively writes the past encoding parameters into the re-coded stream and writes into the re-coded stream a flag or/and indicator indicating a data set of the past encoding parameters written into the re-coded stream.

The encoding device of the transcoder according to the present invention writes information on the past encoding parameters into the encoded stream as history_stream( ) and writes information on the re-coded stream into the re-coded stream as re_coding_stream_info( ).

The encoding device of the transcoder according to the present invention selectively writes the past encoding parameters into the re-coded stream as history_stream( ) and writes into the re-coded stream as re_coding_stream_info( ), information on a data set of the past encoding parameters written into the re-coded stream.

The encoding device according to the present invention receives past encoding parameters on a past encoding process executed on video data, selectively writes the past encoding parameters into a re-coded stream, and writes into the re-coded stream, information indicating a data set of the past encoding parameters written into the re-coded stream.

The decoding device according to the present invention extracts from the encoded stream the information on the data set of the past encoding parameters superposed in the encoded stream and extracts the past encoding parameters from the encoded stream based on the information on the data set.

The decoding device according to the present invention extracts from the encoded stream the flag or/and indicator written into the encoded stream as re_coding_stream_info( ) and extracts the past encoding parameters from the encoded stream based on the flag or/and indicator.

BRIEF DESCRIPTION OF DRAWINGS

FIG. 17 is a diagram for describing pixels in a macroblock.

FIG. 18 is a diagram for describing an area in which encoding parameters are recorded.

FIG. 38 is a diagram for describing a syntax for a stream of a video sequence.

FIG. 40 is a diagram for describing a syntax for history_stream( ) having history information of a fixed length recorded therein.

FIG. 41 is a diagram for describing the syntax for history_stream( ) having the history information of the fixed length recorded therein.

FIG. 42 is a diagram for describing the syntax for history_stream( ) having the history information of the fixed length recorded therein.

FIG. 43 is a diagram for describing the syntax for history_stream( ) having the history information of the fixed length recorded therein.

FIG. 44 is a diagram for describing the syntax for history_stream( ) having the history information of the fixed length recorded therein.

FIG. 45 is a diagram for describing the syntax for history_stream( ) having the history information of the fixed length recorded therein.

FIG. 46 is a diagram for describing the syntax for history_stream( ) having the history information of the fixed length recorded therein.

FIG. 47 is a diagram for describing the syntax for history_stream( ) having the history information of the variable length recorded therein.

FIG. 48 is a diagram for describing a syntax for sequence_header( ).

FIG. 49 is a diagram for describing a syntax for sequence_extension( ).

FIG. 50 is a diagram for describing a syntax for extension_and_user_data( ).

FIG. 51 is a diagram for describing a syntax for user_data( ).

FIG. 52 is a diagram for describing a syntax for group_of_pictures_header( ).

FIG. 53 is a diagram for describing a syntax for picture_header( ).

FIG. 54 is a diagram for describing a syntax for picture_coding_extension( ).

FIG. 55 is a diagram for describing a syntax for extension_data( ).

FIG. 56 is a diagram for describing a syntax for quant_matrix_extension( ).

FIG. 57 is a diagram for describing a syntax for copyright_extension( ).

FIG. 58 is a diagram for describing a syntax for picture_display_extension( ).

FIG. 59 is a diagram for describing a syntax for picture_data( ).

FIG. 60 is a diagram for describing a syntax for slice( ).

FIG. 61 is a diagram for describing a syntax for macroblock( ).

FIG. 62 is a diagram for describing a syntax for macroblock_modes( ).

FIG. 63 is a diagram for describing a syntax for motion_vectors(s).

FIG. 64 is a diagram for describing a syntax for motion_vector(r, s).

FIG. 65 is a diagram for describing variable-length codes of macroblock_type for I pictures.

FIG. 66 is a diagram for describing variable-length codes of macroblock_type for P pictures.

FIG. 67 is a diagram for describing variable-length codes of macroblock_type for B pictures.

FIG. 68 is a diagram for describing a syntax for re_coding_stream_info( ).

FIG. 69 is a diagram for describing red_bw_flag and red_bw_indicator.

FIG. 70 is a diagram for describing a data set of history information coding parameters.

FIG. 71 is a diagram for describing Re_coding Information Bus macroblock formation.

FIG. 72 is a diagram for describing Picture rate elements.

FIG. 73 is a diagram for describing Picture rate elements.

FIG. 74 is a diagram for describing Picture rate elements.

FIG. 75 is a diagram for describing an area in which Re_Coding Information Bus is recorded.

BEST MODE FOR CARRYING OUT THE INVENTION

Before a transcoder to which the present invention is applied is described below, compressive encoding of moving image signals will be explained. The terms used for a system herein refer to the entire system configured by plural devices and means.

For example, television conference or telephone systems that transmit moving image signals to remote sites use line or interframe correlationship among video signals to compressive-code image signals in order to efficiently use transmission paths.

The use of the line correlationship enables image signals to be compressed, for example, by means of a DCT (Discrete Cosine Transformation) process.

Figure 1:
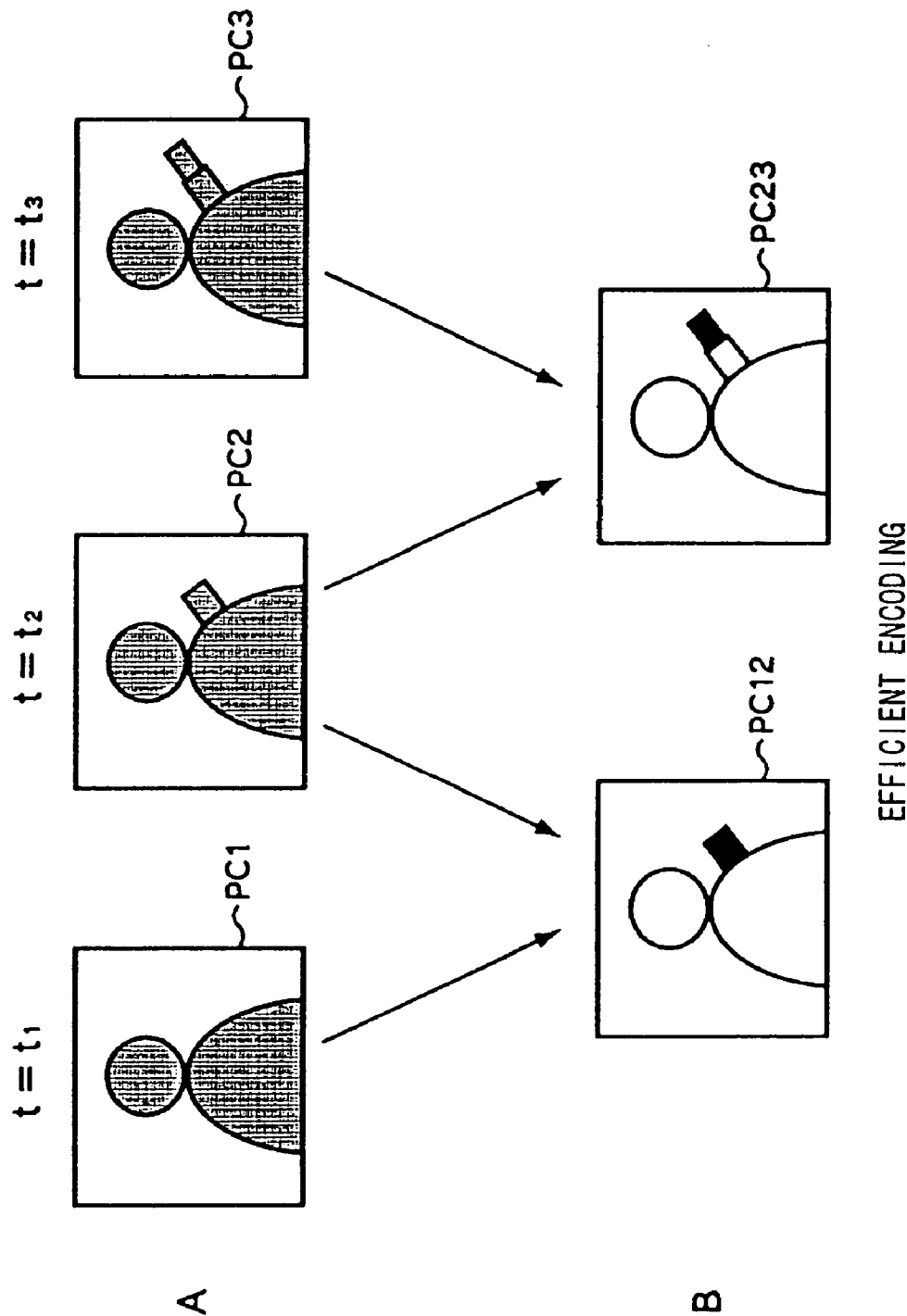
FIG. 1 is a diagram for describing the principle of a high efficient encoding.

In addition, the use of the interframe correlationship enables the image signals to be further compressed for encoding. As shown, for example, in FIG. 1, if frame images PC1 to PC3 occur during points of time t1 to t3, the difference in image signal between the frame images PC1 and PC2 is calculated to generate PC12, and the difference between frame images PC2 and PC3 is calculated to generate PC23. Images in temporally adjacent frames do not typically have substantially large variations, so that calculation of the difference therebetween results in a differential signal of a small value. Accordingly, this differential signal can be used for encoding to compress the amount of encoding.

However, transmission of only differential signals does not allow the restoration of the original images. Thus, the image in each frame is encoded into one of three picture types including I, P, and B pictures in order to compressive-code the image signals.

Figure 2:
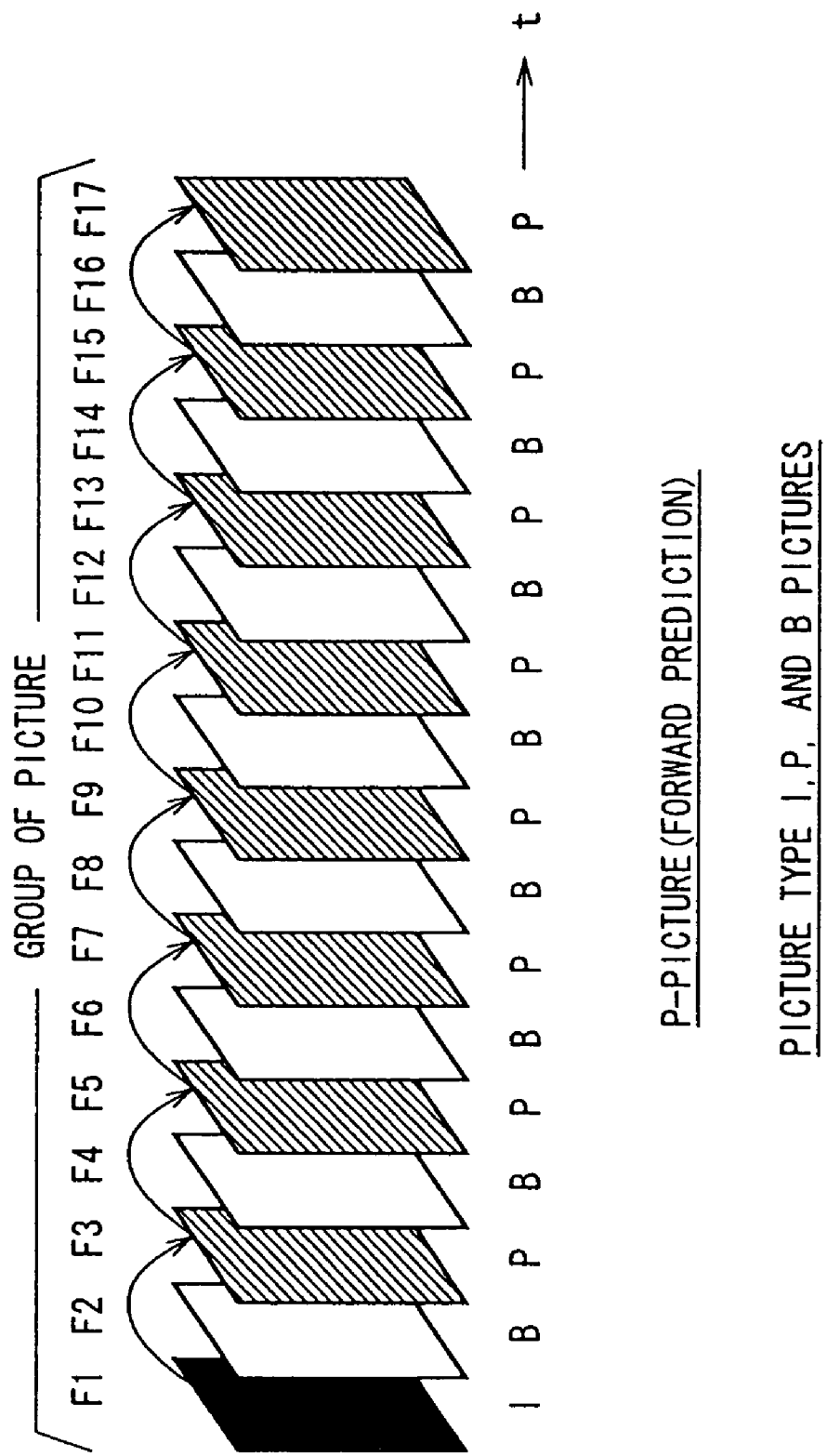
FIG. 2 is a diagram for describing how picture types are processed in compressing image data.

That is, as shown, for example, in FIG. 2, the image signals for 17 frames including frames F1 to F17 are grouped into a group of pictures (GOP), which is a processing unit. Then, the image signal in the frame F1 is encoded into the I picture, the second frame F2 is encoded into the B picture, and the third frame F3 is encoded into the P picture. The fourth and subsequent frames F4 to F17 are alternately encoded into the B or P picture.

Figure 3:
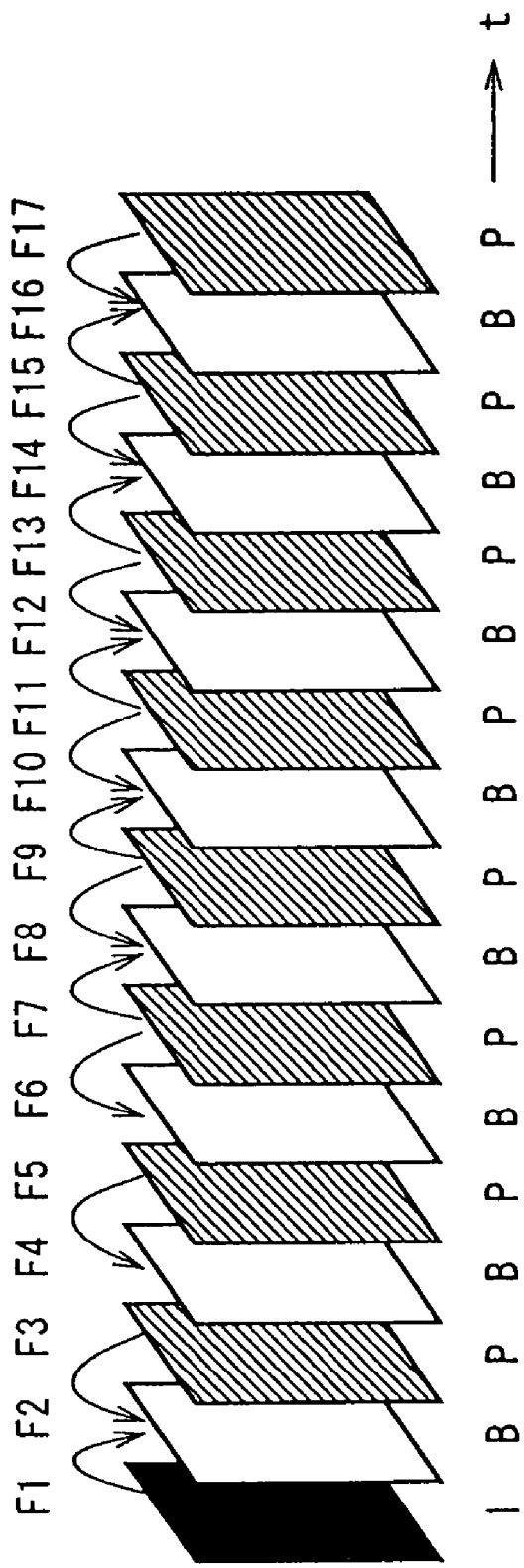
FIG. 3 is a diagram for describing how the picture types are processed in compressing image data.

For the I picture image signal, the image signal for the corresponding frame is transmitted as it is. On the contrary, for the P picture image signal, basically, the differential between this image signal and the temporally preceding I or P picture is transmitted as shown in FIG. 2. Further, for the B picture image signal, basically, the differential between this image signal and the average of the temporally preceding and following frames is encoded, as shown in FIG. 3.

Figure 4:
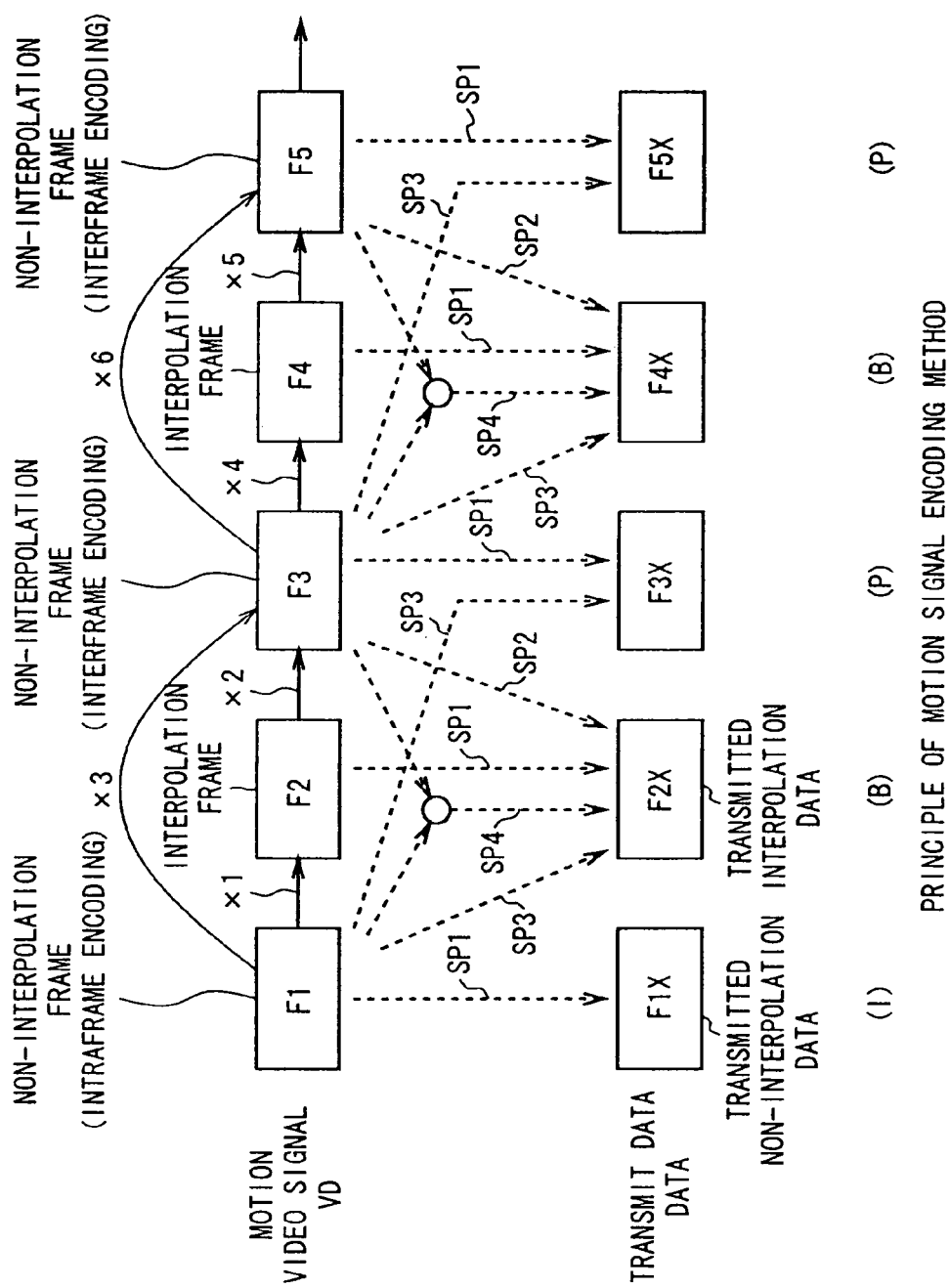
FIG. 4 is a diagram for describing the principle of encoding of moving image signals.

FIG. 4 shows the principle of a method of encoding moving image signals. As shown in this figure, since the first frame F1 is processed as the I picture, it is transmitted to a transmission path as transmitted data F1X (intraimage encoding). On the contrary, since the second frame F2 is processed as the B picture, the differential between this frame and the average of the temporally preceding frame F1 and the temporally following frame F3 is calculated and transmitted as transmitted data F2X.

In fact, there are four types of processing for the B pictures. A first type of processing transmits the data in the original frame F2 as the transmitted data F2X without any calculation (SP1) (intracoding); this processing is similar to that for the I pictures. A second type of processing calculates and transmits the differential (SP2) between the original frame F2 and the temporally following frame F3 (backward predictive encoding). A third type of processing transmits the differential (SP3) between the original frame F2 and the temporally preceding frame F1 (forward predictive encoding). Further, a fourth type of processing generates the differential (SP4) between the original frame F2 and the average of the temporally preceding frame F1 and temporally following frame F3 and transmits it as the transmitted data F2X (bidirectional predictive encoding).

One of the four methods described above which transmits the smallest amount of data is actually employed.

In transmitting the differential data, a motion vector x1 (between the frames F1 and F2) (in the case of forward prediction) or x2 (between the frames F3 and F2) (in the case of backward prediction) or both (in the case of bidirectional prediction) between the original frame and the image (reference image) in the frame for which the differential with the original frame is to be calculated is also transmitted.

In addition, for the P picture frame F3, the temporally preceding frame F1 is used as the reference image to calculate the differential signal (SP3) between the frames F3 and F1 as well as the motion vector x3, both of which are transmitted as transmitted data F3X (forward predictive encoding). Alternatively, the data in the original frame F3 is transmitted as the data F3X (SP1) (intracoding). As in the B pictures, one of these methods which transmits the smaller amount of data is selected.

Figure 5:
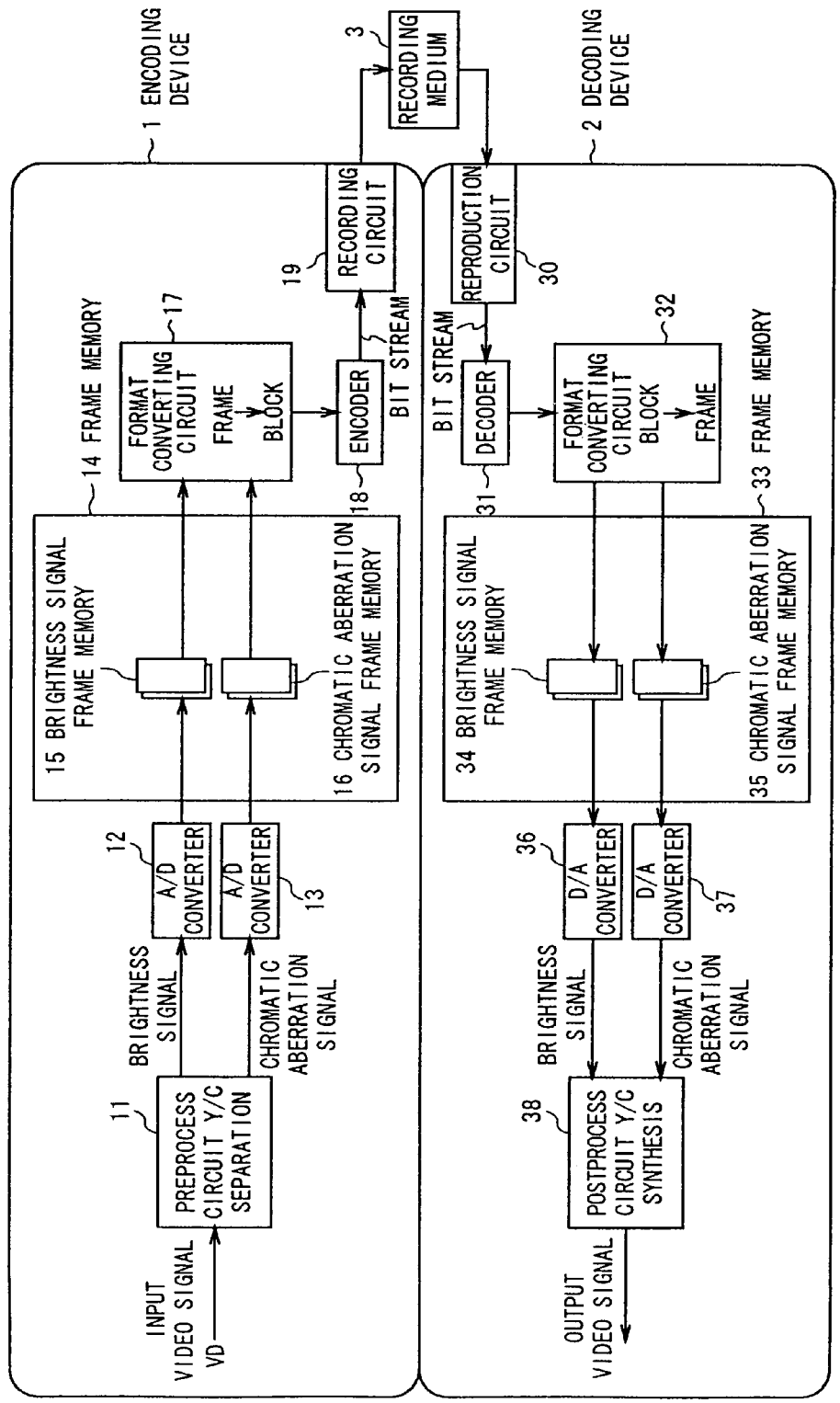
FIG. 5 is a block diagram showing the configurations of devices for encoding and decoding moving image signals.

FIG. 5 shows an example of the configuration of devices for encoding and transmitting moving image signals and decoding them based on the above described principle. An encoding device 1 is adapted to encode and transmit input video signals to a recording medium 3 acting as a transmission path. A decoding device 2 is adapted to reproduce the signals recorded on the recording medium 3 and decode and output them.

In an encoding device 1, input video signals are input to a preprocess circuit 11, where the images are each separated into a brightness signal and a color signal (in this embodiment, a color difference signal). The brightness and color difference signals, which are analog, are converted into digital signals by A/D converters 12, 13, respectively. The digital signals into which the video signal has been converted by the A/D converters 12, 13 are supplied to a frame memory 14 for storage. The frame memory 14 stores the brightness signal in a brightness signal frame memory 15, while storing the color difference signal in a color difference signal frame memory 16.

Figure 6:
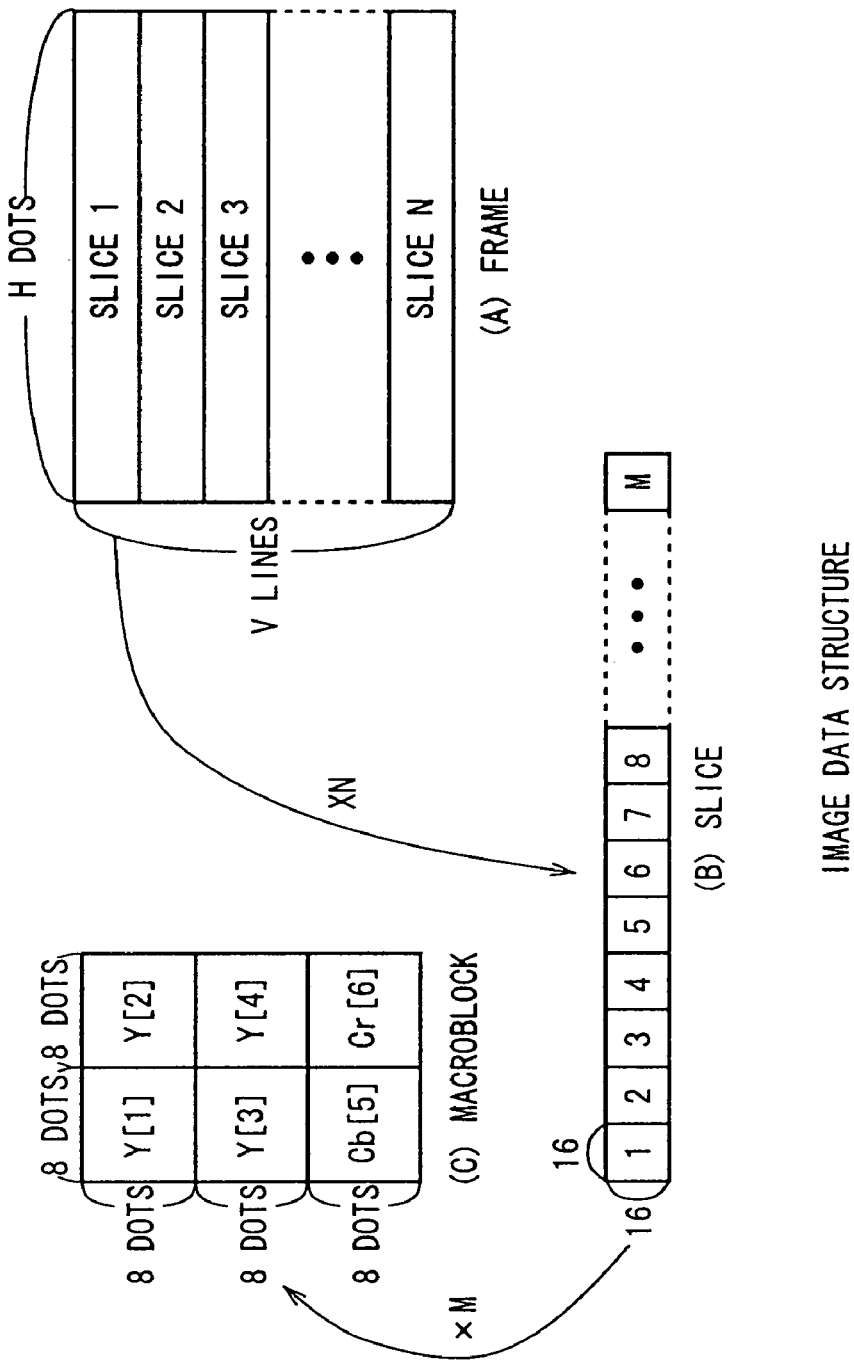
FIG. 6 is a diagram for describing the configuration of image data.

A format converting circuit 17 converts the signals stored in the frame memory 14 in a frame format, into a block format. That is, as shown in FIG. 6, the video signals stored in the frame memory 14 are of the frame format shown in FIG. 6(A), which is configured by V lines each composed of H dots. The format converting circuit 17 partitions the signal for one frame into M slices each configured by 16 lines as shown in FIG. 6(B). Each slice is divided into M macroblocks. As shown in FIG. 6(C), the macroblock is configured by a brightness signal corresponding to 16×16 pixels (dots), and this brightness signal is further partitioned into blocks Y[1] to Y[4] each configured by 8×8 dots. The brightness signal of the 16×16 dots corresponds to a Cb signal of 8×8 dots and a Cr signal of 8×8 dots.

In this manner, the data converted into the block format is supplied by the format converting circuit 17 to an encoder 18, where encoding is carried out. The details will be described with reference to FIG. 7.

A signal obtained through encoding by the encoder 18 is output to a transmission path as a bit stream. For example, the signal is supplied to a recording circuit 19 and recorded on the recording medium 3 as a digital signal.

Data reproduced from the recording medium 3 by a reproduction circuit 30 of the decoding device 2 is supplied to a decoder 31 for decoding. The details of the decoder 31 will be described below with reference to FIG. 12.

Data obtained through decoding by the decoder 31 is input to a format converting circuit 32, where the block format is converted into the frame format. Then, the brightness signal in the frame format is supplied to a brightness signal frame memory 34 of a frame memory 33 for storage, and the color difference signal is supplied to a color difference frame memory 35 for storage. The brightness and color difference signals are read out from the brightness signal frame memory 34 and the color difference signal frame memory 35, respectively, and subsequently converted by D/A converters 36, 37 into analog signals, which are then supplied to a postprocess circuit 38. The postprocess circuit 38 synthesizes the brightness and color difference signals before output.

Figure 7:
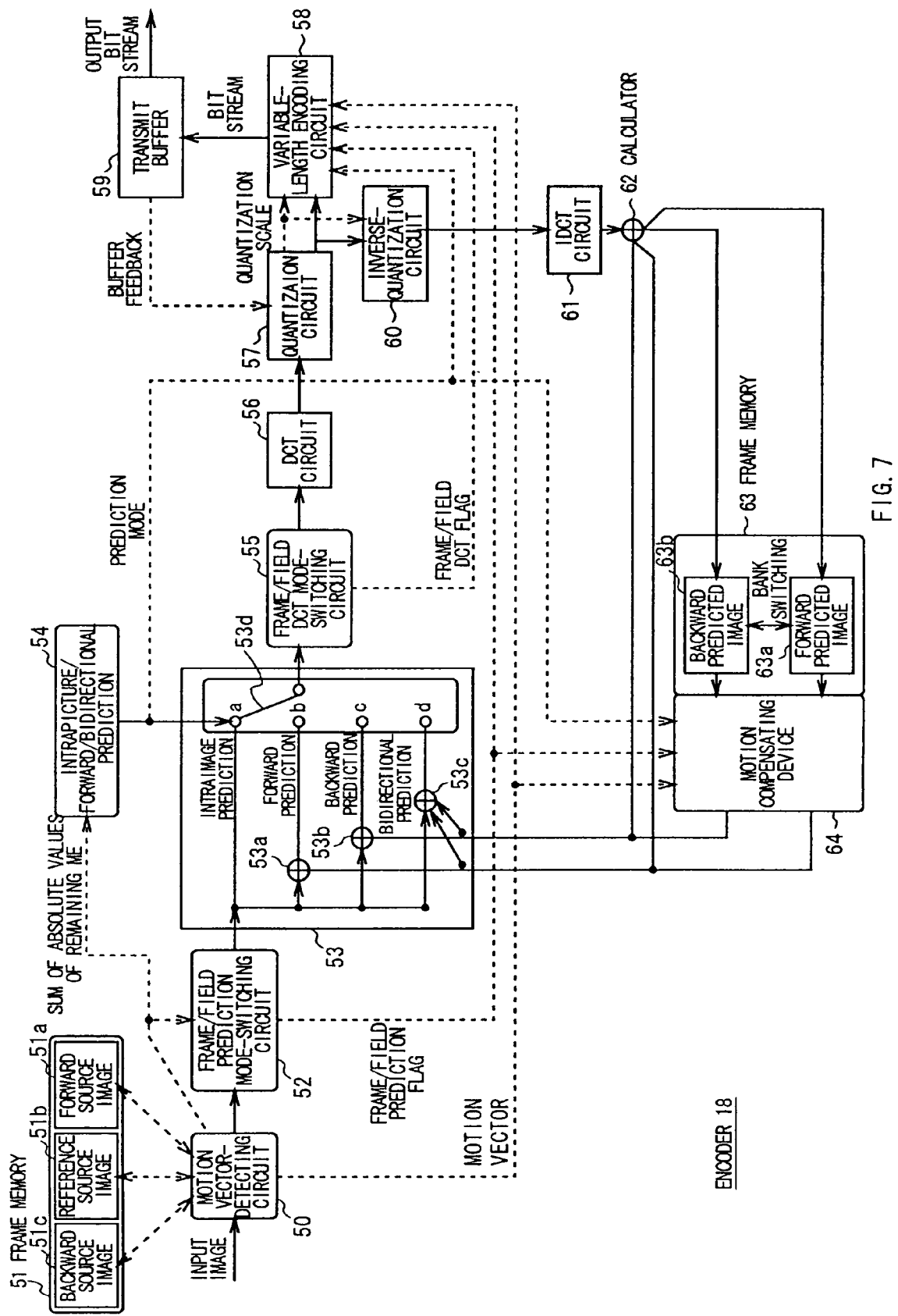
FIG. 7 is a block diagram showing the configuration of an encoder 18 in FIG. 5.

Next, the configuration of the encoder 18 will be described with reference to FIG. 7. Image data to be encoded is input to a motion vector-detecting circuit 50 in terms of macroblocks. The motion vector-detecting circuit 50 processes the image data in each frame as the I, P, or B picture in accordance with a preset predetermined sequence. Whether the sequentially input image in each frame is processed as the I, P, or B picture is determined beforehand (for example, the group of pictures configured by the frames F1 to F17 are processed as I, B, P, B, P, . . . , B, P as shown in FIGS. 2 and 3).

The image data in a frame to be processed as the I picture (for example, the frame F1) is transferred from the motion vector-detecting circuit 50 to a forward original-image section 51a of the frame memory 51 for storage. The image data in a frame to be processed as the B picture (for example, the frame F2) is transferred to an original-image section 51b for storage. The image data in a frame to be processed as the P picture (for example, the frame F3) is transferred to a backward original-image section 51c for storage.

In addition, when an image in a frame to be processed as the B picture (the frame F4) or the P picture (the frame F5) is input in accordance with the next timing, the image data in the first P picture (the frame F3) stored in the backward original-image section 51c is transferred to the forward original-image section 51a; the image data in the next B picture (the frame F4) is stored in the reference original-image section 51b (the data is overwritten on the section 51b); and the image data in the next P picture (the frame F5) is stored in the backward original-image section 51c (the data is overwritten on the section 51c). Such operations are sequentially repeated.

The signals for each picture stored in the frame memory 51 are read out therefrom and transferred to a prediction mode-switching circuit 52, where a frame prediction mode process or a field prediction mode process is carried out.

Further, under the control of a prediction determining circuit 54, a calculator 53 executes a calculation for an intraimage prediction, a forward prediction, a backward prediction, or a bidirectional prediction. Which process is carried out depends on a prediction error signal (the differential between a reference image to be processed and a predicted image). Thus, the motion vector-detecting circuit 50 generates the absolute sum (or square sum) of prediction error signals used for this determination.

Then, a frame prediction mode and a field prediction mode in the prediction mode-switching circuit 52 will be described.

Figure 8:
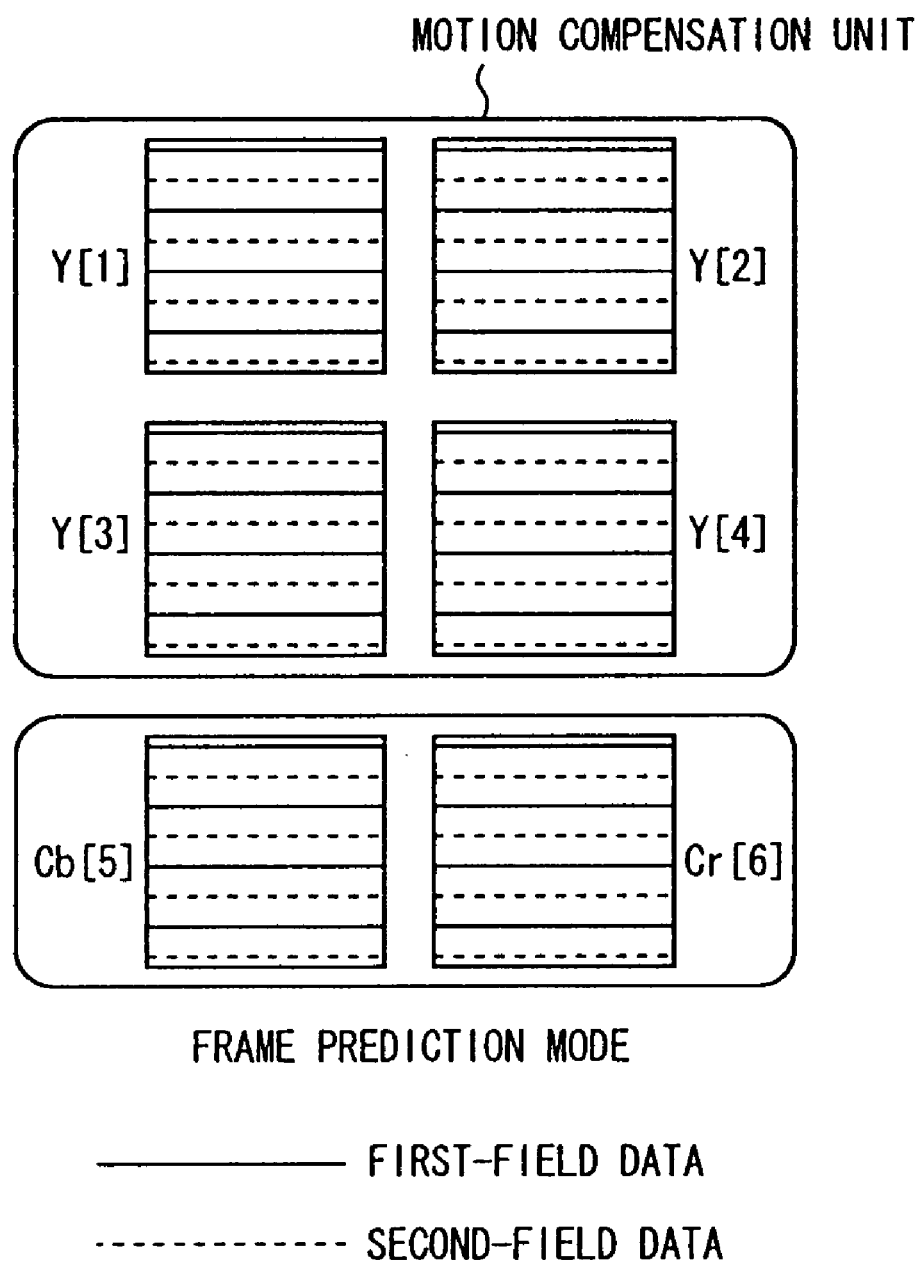
FIG. 8 is a diagram for describing the operation of a prediction mode-switching circuit 52 in FIG. 7.

If the frame prediction mode is set, the prediction mode-switching circuit 52 outputs the four brightness blocks Y[1] to Y[4] supplied by the motion vector-detecting circuit 50, to the following calculator 53 as they are. That is, in this case, data in odd-number field lines and data in even-number field lines are mixed in each brightness block as shown in FIG. 8. In the frame prediction mode, predictions are carried out using four brightness blocks (macroblocks) at a time, and the four brightness blocks correspond to one motion vector.

Figure 9:
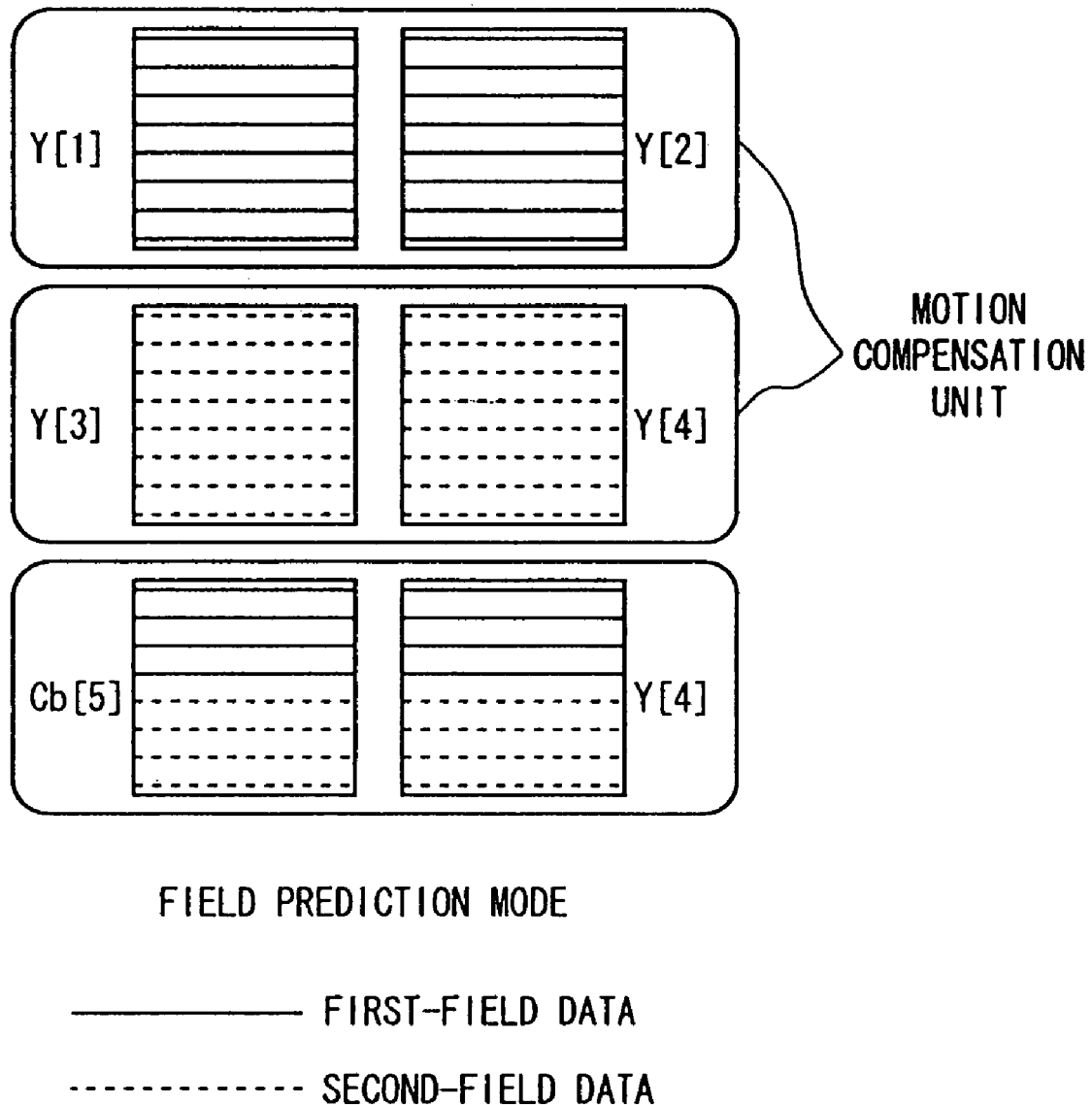
FIG. 9 is a diagram for describing the operation of the prediction mode-switching circuit 52 in FIG. 7.

On the contrary, in the field prediction mode, the prediction mode-switching circuit 52 configures, before output to the calculator 53, a signal input from the motion vector-detecting circuit 50 and configured as shown in FIG. 8 so that of the four brightness blocks, the brightness blocks Y[1] and Y[2] are comprised, for example, of the dots in the odd-number field lines, while the two other brightness blocks Y[3] and Y[4] are configured by the dots in the even-number field lines, as shown in FIG. 9. In this case, the two brightness blocks Y[1] and Y[2] correspond to one motion vector, whereas the two other brightness blocks Y[3] and Y[4] correspond to another motion vector.

The motion vector-detecting circuit 50 outputs the absolute sums of prediction errors in the frame and field prediction modes to the prediction mode-switching circuit 52. The prediction mode-switching circuit 52 compares the absolute sums of prediction errors in the frame and field prediction modes together and then executes processing corresponding to the prediction mode with the smaller value before outputting data to the calculator 53.

In fact, such processing is executed by the motion vector-detecting circuit 50. That is, the motion vector-detecting circuit 50 outputs a signal configured correspondently to the determined mode to the prediction mode-switching circuit 52, whereas the prediction mode-switching circuit 52 outputs this signal to the following calculator 53 as it is.

In the frame prediction mode, the color difference signal with the data in the odd-number field lines and the data in the even-number field lines mixed therein as shown in FIG. 8 is delivered to the calculator 53. Additionally, in the field prediction mode, the upper half (four lines) of each color difference block Cb, Cr constitutes a color difference signal for the odd-number fields corresponding to the brightness blocks Y[1], Y[2], while the lower half (four lines) constitutes a color difference signal for the even-number fields corresponding to the brightness blocks Y[3], Y[4], as shown in FIG. 9.

In addition, the motion vector-detecting circuit 50 uses the prediction determining circuit 54 to generate the absolute sum of prediction errors required to select one of the intraimage prediction, the forward prediction, the backward prediction, and the bidirectional prediction which is to be executed, as shown below.

As the absolute sum of the intraimage prediction errors, the difference between the absolute value |ΣAij| of the sum ΣAij of macroblock signals Aij for the reference image and the sum Σ|Aij| of the absolute values ≡$A_{ij}$| of the macroblock signals Aij is determined. As the absolute sum of the forward prediction errors, the sum Σ|Aij−Bij| of the absolute values |Aij−Bij| of the differences Aij−Bij between the macroblock signals Aij for the reference image and macroblock signals Bij for a predicted image is determined. The absolute sums of the backward prediction errors and bidirectional prediction errors are also determined as in the forward prediction (the predicted image is changed to one different from that in the forward prediction).

These absolute sums are supplied to the prediction determining circuit 54. The prediction determining circuit 54 selects one of the absolute sums of the forward, backward, and bidirectional prediction errors as the absolute sum of interprediction errors. The prediction determining circuit 54 further compares the absolute sum of the interprediction errors with the absolute sum of the intraimage prediction errors, selects the smaller of these two values, and selects a mode corresponding to the selected absolute sum, as a prediction mode. That is, if the absolute sum of the intraprediction errors is smaller, the intraimage prediction mode is set. If the absolute sum of the interprediction errors is smaller, one of the forward, backward, and bidirectional prediction modes which has the smallest corresponding absolute sum is set.

In this manner, the motion vector-detecting circuit 50 supplies the macroblock signals for the reference image to the calculator 53 via the prediction mode-switching circuit 52 in a manner such that the signals are configured correspondently to the mode selected by the prediction mode-switching circuit 52 in the frame or field prediction mode. The motion vector-detecting circuit 50 then detects a motion vector between the predicted image and the reference image which corresponds to one of the four prediction modes which is selected by the prediction determining circuit 54, and outputs the vector to a variable-length encoding circuit 58 and a motion compensating circuit 64. As described above, this motion vector is selected to have the smallest corresponding absolute sum of prediction errors.

While the motion vector-detecting circuit 50 is reading the I picture image data out from the forward original-image section 51a, the prediction determining circuit 54 sets an intraframe or intrafield (image) prediction mode (a mode without motion compensations) and switches a switch 53d of the calculator 53 to a contact a. Thus, the I picture image data is input to a DCT mode-switching circuit 55.

Figure 10:
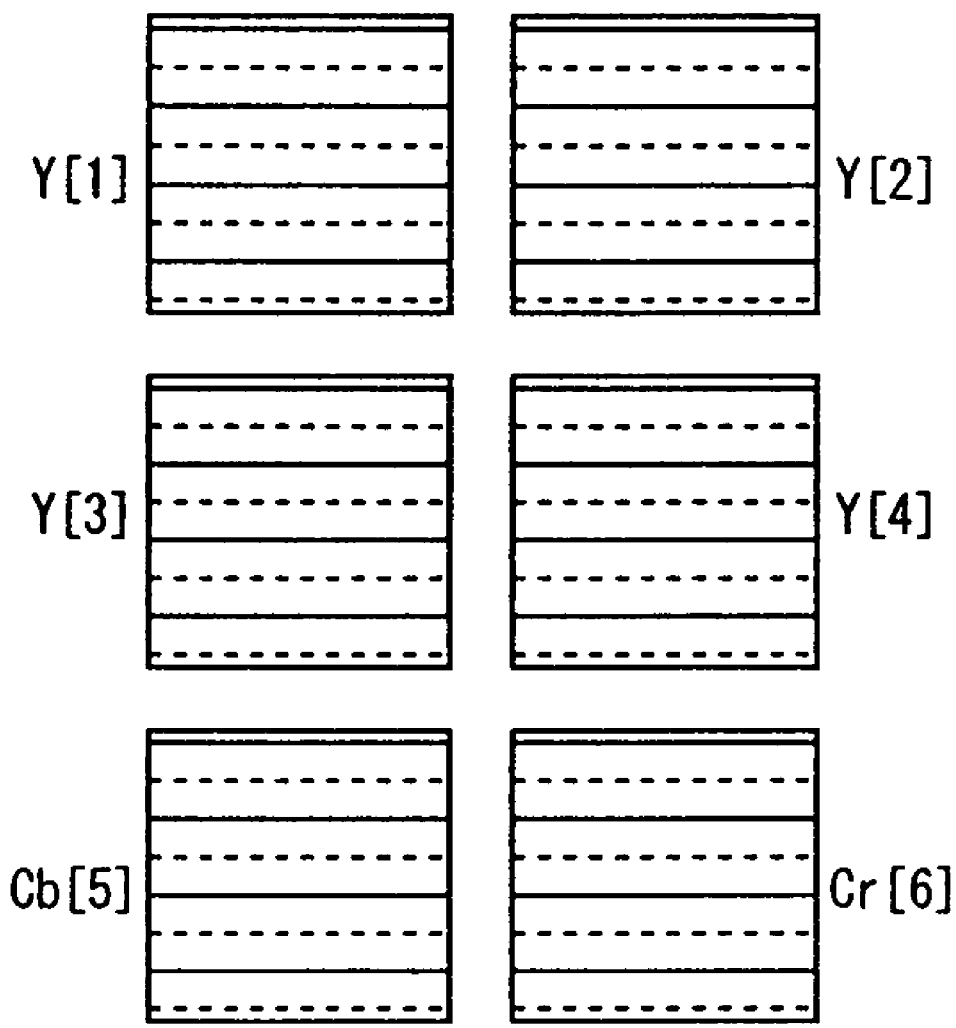
FIG. 10 is a diagram for describing the operation of the prediction mode-switching circuit 52 in FIG. 7.
Figure 11:
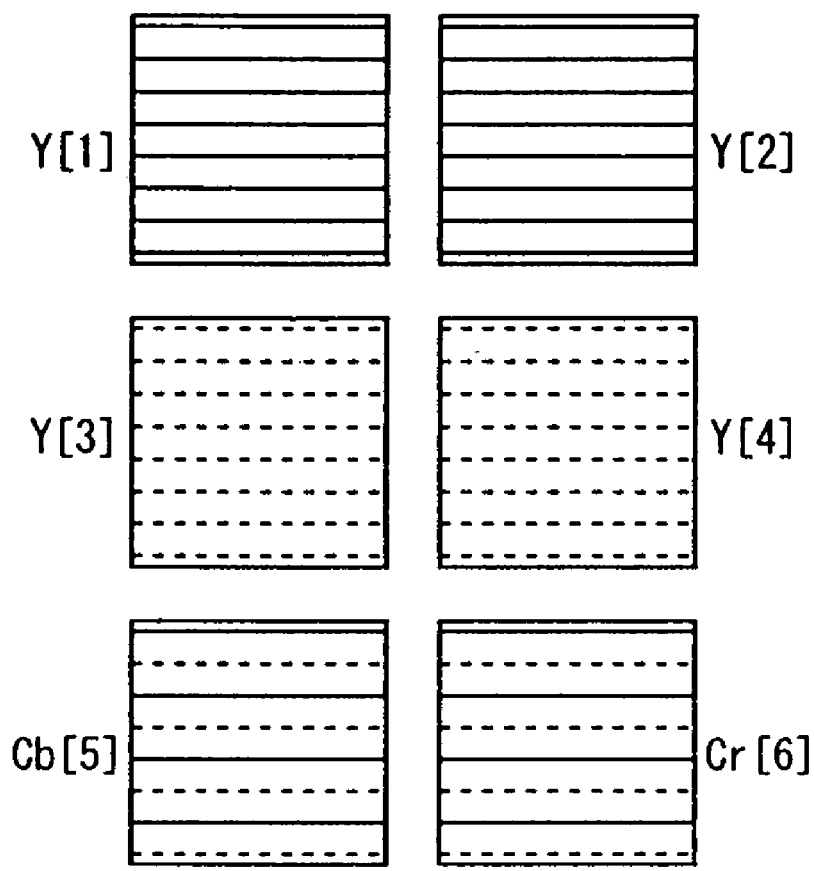
FIG. 11 is a diagram for describing the operation of the prediction mode-switching circuit 52 in FIG. 7.

The DCT mode-switching circuit 55 configures the data in the four brightness blocks so that the odd- and even-number field lines are mixed together (a frame DCT mode) or these two types of field lines are separated from each other (a field DCT mode), as shown in FIG. 10 or 11, and then outputs the configured data to a DCT circuit 56.

That is, the DCT mode-switching circuit 55 compares an encoding efficiency achieved by a DCT process with the odd- and even-number field lines mixed together, with an encoding efficiency achieved by a DCT process with the odd- and even-number field lines separated from each other, to select a mode with a higher encoding efficiency.

For example, the input signal is configured so that the odd- and even-number field lines are mixed together as shown in FIG. 10, and the difference between the signals for each pair of the vertically adjacent odd- and even-number field lines is calculated and the sum (or square sum) of the absolute values of these differences is determined.

Additionally, the input signal is configured so that the odd-number field lines are separated from the even-number field lines as shown in FIG. 11, and the difference between the signals for each pair of the vertically adjacent odd-number field lines and the difference between the signals for each pair of the vertically adjacent even-number field lines are calculated and the sum (or square sum) of the absolute values of these differences is determined.

Further, both absolute values are compared to set a DCT mode corresponding to the smaller value. That is, if the former is smaller, the frame DCT mode is set, whereas if the latter is smaller, the field DCT mode is set.

Data configured correspondently to the selected DCT mode is output to the DCT circuit 56, and a DCT flag indicating the selected DCT mode is output to the variable-length encoding circuit 58 and the motion compensating circuit 64.

As is clear from comparison between the prediction mode (FIGS. 8 and 9) in the prediction mode-switching circuit 52 and the DCT mode (FIGS. 10 and 11) in the DCT mode-switching circuit 55, the data structures of the brightness blocks in both modes are substantially identical.

If the prediction mode-switching circuit 52 selects the frame prediction mode (the odd- and even-number lines are mixed together), then the DCT mode-switching circuit 55 is likely to select the frame DCT mode (the odd- and even-number lines are mixed together). Additionally, if the prediction mode-switching circuit 52 selects the field prediction mode (the odd- and even-number field data are separated from each other), then the DCT mode-switching circuit 55 is likely to select the field DCT mode (the odd- and even-number field data are separated from each other).

The mode, however, is not always selected in this manner, but the prediction mode-switching circuit 52 determines the mode so as to minimize the absolute sum of prediction errors, while the DCT mode-switching circuit 55 determines the mode so as to achieve a high encoding efficiency.

The I picture image data output by the DCT mode-switching circuit 55 is input to the DCT circuit 56, where the DCT process is carried out to convert the data into a DCT coefficient. This DCT coefficient is input to a quantization circuit 57, where it is quantized using a quantization scale corresponding to the amount of data stored in a transmit buffer 59 (the amount of stored data in the buffer). The quantized data is then input to a variable-length encoding circuit 58.

The variable-length encoding circuit 58 converts the image data (in this case, the I picture data) supplied by the quantization circuit 57 into variable-length codes such as Huffman codes in a fashion corresponding to the quantization scale (scale) supplied by the quantization circuit 57 before output to the transmit buffer 59.

The variable-length encoding circuit 58 also has input thereto the quantization scale (scale) from the quantization circuit 57, the prediction mode (indicating one of the intraimage prediction, the forward prediction, the backward prediction, and the bidirectional prediction which is to be set) from the prediction determining circuit 54, the motion vector from the motion vector-detecting circuit 50, and the prediction flag (indicating whether the frame or field prediction mode is set) from the prediction mode-switching circuit 52, the DCT flag (indicating whether the frame or field DCT mode is set) output by the DCT mode-switching circuit 55, which are all variable-length encoded.

The transmit buffer 59 temporarily stores the input data and outputs data corresponding to the amount of stored data to the quantization circuit 57. When the amount of remaining data increases up to an allowable upper limit value, the transmit buffer 59 uses a quantization controlling signal to augment the quantization scale for the quantization circuit 57 in order to reduce the amount of quantized data. In contrast, when the amount of remaining data decreases down to an allowable lower limit value, the transmit buffer 59 uses the quantization controlling signal to diminish the quantization scale for the quantization circuit 57 in order to increase the amount of quantized data. In this fashion, the transmit buffer 59 is prevented from overflowing or underflowing.

The data stored in the transmit buffer 59 is read out in accordance with predetermined timings and output to the transmission path. The data is then recorded on the recording medium 3 via, for example, the recording circuit 19.

On the other hand, the I picture data output by the quantization circuit 57 is input to an inverse-quantization circuit 60, where it is inversely quantized in a fashion corresponding to the quantization scale supplied by the quantization circuit 57. An output from the inverse-quantization circuit 60 is input to an IDCT (Inverse Discrete Cosine Transformation) circuit 61 for inverse discrete cosine transformation, and the result is supplied to a forward-predicted image section 63a of a frame memory 63 via a calculator 62 for storage.

In processing the image data in sequentially input frames as, for example, the I, B, P, B, P, B, . . . pictures, the motion vector-detecting circuit 50 processes the image data in the first input frame as the I picture, and before processing the image in the next input frame as the B picture, processes the image data in the next input frame as the P picture. This is because the B picture involves the backward prediction, so that the P picture, the backward predicted image, must be provided before the B picture can be decoded.

Thus, after the processing of the I picture, the motion vector-detecting circuit 50 starts to process the P picture image data stored in the backward original-image section 51c. Then, similarly to the case described above, the absolute sum of the interframe differentials (prediction errors) in terms of the macroblocks is supplied by the motion vector-detecting circuit 50 to the prediction mode-switching circuit 52 and the prediction determining circuit 54. The prediction mode-switching circuit 52 and the prediction determining circuit 54 set the frame/field prediction mode, or the intraimage, forward, backward, or bidirectional prediction mode depending on the absolute sum of the prediction errors in the P picture macroblocks.

When the intraimage prediction mode is set, the calculator 53 switches the switch 53d to the contact a as described above. Thus, this data, like the I picture data, is transmitted to the transmission path via the DCT mode-switching circuit 55, the DCT circuit 56, the quantization circuit 57, the variable-length encoding circuit 58, and the transmit buffer 59. In addition, this data is delivered to a backward-predicted image section 63b of the frame memory 63 via the inverse-quantization circuit 60, the IDCT circuit 61, and a calculator 62 for storage.

In addition, if the forward prediction mode is set, the switch 53d is switched to a contact b, and the image (in this case, the I picture image) data stored in the forward-predicted image section 63a of the frame memory 63 is read out and subjected to motion compensation by the motion compensating circuit 64 in a fashion corresponding to the motion vector output by the motion vector-detecting circuit 50. That is, when the prediction determining circuit 54 commands the forward prediction mode to be set, the motion compensating circuit 64 reads out data by shifting a readout address into the forward-predicted image section 63a, from a position corresponding to the macroblock currently output by the motion vector-detecting circuit 50, by an amount corresponding to the motion vector. The motion compensating circuit 64 thereby generates predicted image data.

The predicted image data output by the motion compensating circuit 64 is supplied to a calculator 53a. The calculator 53a subtracts from the macroblock data on the reference image supplied by the prediction mode-switching circuit 52, the predicted image data corresponding to this macroblock and supplied by the motion compensating circuit 65, to output the differential (predicted error). This differential data is transmitted to the transmission path via the DCT mode-switching circuit 55, the DCT circuit 56, the quantization circuit 57, the variable-length encoding circuit 58, and the transmit buffer 59. Additionally, this differential data is locally decoded by the inverse-quantization circuit 60 and the IDCT circuit 61 before input to the calculator 62.

The same predicted image data as supplied to the calculator 53a is also delivered to the calculator 62. The calculator 62 adds the predicted image data output by the motion compensating circuit 64 to the differential data output by the IDCT circuit 61. Consequently, image data on the original (decoded) P picture is obtained. The P picture image data is supplied to the backward-predicted image section 63b of the frame memory 63 for storage.

Once the I and P picture data have been stored in the forward- and backward-predicted image sections 63a and 63b, respectively, the motion vector-detecting circuit 50 processes the B picture. The prediction mode-switching circuit 52 and the prediction determining circuit 54 set the frame/field mode depending on the magnitude of the absolute sum of the interframe differences in terms of the macroblocks, and set one of the intraimage prediction mode, the forward prediction mode, the backward prediction mode, and the bidirectional prediction mode.

As described above, in the intraimage or forward prediction mode, the switch 53d is switched to the contact a or b, respectively. At this point, processing similar to that for the P picture is carried out to transmit the data.

In contrast, when the backward or bidirectional prediction mode is set, the switch 53d is switched to a contact c or d, respectively.

In the backward prediction mode with the switch 53d switched to the contact c, the image (in this case, the P picture image) data stored in the backward-predicted image section 63b is read out and subjected to motion compensation by the motion compensating circuit 64 in a fashion corresponding to the motion vector output by the motion vector-detecting circuit 50. That is, when the prediction determining circuit 54 commands the backward prediction mode to be set, the motion compensating circuit 64 reads out data by shifting a readout address into the backward-predicted image section 63b, from a position corresponding to the macroblock currently output by the motion vector-detecting circuit 50, by an amount corresponding to the motion vector. The motion compensating circuit 64 thereby generates predicted image data.

The predicted image data output by the motion compensating circuit 64 is supplied to a calculator 53b. The calculator 53b subtracts from the macroblock data on the reference image supplied by the prediction mode-switching circuit 52, the predicted image data supplied by the motion compensating circuit 64, to output the differential. This differential data is transmitted to the transmission path via the DCT mode-switching circuit 55, the DCT circuit 56, the quantization circuit 57, the variable-length encoding circuit 58, and the transmit buffer 59.

In the bidirectional prediction mode with the switch 53d switched to the contact d, the image (in this case, the I picture image) data stored in the forward-predicted image section 63a and the image (in this case, the P picture image) data stored in the backward-predicted image section 63b are read out and subjected to motion compensation by the motion compensating circuit 64 in a fashion corresponding to the motion vector output by the motion vector-detecting circuit 50.

That is, when the prediction determining circuit 54 commands the bidirectional prediction mode to be set, the motion compensating circuit 64 reads out data by shifting readout addresses into the forward- and backward-predicted image sections 63a and 63b, from a position corresponding to the macroblock currently output by the motion vector-detecting circuit 50, by an amount corresponding to the motion vector (in this case, two motion vectors are used for forward and backward predictions). The motion compensating circuit 64 thereby generates predicted image data.

The predicted image data output by the motion compensating circuit 64 is supplied to a calculator 53c. The calculator 53c subtracts from the macroblock data on the reference image supplied by the motion vector-detecting circuit 50, the average value of the predicted image data supplied by the motion compensating circuit 64, to output the differential. This differential data is transmitted to the transmission path via the DCT mode-switching circuit 55, the DCT circuit 56, the quantization circuit 57, the variable-length encoding circuit 58, and the transmit buffer 59.

Since the B picture image is not used as a predicted image for other images, it is not stored in the frame memory 63.

In the frame memory 63, the forward- and backward-predicted image sections 63a and 63b can carry out bank switching as required to switch to the data stored in one or the other of these sections in order to output it to a predetermined reference image as the forward or backward predicted image.

Although the above description focuses on the brightness blocks, the color difference blocks are similarly processed and transmitted in terms of the macroblocks shown in FIGS. 8 to 11. The motion vector used to process the color difference blocks is obtained by reducing the motion vector for the corresponding brightness blocks to half in both vertical and horizontal directions.

Figure 12:
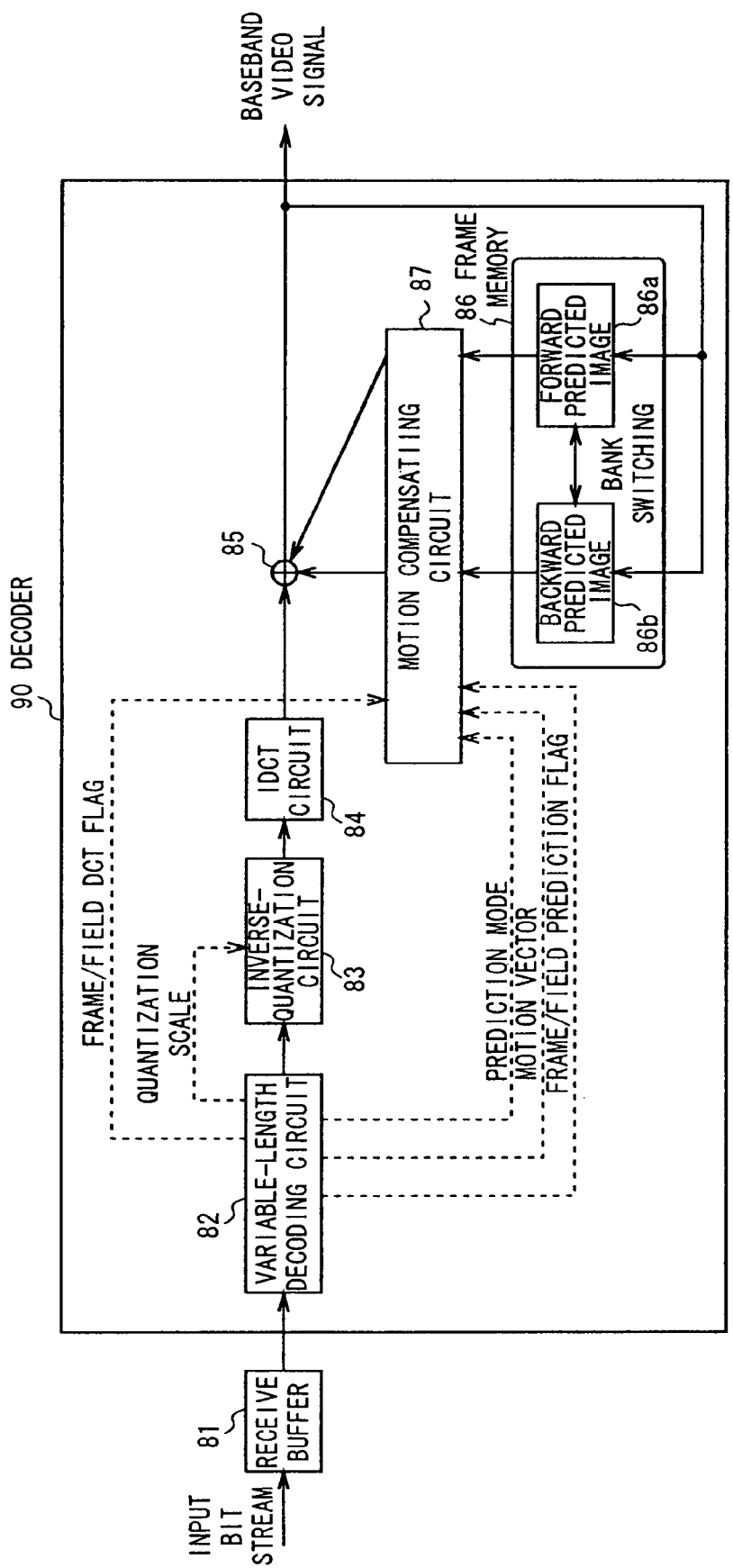
FIG. 12 is a block diagram showing the configuration of a decoder 31 in FIG. 5.

FIG. 12 is a block diagram showing the configuration of the decoder 31 in FIG. 5. The encoded image data transmitted via the transmission path (the recording medium 3) is received by a reception circuit (not shown) or is reproduced by a reproducting device and temporarily stored in a reception buffer 81 for supply to a variable-length decoding circuit 82 of a decoding circuit 90. The variable-length decoding circuit 82 subjects the data supplied by the reception buffer 81 to variable-length decoding and outputs the obtained motion vector, prediction mode, prediction flag, and DCT flag to a motion compensating circuit 87. The variable-length decoding circuit 82 outputs the obtained quantization scale to an inverse-quantization circuit 83 and outputs the decoded image data to an inverse-quantization circuit 83.

The inverse-quantization circuit 83 inversely quantizes the image data supplied by the variable-length decoding circuit 82 in a fashion corresponding to the quantization scale supplied by the variable-length decoding circuit 82, to output the inversely quantized data to an IDCT circuit 84. The data (DCT coefficient) output by the inverse-quantization circuit 83 is subjected to inverse discrete cosine transformation by the IDCT circuit 84 and the processed data is delivered to a calculator 85.

If the image data delivered to the calculator 85 by the IDCT circuit 84 is for the I picture, it is output by the calculator 85 and supplied to a forward-predicted image section 86a of a frame memory 86 for storage in order to generate predicted image data for the image data (the P or B picture data) input to the calculator 85 later. Additionally, this data is output to the format converting circuit 32 (FIG. 5).

If the image data delivered by the IDCT circuit 84 is for the P picture, which uses the image data in the preceding frame as the predicted image data, and is in the forward prediction mode, then the image data (the I picture data) in the preceding frame stored in the forward-predicted image section 86a of the frame memory 86 is read out and subjected to motion compensation by the motion compensating circuit 87 in a fashion corresponding to the motion vector output by the variable-length decoding circuit 82. The resulting data is added by the calculator 85 to the image data (differential data) supplied by the IDCT circuit 84, and the data thus obtained is output. The data resulting from the addition, that is, the decoded P picture data is supplied to a backward-predicted image section 86b of the frame memory 86 for storage in order to generate predicted image data for the image data (the B or P picture data) input to the calculator 85 later.

Like the I picture data, data in the intraimage prediction mode is stored in the backward-predicted image section 86b without being processed by the calculator 85, even if it is for the P picture.

This P picture is to be displayed after the next B picture, so that it is not output to the format converting circuit 32 at this point (as described above, the Ppicture input after the Bpicture is processed and transmitted before the B picture).

If the image data delivered by the IDCT circuit 84 is for the B picture, the I picture image data stored in the forward-predicted image section 86a of the frame memory 86 (in the case of the forward prediction mode), the P picture image data stored in the backward-predicted image section 86b of the frame memory 86 (in the case of the backward prediction mode), or both of these image data (in the case of the bidirectional prediction mode) is read out depending on the prediction mode supplied by the variable-length decoding circuit 82, and is then subjected to motion compensation by the motion compensating circuit 87 in a fashion corresponding to the motion vector supplied by the variable-length decoding circuit 82. A predicted image is thereby generated. No predicted image, however, is generated if no motion compensation is required (in the case of the intraimage prediction mode).

The data subjected to the motion compensation by the motion compensating circuit 87 in the above manner is added by the calculator 85 to the output from the IDCT circuit 84. This addition output is provided for the format converting circuit 32.

This addition output, however, comprises the B picture data and is not used to generate a predicted image for other images. Thus, it is not stored in the frame memory 86.

After the outputting of the B picture image, the P picture image data stored in the backward-predicted image section 86b is read out and supplied to the calculator 85 via the motion compensating circuit 87. However, no motion compensation is provided at this point.

Although the illustrated decoder 31 has no circuit corresponding to the prediction mode-switching circuit 52 and DCT mode-switching circuit 55 in the encoder 18 in FIG. 5, the motion compensating circuit 87 carries out processing corresponding to these circuits, that is, one for recovering the configuration in which odd-number field line signals are separated from even-number field line signals, to the original configuration.

In addition, although the above description is for the processing of the brightness signals, the color difference signals are similarly processed. In this case, however, the motion vector is obtained by reducing the motion vector for the brightness signals to half in both vertical and horizontal directions.

Figure 13:
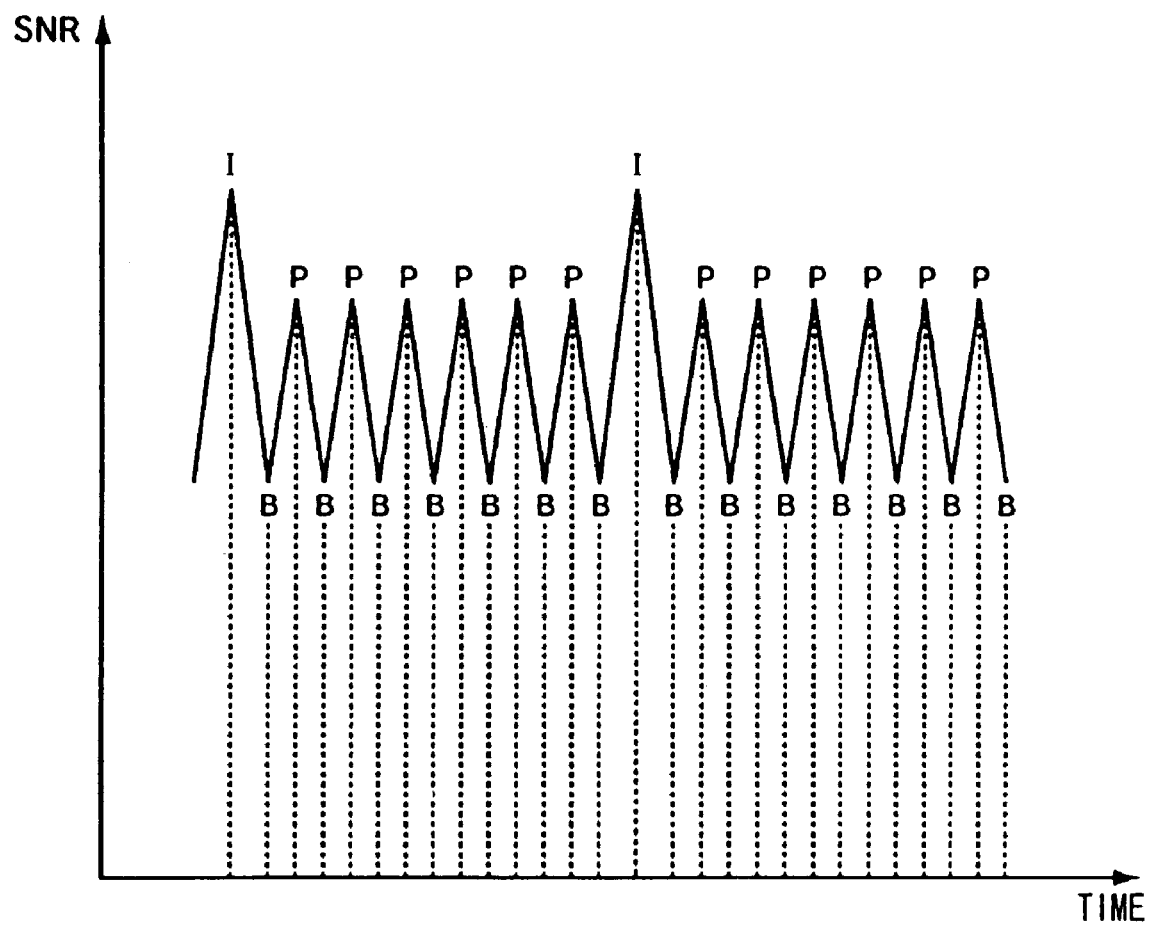
FIG. 13 is a diagram for describing SNR control corresponding to the picture type.

FIG. 13 shows the quality of encoded images. The quality (SNR: Signal to Noise Ratio) of images is controlled correspondently to the picture type in a manner such that I and P pictures are both of a high quality, while the B picture has a lower quality than the I and P pictures. This method utilizes human visual characteristics; that is, a higher visual quality is obtained by vibrating the quality of each image than by leveling out the quality of all images. The control of image quality depending on the picture type is executed by the quantization circuit 57 in FIG. 7.

Figure 14:
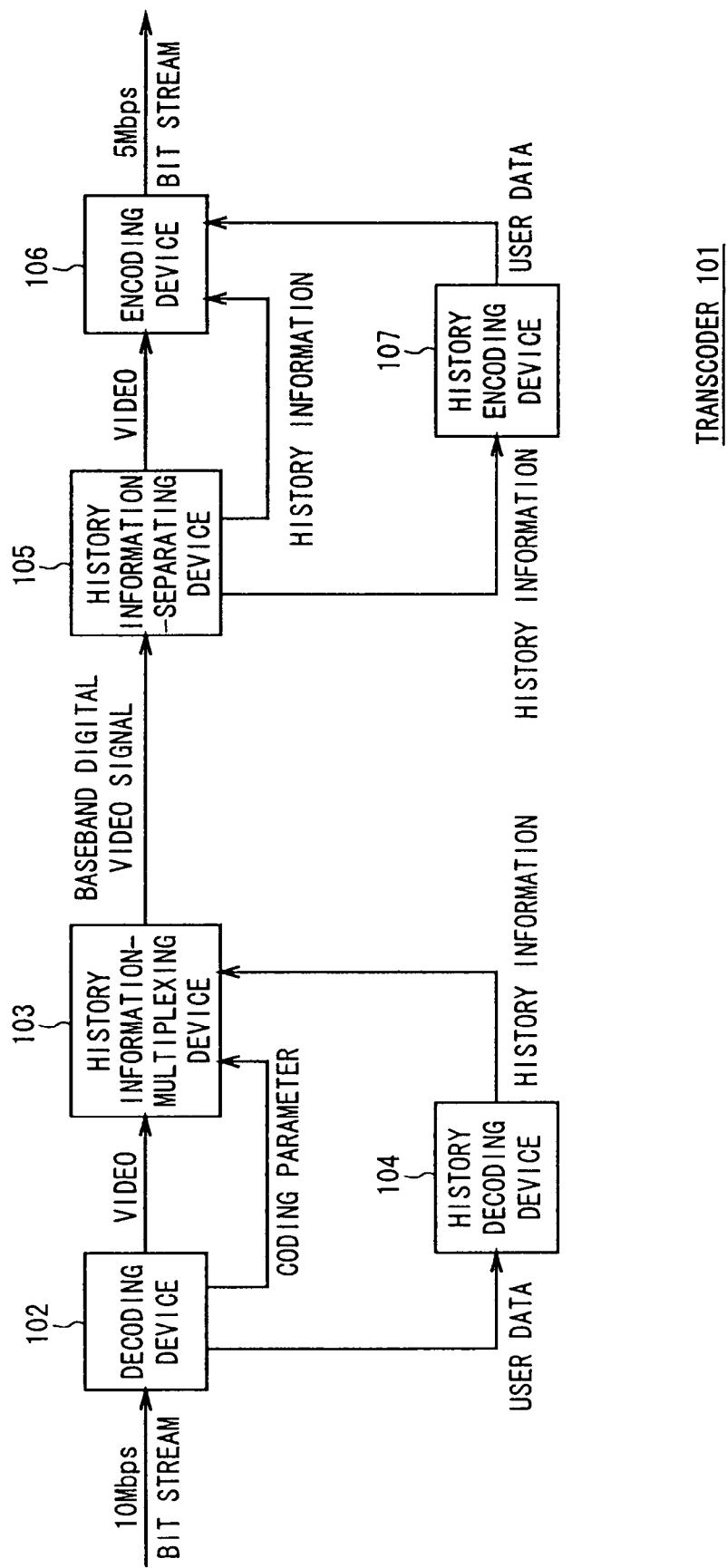
FIG. 14 is a block diagram showing the configuration of a transcoder 101 to which the present invention is applied.
Figure 15:
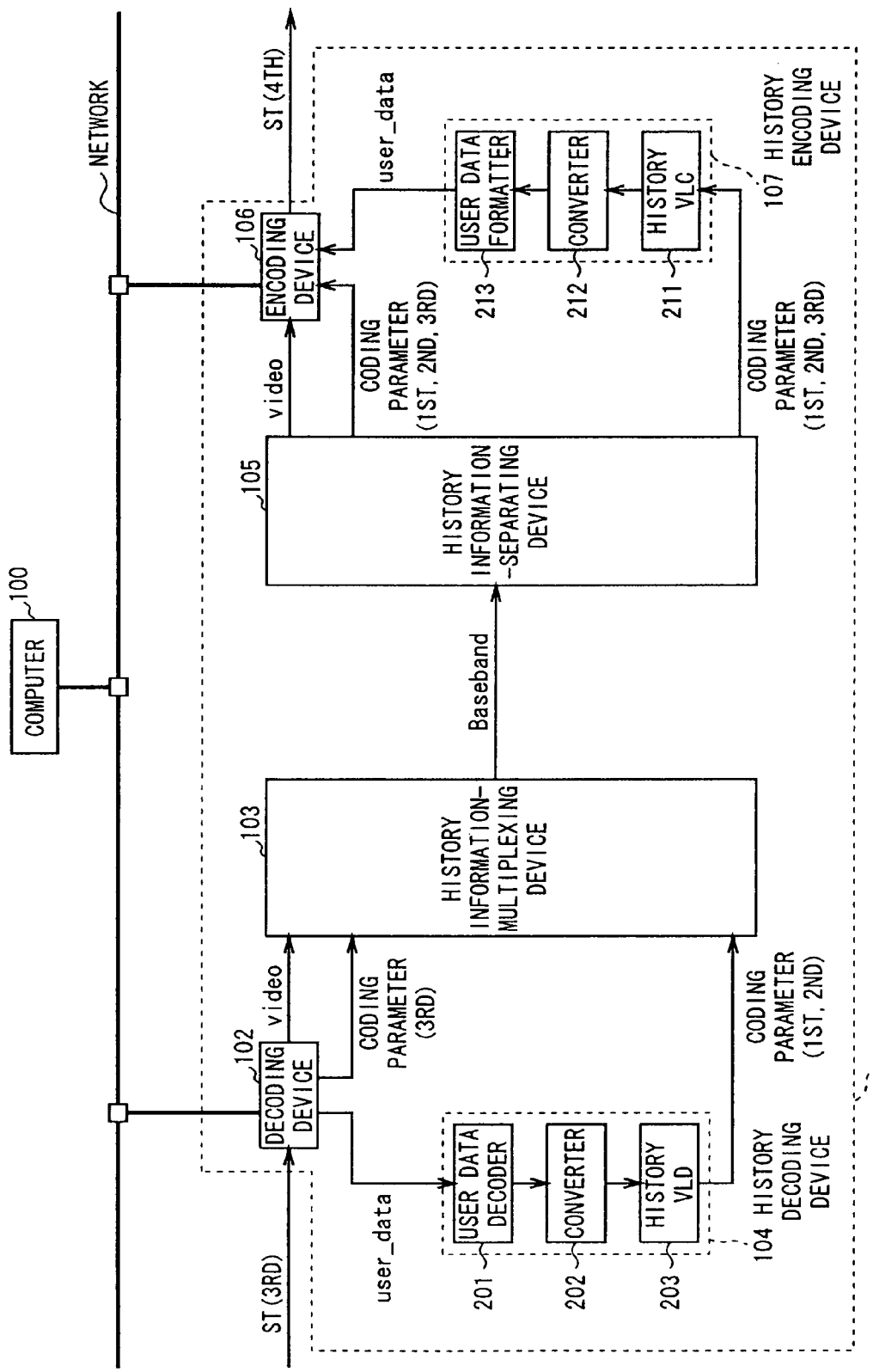
FIG. 15 is a block diagram showing the configuration of the transcoder 101 in FIG. 14 in detail.

FIGS. 14 and 15 show the configuration of a transcoder 101 to which the present invention is applied; FIG. 15 shows the detailed configuration of FIG. 14. The transcoder 101 converts the GOP structure and bit rate of an encoded video bit stream input to a decoding device 102 into those desired by an operator. To explain the functions of the transcoder 101, three transcoders having functions similar to those of the transcoder 101 are assumed to be connectively located before the transcoder 101, though not shown in FIG. 15. That is, in order to vary the GOP structure and bit rate of a bit stream, the first, second, and third transcoders are connected in series in this order, and a fourth transcoder, shown in FIG. 15, is connectively located after the third transcoder.

In the following description of the present invention, an encoding process carried out in the first transcoder is defined as a first-generation encoding process, one in the second transcoder, which is connectively located after the first transcoder, is defined as a second-generation encoding process, one in the third transcoder, which is connectively located after the second transcoder, is defined as a third-generation encoding process, and one in the fourth transcoder (the transcoder 101 shown in FIG. 15), which is connectively located after the third transcoder, is defined as a fourth-generation encoding process or current encoding process.

In addition, encoding parameters generated during the first-generation encoding process are called "first-generation encoding parameters," encoding parameters generated during the second-generation encoding process are called "second-generation encoding parameters," encoding parameters generated during the third-generation encoding process are called "third-generation encoding parameters," and encoding parameters generated during the fourth-generation encoding process are called "fourth-generation encoding parameters."

First, an encoded video stream ST(3rd) supplied to the transcoder 101 shown in FIG. 15 will be described. The ST(3rd) represents a third-generation encoded stream generated during the third-generation encoding process carried out by the third transcoder provided before the transcoder 101. In the encoded video stream ST(3rd) generated during the third-generation encoding process, the third-generation encoding parameters generated during the third encoding process are described in a sequence layer, a GOP layer, a picture layer, a slice layer, and a macroblock layer of this encoded video stream ST(3rd) as a sequence_header( ) function, a sequence_extension( ) function, a group_of_pictures_header( ) function, a picture_header( ) function, a picture_coding_extension( ) function, a picture_data( ) function, a slice( ) function, and a macroblock( ) function. The description of the third encoding parameters used during the third encoding process in the third encoded stream generated during the third encoding process is defined in the MPEG2 standard and has no novelty.

The transcoder 101 according to the present invention is unique in that the third encoded stream ST(3rd) has described therein the third encoding parameters as well as the first- and second-generation encoding parameters generated during the first and second encoding processes, respectively.

Specifically, the first- and second-generation encoding parameters are described in a user data area of the picture layer of the third-generation encoded video stream ST(3rd) as a history stream history_stream( ). In the present invention, the history stream described in the user data area of the picture layer of the third-generation encoded video stream ST(3rd) is called "history information," and the encoding parameters described in the history stream is called "history parameters."

Alternatively, if the third-generation encoding parameters described in the third-generation encoded stream ST(3rd) are called the "current encoding parameters," since the first- and second-generation encoding processes are carried out before the third-generation process, the encoding parameters described as history stream in the user data area of the picture layer of the third-generation encoded stream ST(3rd) are also called "past encoding parameters."

The reason why the third encoded stream ST(3rd) has described therein the third encoding parameters as well as the first- and second-generation encoding parameters generated during the first and second encoding processes, respectively, as described above is that the image quality can be prevented from degradation even with repeated changes in the GOP structure or bit rate of the encoded stream through a transcoding process.

For example, it is contemplated that a picture may be encoded into the P type during the first-generation encoding process, that this P picture may be encoded into the B type during the second-generation encoding process in order to change the GOP structure of the first-generation encoded stream, and that this B picture may be encoded back into the P type during the third-generation encoding process in order to further change the GOP structure of the second-generation encoded stream. It is known that since the encoding and decoding processes based on the MPEG standard are not 100% reversible, the image quality may be degraded with repetition of these processes.

In this case, the encoding parameters such as the quantization scale, the motion vector, and the prediction mode which have been generated during the first-generation encoding process are reused during the third-generation encoding process instead of calculating these encoding parameters again during the latter process. The encoding parameters such as the quantization scale, the motion vector, and the prediction mode which have been generated by the first-generation encoding process are evidently more accurate than these parameters newly generated by the third-generation encoding process, so that the reuse of the first-generation parameters can lessen degradation of the image quality despite repetition of the encoding and decoding processes.

The above described processing according to the present invention will be described in further detail by taking, by way of example, processing carried out by the fourth-generation transcoder 101 shown in FIG. 15.

A decoding device 102 uses the third-generation encoding parameters to decode encoded videos from the third-generation encoded bit stream ST(3rd) and generates digital video data for the decoded basebands. Further, the decoding device 102 also decodes the first and second encoding parameters described as history stream in the user data area of the picture layer of the third-generation encoded bit stream ST(3rd).

Figure 16:
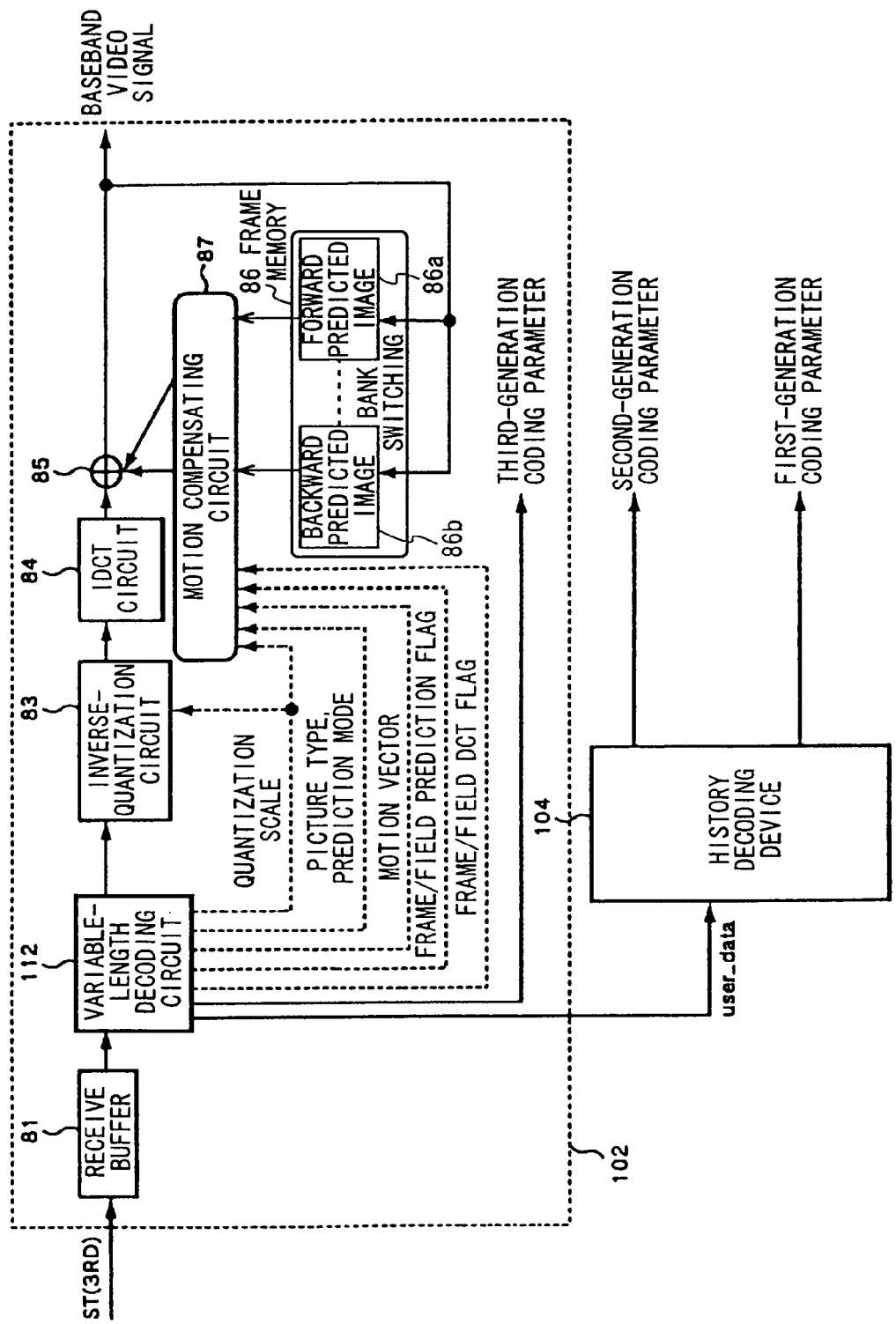
FIG. 16 is a block diagram showing the configuration of a decoding device 102 provided in a decoding apparatus 102 in FIG. 14.

Specifically, as shown in FIG. 16, the decoding device 102 is configured basically in the same manner as the decoder 31 (FIG. 12) of the decoding device 2 in FIG. 5; it comprises a reception buffer 81 for buffering a supplied bit stream, a variable-length decoding circuit 112 for subjecting the encoded bit stream to variable-length decoding, an inverse-quantization circuit 83 for inversely quantizing the variable-length-decoded data in accordance with the quantization scale supplied from the variable-length decoding circuit 112, an IDCT circuit 84 for subjecting the inversely quantized DCT coefficient to inverse discrete cosine transformation, and a calculator 85, a frame memory 86, and a motion compensating circuit 87 for carrying out a motion compensating process.

To decode the third-generation encoded bit stream ST(3rd), the variable-length decoding circuit 112 extracts the third-generation encoding parameters described in the picture, slice, and macroblock layers of the third-generation encoded bit stream ST(3rd). For example, the third-generation encoding parameters extracted by the variable-length decoding circuit 112 include picture_coding_type indicating the picture type, quantiser_scale_code indicating a quantization scale step size, macroblock_type indicating the prediction mode, motion_vector indicating the motion vector, frame/field_motion_type indicating the frame prediction mode or the field prediction mode, dct_type indicating the frame DCT mode or the field DCT mode, etc. The quantiser_scale_code extracted by the variable-length decoding circuit 112 is supplied to the inverse-quantization decoding circuit 83, and the parameters such as the picture_coding_type, quantiser_scale_code, macroblock_type, motion_vector, frame/field_motion_type, and dct_type are delivered to the motion compensating circuit 87.

The variable-length decoding circuit 112 extracts from the sequence, GOP, picture, slice, and macroblock layers of the third-generation encoded bit stream ST(3rd) not only the above encoding parameters required to decode the third-generation encoded bit stream ST(3rd) but also encoding parameters to be transmitted to the following fifth-generation transcoder as third-generation history information. Of course, the third-generation encoding parameters such as the picture_coding_type, quantiser_scale_code, macroblock_type, motion_vector, frame/field_motion_type, and dct_type which are used for the third-generation decoding process are included in the third-generation history information. Encoding parameters to be extracted as the history information are preset by the operator or a host computer depending on the transmission capacity.

Furthermore, the variable-length decoding circuit 112 extracts user data described in the user data area of the picture layer of the third-generation encoded bit stream ST(3rd), to supply this data to a history decoding device 104.

The history decoding device 104 is a circuit for extracting the first- and second-generation encoding parameters described as history information (encoding parameters preceding the preceding-generation encoding parameters) from the user data described in the picture layer of the third-generation encoded bit stream ST(3rd). Specifically, the history decoding device 104 can analyze the syntax of the received user data to detect a unique Histroy_Data_Id described in the user data, thereby extracting converted_history_stream( ). Further, the history decoding device 104 can obtain history_stream( ) by removing 1-bit marker bits (marker_bit) inserted into the converted_history_stream( ) at predetermined intervals and can analyze the syntax of the history_stream( ) to obtain the first- and second-generation encoding parameters described in the history_stream( ). The detailed description of the history decoding device 104 will be described later.

A history information-multiplexing device 103 is a circuit for multiplexing the first-, second-, and third-generation encoding parameters on baseband video data decoded by the decoding device 102 in order to supply these parameters to an encoding device 106 that carries out the fourth-generation encoding process. Specifically, the history information-multiplexing device 103 receives the baseband video data output from the calculator 85 of the decoding device 102, the third-generation encoding parameters output from the variable-length decoding device 112 of the decoding device 102, and the first- and second-generation encoding parameters output from the history decoding device 104, to multiplex these first-, second-, and third-generation encoding parameters on the baseband video data. The baseband video data multiplexed with the first-, second-, and third-generation encoding parameters is supplied to a history information-separating device 105 via a transmission cable.

Next, the method for multiplexing the first-, second-, and third-generation encoding parameters on the baseband video data will be described with reference to FIGS. 17 and 18. FIG. 17 shows a macroblock consisting of 16×16 pixels as defined in the MPEG standard. The macroblock of 16×16 pixels is configured by four subblocks (Y[0], [1], [2], and Y[3]) for the brightness signals each consisting of 8×8 pixels and four subblocks (Cr[0], r[1], b[0], and Cb[1]) for the color difference signals each consisting of 8×8 pixels.

FIG. 18 shows a certain format of video data. This format is defined in ITU Recommendation-RDT601 and represents what is called the "D1 format," which is used in the broadcasting industry. The D1 format is standardized for transmission of 10-bit video data and thus enables 1 pixel of video data to be expressed with 10 bits.

Since baseband video data decoded in accordance with the MPEG standard is configured by 8 bits, the transcoder according to the present invention uses the upper eight of the 10 bits in the D1 format (D9 to D2) as shown in FIG. 18, to transmit the baseband video data decoded based on the MPEG standard. When the 8-bit video data thus decoded is written into the D1 format, the lower two bits (D1 and D0) are unallocated. The transcoder according to the present invention uses this unallocated area to transmit the history information.

Since the data block described in FIG. 18 is used to transmit one pixel in each subblock (Y[0], Y[1], Y[2], Y[3], Cr[0], Cr[1], Cb[0], Cb[1]), 64 data blocks such as that shown in FIG. 18 are transmitted in order to transmit one macroblock of data. The use of lower two bits (D1 and D0) enables 1024 (=16×64) bits of history information to be transmitted for one macroblock of video data. Accordingly, since history information for one generation is configured by 256 bits, history information for past four (=1024/256) generations can be superposed on one macroblock of video data. In the example shown in FIG. 18, the first-, second-, and third-generation history information is superposed thereon.

The history information-separating device 105 is a circuit for extracting the baseband video data from the upper eight bits of the data transmitted in the D1 format while extracting the history information from the lower two bits. In the example shown in FIG. 15, the history information-separating device 105 extracts the baseband video data from the transmitted data, supplies this data to an encoding device 106, executes the first-, second-, and third-generation history information from the transmitted data, and supplies the information to the encoding device 106 and a history encoding device 107.

The encoding device 106 encodes the baseband video data supplied from the history information-separating device 105 into a bit stream having a GOP structure and bit rate specified by the operator or the host computer. Changing the GOP structure means changing the number of pictures contained in the GOP, the number of P pictures present between I pictures, and the number of B pictures present between I pictures and P pictures (or I pictures).

In the example shown in FIG. 15, since the supplied baseband video data has the first-, second-, and third-generation history information superposed thereon, the encoding device 106 selectively reuses the history information for an encoding process for the fourth generation in order to restrain possible image degradation stemming from the re-coding process.

Figure 19:
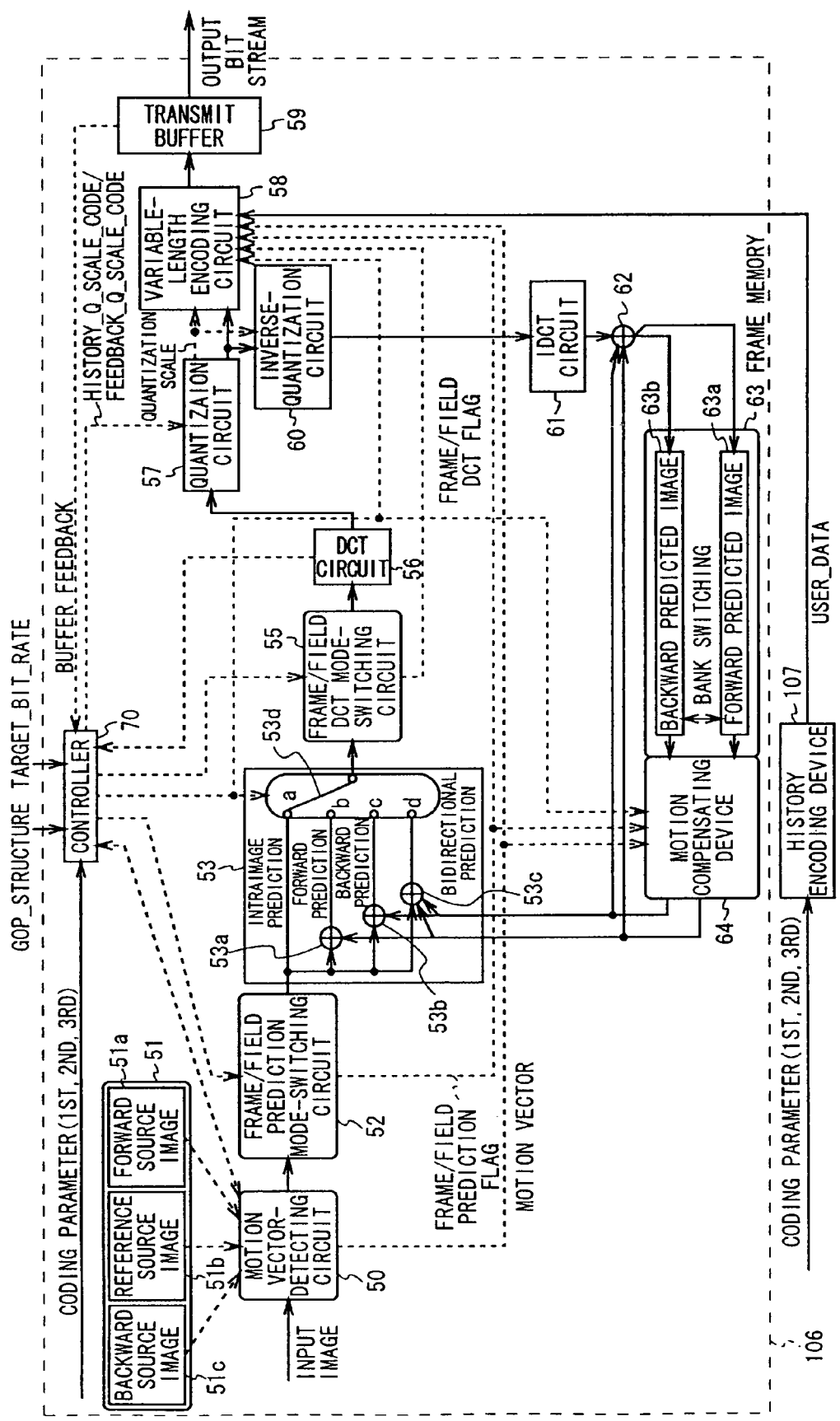
FIG. 19 is a block diagram showing the configuration of an encoding device 106 provided in an encoding device 106 in FIG. 14.

FIG. 19 is a diagram showing a specific configuration of an encoding device 106 provided in the encoding device 106. The encoding device 106 is basically configured similarly to the encoder 18 shown in FIG. 7; it comprises the motion vector-detecting circuit 50, the frame/field prediction mode-switching circuit 52, the calculator 53, the DCT mode-switching circuit 55, the DCT circuit 56, the quantization circuit 57, the variable-length encoding circuit 58, the transmit buffer 59, the inverse-quantization circuit 60, the inverse-DCT circuit 61, the calculator 62, the frame memory 63, and the motion compensating circuit 64. Since the functions of each of the circuits are almost the same as in the encoder 18 described in FIG. 7, description thereof is omitted. The following description will focus on differences between the encoding device 106 and the encoder 18 described in FIG. 7.

The encoding device 106 has a controller 70 for controlling the operations and functions of each of the circuits described above. The controller 70 receives an instruction on the GOP structure from the operator or the host computer to determine the picture type of each picture in a fashion corresponding to the specified GOP structure. The controller 70 also receives information on a target bit rate from the operator or the host computer to control the quantization circuit 57 so that a bit rate output from the encoding device 106 equals the specified one.

Further, the controller 70 receives history information for a plurality of generations output from the history information-separating device 105, to reuse the information to encode the reference picture. The details will be described below.

First, the controller 70 determines whether or not the picture type of the reference picture determined from the GOP structure specified by the operator is the same as the picture type contained in the history information. That is, it determines whether or not the reference picture has ever been encoded into the picture type that is the same as the specified one.

For better understanding, the example shown in FIG. 15 will be referenced. The controller 70 determines whether or not the picture type assigned to the reference picture for the fourth-generation encoding process is the same as the picture type of the reference picture for the first-, second-, or third-generation encoding process.

If the picture type specified for the reference picture for the fourth-generation encoding process is different from all the picture types for the past encoding processes, the controller 70 carries out a "normal encoding process." That is, in this case, this reference picture has not been encoded, during the first-, second-, or third-generation encoding process, into the picture type assigned for the fourth-generation encoding process. On the other hand, if the picture type specified for the reference picture for the fourth-generation encoding process is the same as one of the picture types for the past encoding processes, then the controller 70 executes a "parameter-reused encoding process." That is, in this case, this reference picture has been encoded, during the first-, second-, or third-generation encoding process, into the picture type assigned for the fourth-generation encoding process.

First, the normal encoding process of the controller 70 will be described.

In order to determine whether to select the frame or field prediction mode, the motion vector-detecting circuit 50 detects a predicted error both in the frame prediction mode and in the field prediction mode and supplies the difference between the prediction errors to the controller 70. The controller 70 compares the predicted error values together to select the prediction mode with the smaller value. The prediction mode-switching circuit 52 processes signals depending on the prediction mode selected by the controller 70 to supply the processed signals to the calculator 53.

Specifically, if the frame prediction mode has been selected, the prediction mode-switching circuit 52 processes an input brightness signal so that the signal is output to the calculator 53 as it is, while processing an input color difference signal so that the signal has odd- and even-number field lines mixed therein, as described with reference to FIG. 8. On the other hand, if the field prediction mode has been selected, the prediction mode-switching circuit 52 processes the brightness signal in a manner such that the brightness blocks Y[1] and Y[2] are configured by odd-number field lines, whereas the brightness blocks Y[3] and Y[4] are configured by even-number field lines, as described with reference to FIG. 9. The prediction mode-switching circuit 52 also processes the color difference signal in a manner such that the upper four lines are configured by odd-number field lines, whereas the lower four lines are configured by even-number field lines, also as described with reference to FIG. 9.

Furthermore, to select one of the intraimage prediction mode, the forward prediction mode, the backward prediction mode, and the bidirectional prediction mode, the motion vector-detecting circuit 50 generates and supplies prediction errors in these prediction modes to the controller 70. The controller 70 selects the smallest of the forward, backward, and bidirectional prediction errors as an interprediction predicted error. Further, it compares this interprediction predicted error with the intraimage predicted error to select the smaller value in order to select as a prediction mode a mode corresponding to the selected predicted error. That is, if the intraimage predicted error is smaller, the intraimage prediction mode is set. If the interprediction predicted error is smaller, one of the forward, backward, and bidirectional prediction modes is set which has the smallest predicted error. The controller 70 controls the calculator 53 and the motion compensating circuit 64 in a fashion corresponding to the selected prediction mode.

To select either the frame or field DCT mode, the DCT mode-switching circuit 55 converts the data in the four brightness blocks into a signal form with odd- and even-number field lines mixed therein (the frame DCT mode), while converting the same data into a signal form with these two types of field lines separated from each other (the field DCT mode). The DCT mode-switching circuit 55 then delivers these signals to the DCT circuit 56. The DCT circuit 56 calculates the encoding efficiency of a DCT process with odd- and even-number fields mixed therein and the encoding efficiency of a DCT process with these two types of fields separated from each other and delivers the result to the controller 70. The controller 70 compares the encoding efficiencies delivered from the DCT circuit 56 to select one of the DCT modes which has the higher encoding efficiency in order to control the DCT mode-switching circuit 55 to enter the selected DCT mode.

The controller 70 receives a target bit rate supplied from the operator or the host computer and a signal indicative of the amount of bits buffered in the transmit buffer 59, that is, a signal indicative of the amount of remaining buffer, and based on the target bit rate and the amount of remaining buffer, generates feedback_q_scale_code for controlling a quantization step size for the quantization circuit 57. The feedback_q_scale_code is a control signal generated depending on the amount of buffer remaining in the transmit buffer 59, to preclude its overflow or underflow. This control signal also controls the bit rate of a bit stream output from the transmit buffer 59, to a target value.

Specifically, if, for example, the amount of bits buffered in the transmit buffer 59 decreases, the quantization step size is reduced to increase the amount of bits generated for the next picture to be encoded. On the other hand, if the amount of bits buffered in the transmit buffer 59 increases, the quantization step size is increased to reduce the amount of bits generated for the next picture to be encoded. The quantization step size is proportional to the feedback_q_scale_code, and increases and decreases therewith.

Next, a parameter-reused encoding process, which is a characteristic of the transcoder 101, will be explained. For easier understanding of this process, the reference picture is assumed to have been encoded into the P picture during the first-generation encoding process, into the I picture during the second-generation encoding process, and into the B picture during the third-generation encoding process, so that it must be encoded into the P picture during the fourth-generation encoding process.

In this case, since the reference picture has been encoded, during the first-generation encoding process, into the same picture type (I picture) as that assigned as the fourth-generation picture type, the controller 70 carries out an encoding process using first-generation encoding parameters without generating new encoding parameters from supplied video data. The encoding parameters reused for the fourth-generation encoding process typically include quantiser_scale_code indicative of the quantization scale step size, macroblock_type indicative of the prediction direction mode, motion- _vector indicative of the motion vector, frame/field_motion type indicative of either the frame or field prediction mode, and dct_type indicative of either the frame or field DCT mode.

The controller 70 does not reuse all the encoding parameters transmitted as the history information but reuses those encoding parameters that are assumed to be desirably reused as described above, while newly generating those encoding parameters that are not assumed to be desirably reused.

Next, this encoding parameter-reused encoding process will be explained by focusing on differences from the above described normal encoding process.

The motion vector-detecting circuit 50 detects the motion vector of the reference picture during the above described normal encoding process, but during this parameter-reused encoding process, reuses the motion vector motion_vector supplied as the first-generation history information without a detection process. The reason will be described below.

The baseband video data obtained by decoding the third-generation encoded stream has been subjected to decoding and encoding processes at least three times, so that it evidently has a lower image quality than the original video data. An accurate motion vector cannot be detected from video data with a reduced image quality. That is, the motion vector supplied as the first-generation history information is definitely more accurate than that detected during the fourth-generation encoding process. That is, by reusing the motion vector supplied as the first-generation encoding parameters, the fourth-generation encoding process is prevented from degrading the image quality. The controller 70 delivers the motion vector motion_vector supplied as the first-generation history information, to the motion compensating circuit 64 and the variable-length encoding circuit 58 as motion vector information for the reference picture, which is encoded during the fourth-generation encoding process.

Further, to determine whether to select the frame or field prediction mode, the motion vector-detecting circuit 50 detects the prediction error both in the frame prediction mode and in the field prediction mode. During this parameter-reused encoding process, however, the motion vector-detecting circuit 50 reuses the frame/field_motion_type indicative of either the frame or field prediction mode and supplied as the first-generation history information, without detecting the prediction error both in the frame prediction mode and in the field prediction mode. This is because the prediction error in each prediction mode detected in the first generation is more accurate than that detected during the fourth-generation encoding process and because selection of the prediction mode determined based on the more accurate prediction error enables a more optimal encoding process.

Specifically, the controller 70 supplies the prediction mode-switching circuit 52 with a control signal corresponding to the frame/field_motion_type delivered as the first-generation history information, and the prediction mode-switching circuit 52 executes a signaling process corresponding to the reused frame/field_motion_type.

Further, during the normal encoding process, the motion vector-detecting circuit 50 calculates the prediction error in each prediction direction mode in order to determine which to select from the intraimage prediction mode, the forward prediction mode, the backward prediction mode, and the bidirectional prediction mode (this prediction mode is hereafter referred to as a "prediction direction mode"). During this parameter-reused encoding process, however, the motion vector-detecting circuit 50 determines the prediction direction mode based on the macroblock_type supplied as the first-generation history information without calculating the prediction error in each prediction direction mode. This is because the prediction error in each prediction direction mode during the first-generation encoding process is more accurate than that during the fourth-generation encoding process and because selection of the prediction direction mode determined based on the more accurate prediction error enables a more efficient encoding process. Specifically, the controller 70 selects the prediction direction mode indicated by the macroblock_type contained in the first-generation history information, and then controls the calculator 53 and the motion compensating circuit 64 in a fashion corresponding to the selected prediction direction mode.

During the normal encoding process, the DCT mode-switching circuit 55 supplies the DCT circuit 56 with both converted signals in the frame and field DCT mode signal forms in order to compare the encoding efficiencies in the frame and field DCT modes. During this parameter-reused encoding process, however, the DCT mode-switching circuit 55 only carries out processing corresponding to the DCT mode indicated by the dct_type contained in the first-generation history information without generating both converted signals in the frame and field DCT mode signal forms. Specifically, the controller 70 reuses the dct_type contained in the first-generation history information to control the DCT mode-switching circuit 55 so as to execute a signaling process corresponding to the DCT mode indicated by the dct_type.

During the normal encoding process, the controller 70 controls the quantization step size for the quantization circuit 57 based on the target bit rate specified by the operator and the amount of remaining transmit buffer. During this parameter-reused encoding process, the controller 70 controls the quantization step size for the quantization circuit 57 based on the target bit rate, the amount of remaining transmit buffer and the past quantization scale-contained in the history information. In the following description, the past quantization scale contained in the history information is described as history_q_scale_code. In a history stream, described later, this quantization scale is also described as quantiser_scale_code.

First, the controller 70 generates the current quantization scale feedback_q_scale_code as in the normal encoding process. The feedback_q_scale_code is a quantity determined depending on the amount of buffer remaining in the transmit buffer 59 to prevent its overflow and underflow. Subsequently, the controller 70 compares the past quantization scale history_q_scale_code contained in the first-generation history stream with the current quantization scale feedback_q_scale_code to determine the larger one. A larger quantization scale means a larger quantization step. If the current quantization scale feedback_q_scale_code is larger than the past quantization scale history_q_scale_code, the controller 70 supplies the current quantization scale feedback_q_scale_code to the quantization circuit 57. On the other hand, if the past quantization scale history_q_scale_code is larger than the current quantization scale feedback_q_scale_code, the controller 70 supplies the past quantization scale history_q_scale_code to the quantization circuit 57.

That is, the controller 70 selects the largest quantization scale code from the plurality of past quantization scales contained in the history information and the current quantization scale calculated from the amount of remaining transmit buffer. In other words, the controller 70 controls the quantization circuit 57 to carry out quantization using the largest one of the quantization steps used for the past (first-, second-, and third-generation) encoding processes and for the current (fourth-generation) encoding process. The reason will be described below.

For example, it is assumed that a stream generated during the third-generation encoding process has a bit rate of 4 Mbps and that a target bit rate of 15 Mbps is set for the encoding device 106 that carries out this fourth-generation encoding process. Although the target bit rate is higher, an appropriate result is not obtained simply by reducing the quantization step. The image quality of a picture encoded with a large quantization step during the past encoding process cannot be improved if it is encoded with a reduced quantization step during the current encoding process. That is, encoding with a quantization step smaller than one for a past encoding process simply increases the amount of bits and fails to improve image quality. Thus, the most efficient encoding process can be achieved by using for quantization the largest one of the quantization steps used for the past (first-, second-, and third-generation) encoding processes and for the current (fourth-generation) encoding process.

Next, the history decoding device 104 and history encoding device 107 in FIG. 15 will further be described. Although in FIG. 15, the history decoding device 104 is shown to be a circuit or device different from the decoding device 102, it is simply shown in a block different from the one in which the decoding device 102 is shown, in order to describe the functions and configuration of the history decoding device 104 in an easy-to-understand manner. Processing by the history decoding device 104 is actually carried out by a variable-length decoding circuit and a decoding control circuit (a decoding controller) in the decoding device 102. Similarly, although in FIG. 15, the history encoding device 107 is shown to be a circuit or device different from the encoding device 106, it is simply shown in a block different from the one in which the decoding device 106 is shown, in order to describe the functions and configuration of the history decoding device 107 in an easy-to-understand manner. Processing by the history encoding device 107 is actually carried out by a variable-length encoding circuit and an encoding control circuit (an encoding controller) in the encoding device 102.

As shown in FIG. 15, the history decoding device 104 is configured by a user data decoder 201 for decoding user data supplied by the decoding device 102, a converter 202 for converting an output from the user data decoder 201, and a history VLD 203 for reproducing history information from an output from the converter 202.

In addition, the history encoding device 107 is configured by a history VLC 211 for formatting encoding parameters for the three generations supplied by the history information-separating device 105, a converter 212 for converting an output from the history VLC 211, and a user data formatter 213 for formatting an output from the converter 212 into a user data format.

The user data decoder 201 decodes user data supplied by the decoding device 102 to output the converted data to the converter 202. The details will be discussed later with reference to FIG. 51. The user data (user_data( )) consists of user_data_start_code and user_data, and the MPEG standard prohibits the user_data from containing continuous 23 bits of "0" (that are identical to the start_code). This is to prevent this data from being mistakenly detected as the start_code. The history information (history_stream( )) is described in the user data area (as a type of user_data according to the MPEG standard) and may contain such continuous 23 bits or more of "0," so that "1" must be inserted into this information in accordance with a predetermined timing to convert it into converted_history_stream( ) (see FIG. 38, described later), in order to prevent the occurrence of 23 bits or more of "0." This conversion is carried out by the converter 212 of the history encoding device 107. The converter 202 of the history decoding device 104 carries out an inverse conversion process to the converter 212 (that removes the "1" inserted to prevent the occurrence of 23 bits or more of "0").

The history VLD 203 generates the history information (in this case, the first- and second-generation encoding parameters) from the output from the converter 202 to output it to the history information multiplexing device 103.

On the other hand, in the history encoding device 107, the history VLC 211 converts encoding parameters for the three generations (first, second, and third generations) supplied by the history information-separating device 105, into a history information format. This format includes a fixed length type (see FIGS. 40 to 46, described later) and a variable-length type (see FIG. 47 and subsequent figures) The details will be described later.

The history information formatted by the history VLC 211 is converted into the converted_history_stream( ) by the converter 212. This is to preclude the start_code from being mistakenly detected from the user_data( ) as described above. That is, although the history information contains continuous 23 bits or more of "0," since such continuous 23 bits or more of "0" cannot be arranged within the user_data, the converter 212 converts the data (inserts "1" into the data in accordance with the predetermined timing) so as not to deviate from the prohibition.

The user data formatter 213 adds History_Data_ID to the converted_history_stream( ) supplied by the converter 212, based on FIG. 38, described later, and further adds user_data_stream_code thereto to generate user_data in compliance with the MPEG standard so that this data can be inserted into a video stream and then outputs it to the decoding device 106.

Figure 20:
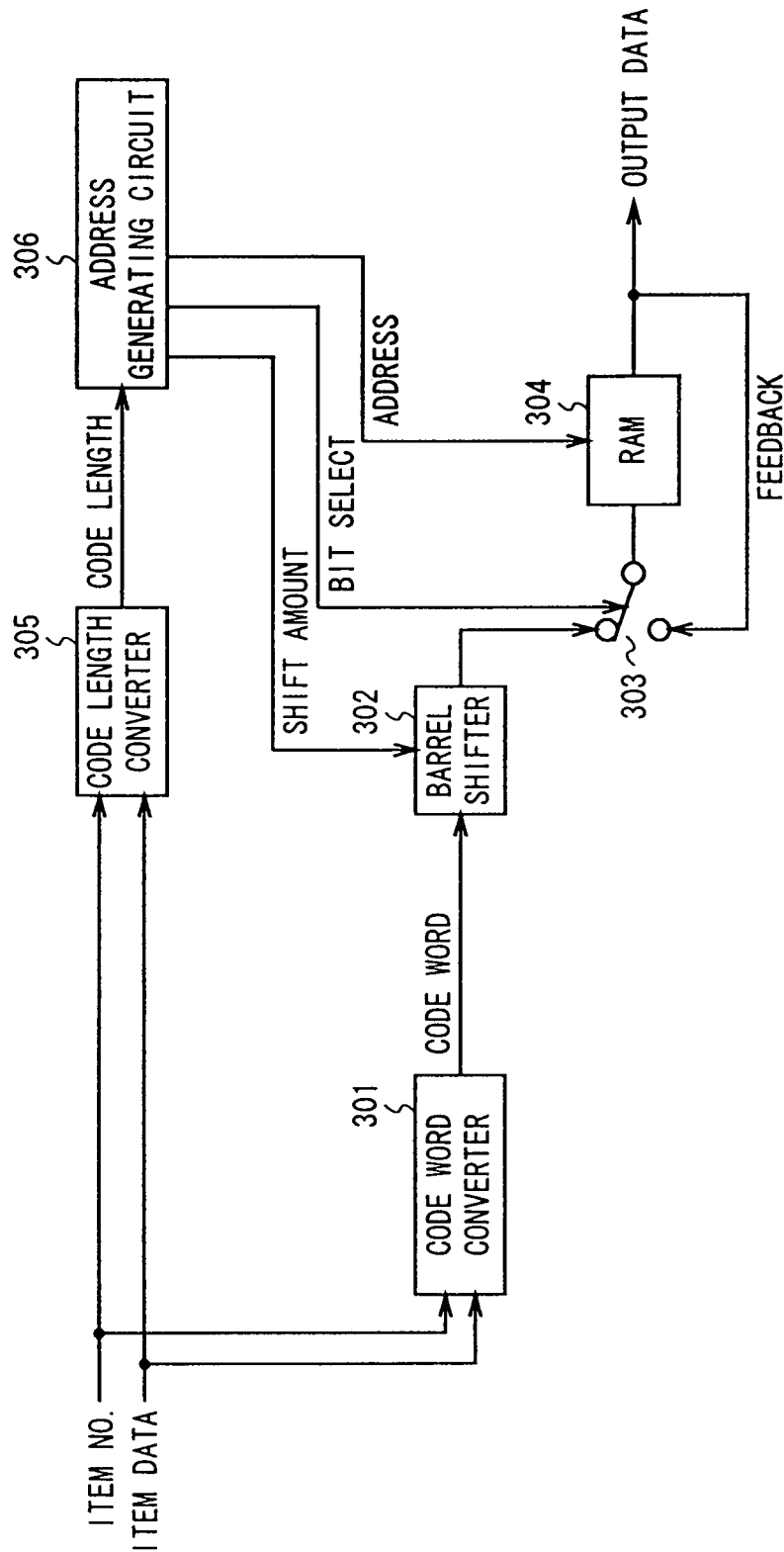
FIG. 20 is a block diagram showing an example of the configuration of history VLC 211 in FIG. 15.

FIG. 20 represents an example of a configuration of the history VLC 211. Its code word converter 301 and code length converter 305 are supplied from the history information-separating device 105 with encoding parameters (that are currently transmitted as the history information) (item data) and information (for example, the name of a syntax (for example, the name of sequence_header, described later)) (item No.) identifying a stream in which these encoding parameters are to be arranged. The code word converter 301 converts the input encoding parameters into code words corresponding to an indicated syntax and outputs the obtained code words to a barrel shifter 302. The barrel shifter 302 shifts the code words input by the code word converter 301 by an amount corresponding to a shift amount supplied by an address generating circuit 306, and outputs the shifted code words to a switch 303 in bytes. The switch 303, which is switched by a bit select signal output by the address generating circuit 306, is identical in number to required bits, and delivers the code words supplied by the barrel shifter 302 to a RAM 304 for storage. Required write addresses are specified by the address generating circuit 306. In addition, when the address generating circuit 306 specifies readout addresses, corresponding data (code words) stored in the RAM 304 are read out and supplied to the following converter 212, and delivered again to the RAM 304 via the switch 303 for storage.

The code length converter 305 determines the code length of the input encoding parameters from the input syntax and these parameters to output it to the address generating circuit 306. The address generating circuit 306 generates the above described shift amount, bit select signal, or write or readout addresses in corresponding to the input code length to supply them to the barrel shifter 302, the switch 303, or the RAM 304, respectively.

As described above, the history VLC 211 is configured as what is called a variable-length encoder to subject input encoding parameters to variable-length encoding before output.

Figure 21:
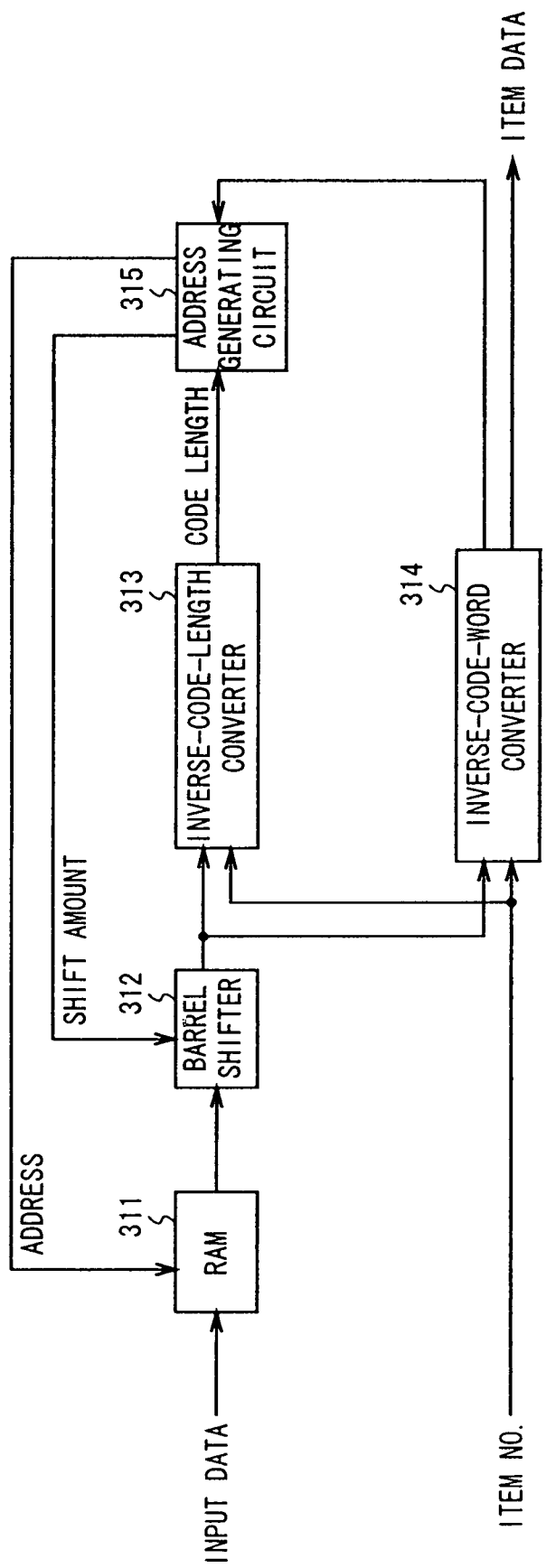
FIG. 21 is a block diagram showing an example of the configuration of history VLD 203 in FIG. 15.

FIG. 21 represents an example of a configuration of the history VLD 203 for decoding data formatted into the history information as described above. In the history VLD 203, encoding parameter data delivered by the converter 202 is supplied to and then stored in a RAM 311. Required write addresses are supplied by an address generating circuit 315. The address generating circuit 315 also generates readout addresses in accordance with a predetermined timing to supply them to the RAM 311. The RAM 311 reads out data stored in the readout addresses to output it to a barrel shifter 312. The barrel shifter 312 shifts the input data by an amount corresponding to a shift amount supplied by the address generating circuit 315, and outputs the shifted data to an inverse code length converter 313 and an inverse code word converter 314.

The inverse code length converter 313 is also supplied with the name of a syntax (an item No.) for a stream with the encoding parameters arranged therein by the converter 202. Based on this syntax, the inverse code length converter 313 determines a code length from the input data (code words) to output it to the address generating circuit 315.

Additionally, the inverse code word converter 314 decodes the data supplied by the barrel shifter 312, based on the syntax, and outputs the decoded data to the history information multiplexing device 103.

The inverse code word converter 314 also extracts information required to determine what code words are contained in the data (that is, information required to determine how the code words are delimited) and outputs it to the address generating circuit 315. Based on this information and the code length input by the inverse code length converter 313, the address generating circuit 315 generates write and readout addresses to output them to the RAM 311 and generates a shift amount to output it to the barrel shifter 312.

Figure 22:
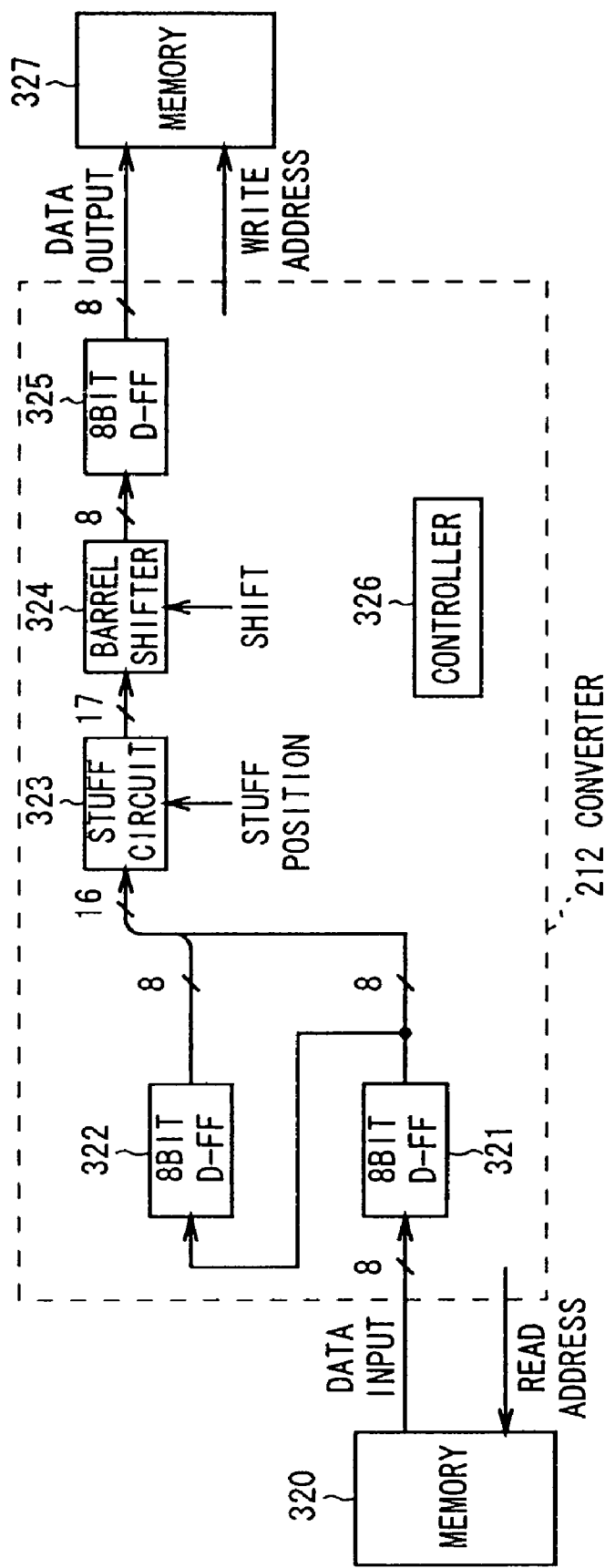
FIG. 22 is a block diagram showing an example of the configuration of a converter 212 in FIG. 15.

FIG. 22 represents an example of a configuration of the converter 212. In this example, 8-bit data is read out from a buffer memory 320 located between the history VLC 211 and the converter 212, at readout addresses output by a controller 326, and is then supplied to a D flip flop (D-FF) 321 for retention. The data read out from the D flip flop 321 is supplied to a stuff circuit 323 and to an 8-bit D flip flop 322 for retention. The 8-bit data read out from the D flip flop 322 and the 8-bit data read out from the D flip flop 321 are synthesized into 16-bit parallel data, which is then delivered to the stuff circuit 323.

The stuff circuit 323 inserts the code "1" into the data at a position indicated by a signal supplied by the controller 326 and indicating the stuff position (stuffing), and outputs the stuffed data to a barrel shifter 324 as 17-bit data.

The barrel shifter 324 shifts the input data based on a signal (shift) supplied by the controller 326 and indicating the shift amount, and extracts 8-bit data to output it to an 8-bit D flip flop 325. The data held in the D flip flop 325 is then read out therefrom and delivered to the following user data formatter 213 via a buffer memory 327. At this point, the controller 326 generates write addresses with output data to output them to buffer memory 327, which is interposed between the converter 212 and the user data formatter 213.

Figure 23:
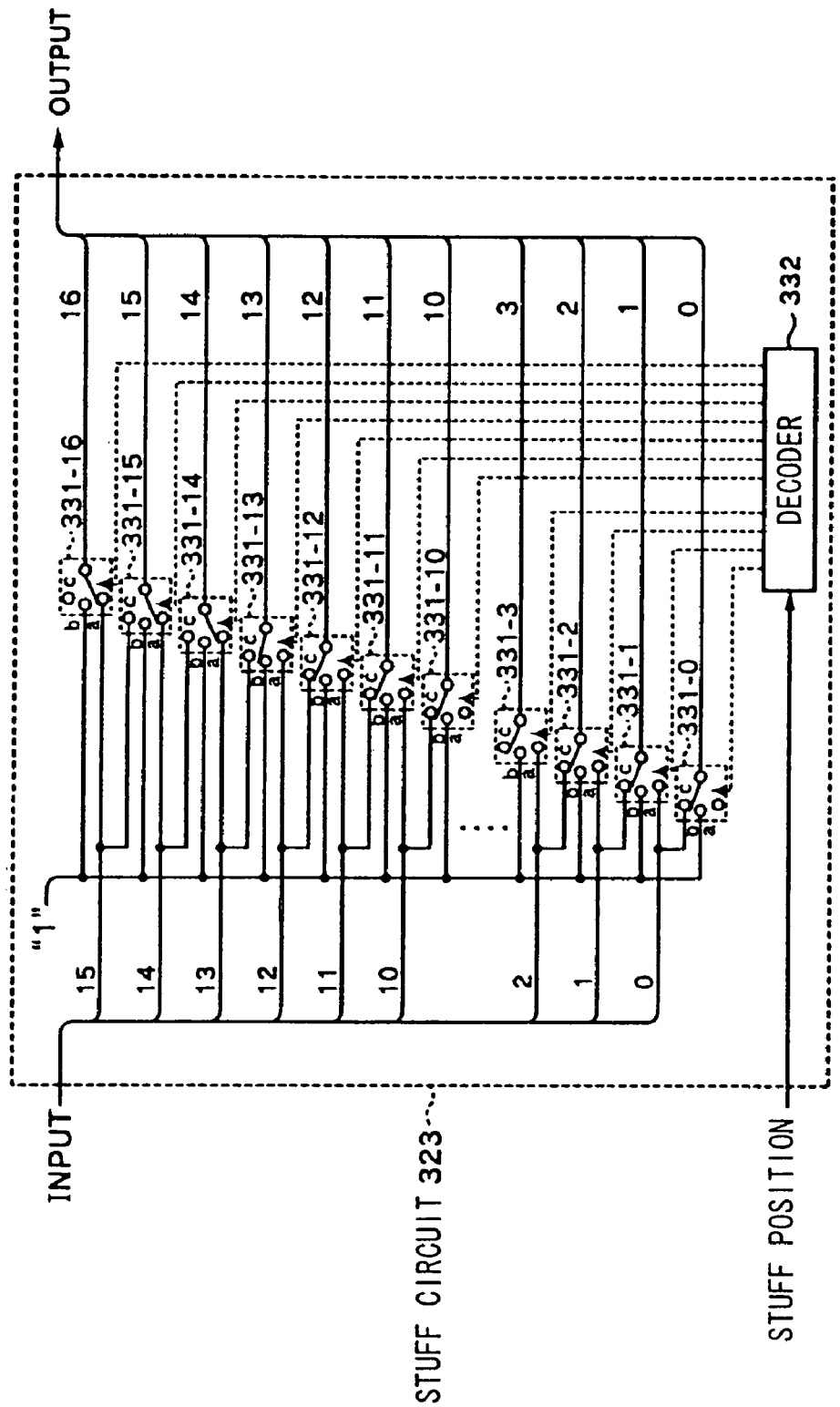
FIG. 23 is a block diagram showing an example of the configuration of a staff circuit 323 in FIG. 22.

FIG. 23 represents an example of a configuration of the stuff circuit 323. The 16-bit data input by the D flip flops 322, 321 is input to a contact a of each switch 331-16 to 331-1. A contact c of a switch 331-$i$ (i=0 to 15) is supplied with data for a switch adjacent thereto on an MSB side (the upper side of the figure). For example, the contact c of the switch 331-12 is supplied with the 13th data from an LSB side supplied to the contact a of the switch 331-13 adjacent thereto on the MSB side, and the contact c of the switch 331-13 is supplied with the 14th data from the LSB side supplied to the contact a of the switch 331-14 adjacent thereto on the MSB side.

However, the contact a of the switch 331-0 below the switch 331-1 corresponding to the LSB is open. The contact c of the switch 331-16 corresponding to the MSB is also open because there is no higher switch.

A contact b of each switch 331-0 to 331-16 is supplied with the data "1."

In response to the signal stuff position supplied by the controller 326 and indicating the position at which the data "1" is inserted, a decoder 332 switches one of the switches 331-0 to 331-16 to the contact b side, thereby switching the LSB-side switch to the contact c side while switching the MSB-side switch to the contact a side.

FIG. 23 represents an example in which the data "1" is inserted into the 13th switch from the LSB side. Thus, in this case, the switches 331-0 to 331-12 are each switched to the contact c side, the switch 331-13 is switched to the contact b side, and the switches 331-14 to 331-16 are each switched to the contact a side.

With the above configuration, the converter 212 in FIG. 22 converts the 22-bit code into 23 bits for output.

Figure 24:
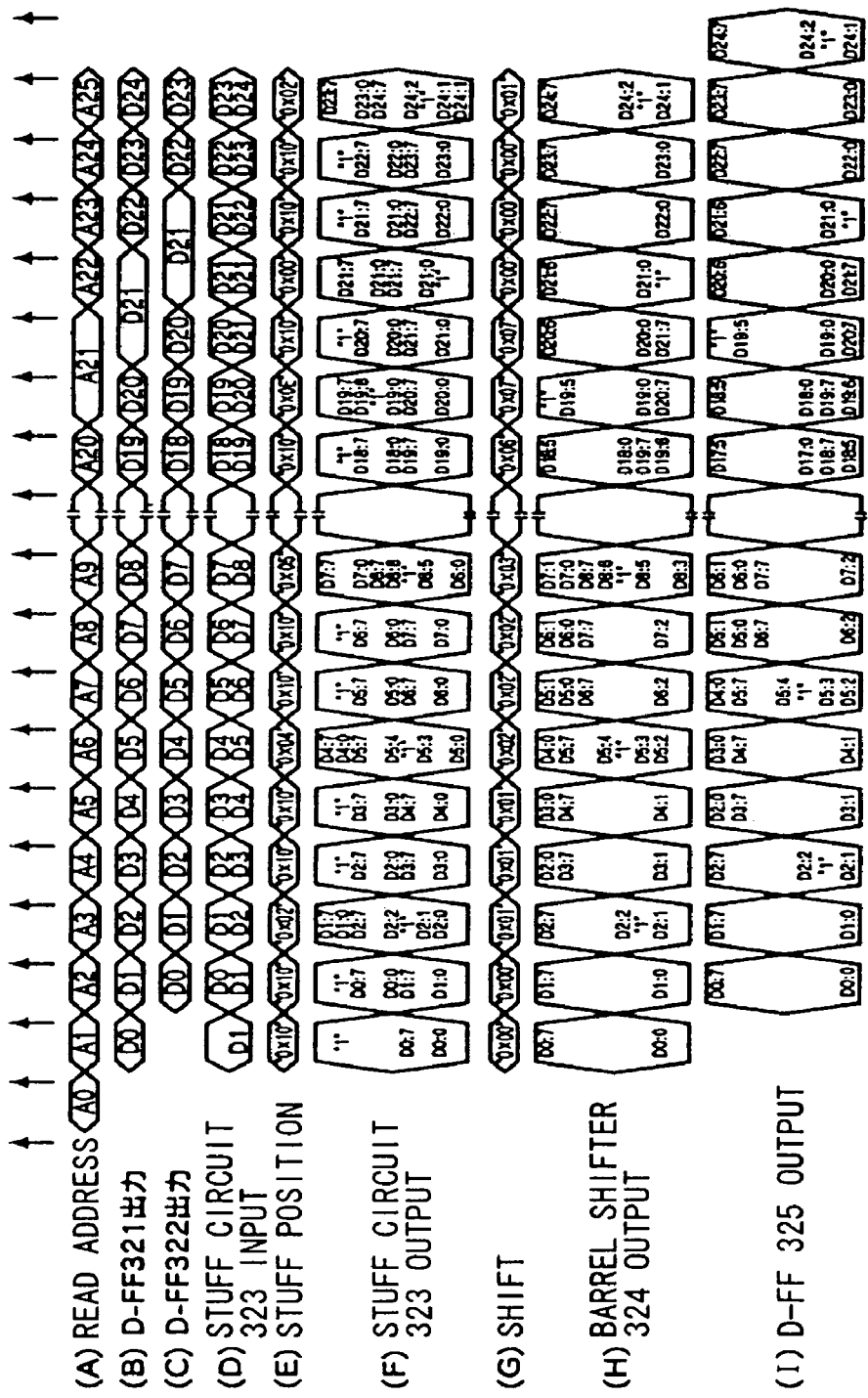
FIG. 24 is a timing chart for describing the operation of the converter 212 in FIG. 22.

FIG. 24 represents timings for output data from each section of the converter 212 in FIG. 22. When the controller 326 of the converter 212 generates readout addresses (FIG. 24(A)) in synchronism with a clock in bytes, the corresponding data is readout from the buffer memory 320 in bytes and held in the D flip flop 321. The data read out from the D flip flop 321 (FIG. 24(B)) is supplied to the stuff circuit 323 and the D flip flop 322 for retention. The data held in the D flip flop 322 is further read out (FIG. 24(C)) and delivered to the stuff circuit 323.

Accordingly, first 1-byte data D0 is input to the stuff circuit 323 (FIG. 24(D)) with respect to a timing for a readout address A1, 2-bye data composed of the 1-byte data D0 and one byte data D1 is input thereto with respect to a timing for the next readout address A2, and 2-byte data composed of the data D1 and the data D2 is input thereto with respect to a timing for a readout address A3.

The stuff circuit 323 is supplied with the signal stuff position (FIG. 24 (E)) by the controller 326, indicating the position at which the data "1" is inserted. The decoder 332 of the stuff circuit 323 switches to the contact b one of the switches 331-16 to 331-0 which corresponds to this signal stuff position, thereby switching the LSB-side switch to the contact c side while switching the MSB-side switch to the contact a side. Thus, the data "1" is inserted, so that the staff circuit 323 outputs data (FIG. 24 (F)) indicating that the data "1" has been inserted at the position indicated by the signal stuff position.

The barrel shifter 324 barrel-shifts the input data by an amount indicated by the signal shift (FIG. 24 (G)) supplied by the controller 326, and outputs the shifted data (FIG. 24 (H)). This output is further held in the D flip flop 325 and then output to the following circuit (FIG. 24 (I)).

The data output by the D flip flop 325 has the data "1" inserted after the 22-bit data. Thus, there are 22 continuous zeros between the data "1" and the next data "1" even if all the bits between these data are zero.

Figure 25:
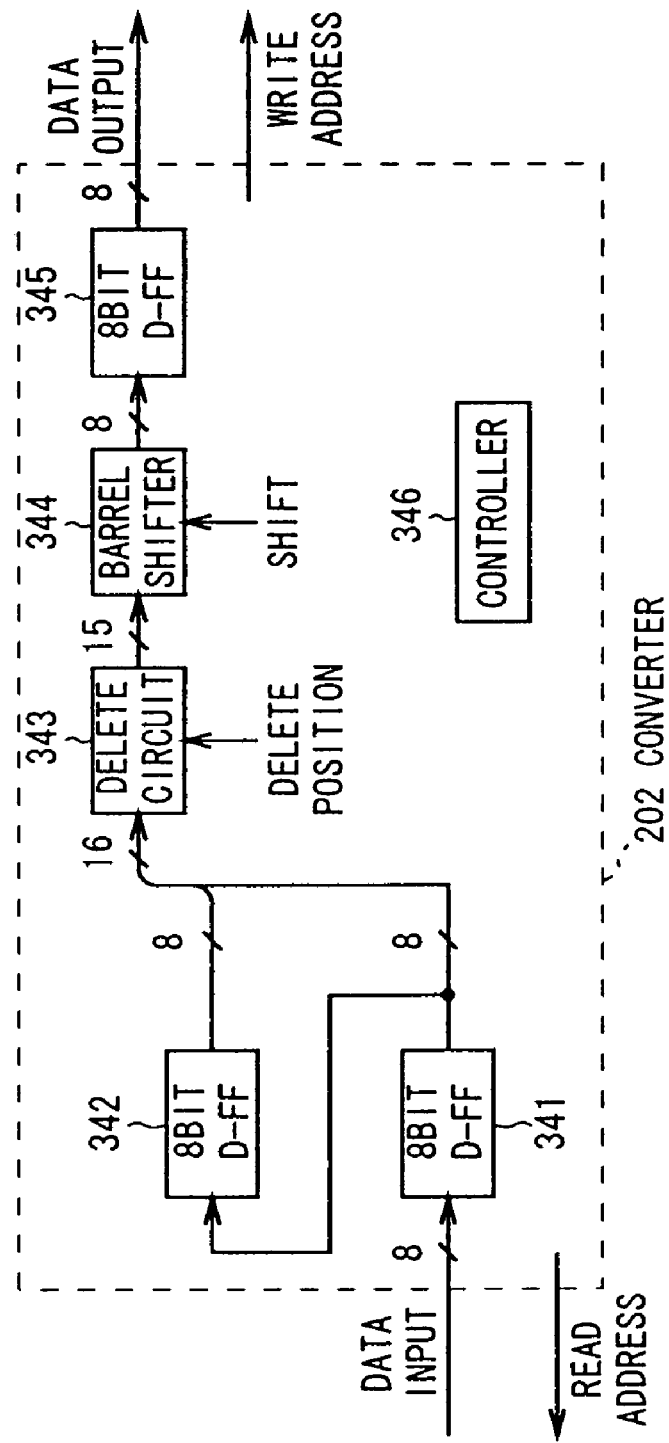
FIG. 25 is a block diagram showing an example of the configuration of a converter 202 in FIG. 15.

FIG. 25 represents an example of a configuration of the converter 202. The configuration of the converter 202, which is configured by a D flip flop 341 to a controller 346, is essentially the same as that of the converter 212, which is comprised the D flip flop 321 to the controller 326 but differs therefrom in that a delete circuit 343 is interposed in the converter 202 instead of the stuff circuit 323 in the converter 212. The other part of the configuration is the same as that of the converter 212 in FIG. 22.

In the converter 202, the delete circuit 343 deletes a bit (the data "1" inserted by the stuff circuit 323 in FIG. 22) in accordance with a signal delete position output by the controller 346 and indicating the position of this bit.

The other operations are the same as in the converter 212 in FIG. 22.

Figure 26:
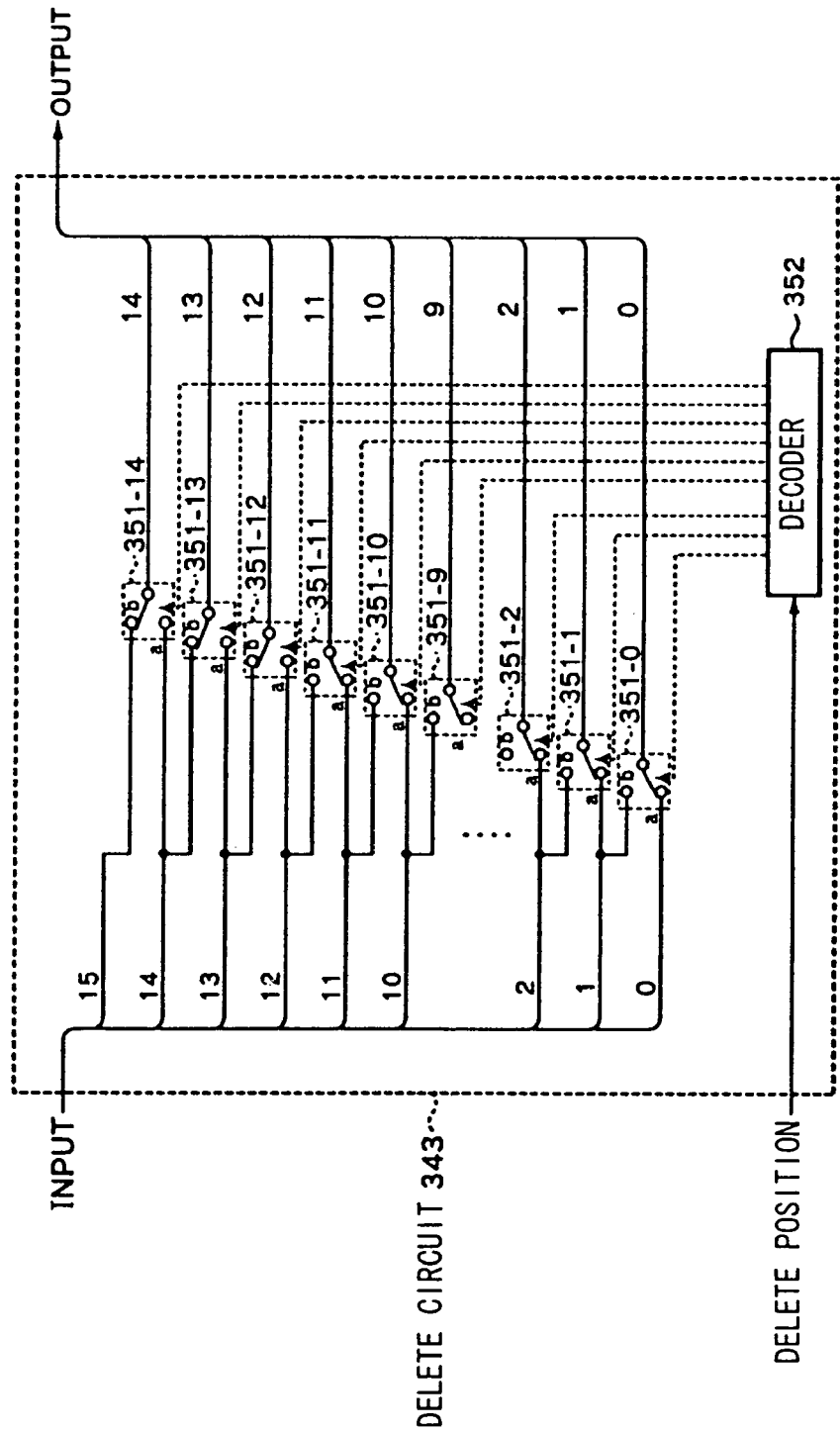
FIG. 26 is a block diagram showing an example of the configuration of a delete circuit 343 in FIG. 25.

FIG. 26 is an example of a configuration of the delete circuit 343. In this example, LSB-side 15 bits of the 16 bits input by the D flip flops 342, 341 are each supplied to a contact a of a corresponding one of switches 351-0 to 351-14. A contact a of each switch is supplied with a bit that is closer to the MSB than the bit supplied to the contact a, by one bit. A decoder 352 deletes the bit indicated by the signal delete position supplied by the controller 346 and outputs the remaining 15 bits.

FIG. 26 represents how the 13th bit from the LSB is deleted. Thus, in this case, the switches 351-0 to 351-11 are each switched to the contact a side, and the 12 bits up to the 12th bit from the LSB are selected and output as they are. In addition, the switches 351-12 to 351-14 are each switched to the contact b side, whereby the 14th to 16th data are selected and output as the 13th to 15th bit data.

The inputs to the stuff circuit 323 in FIG. 23 and to the delete circuit 343 in FIG. 26 each contain 16 bits because the 16 bits supplied by the D flip flops 322, 321 are input to the stuff circuit 323 of the converter 212 in FIG. 22 and because the 16 bits supplied by the D flip flops 342, 341 are also input to the delete circuit 343 of the converter 202 in FIG. 25. In FIG. 22, the 17 bits output by the stuff circuit 323 are barrel-shifted by the barrel shifter 324 to finally select and output, for example, 8 bits. Likewise, in the converter 202 in FIG. 25, the 15 bits output by the delete circuit 343 are barrel-shifted by the barrel shifter 344 by a predetermined amount to obtain 8 bit data.

Figure 27:
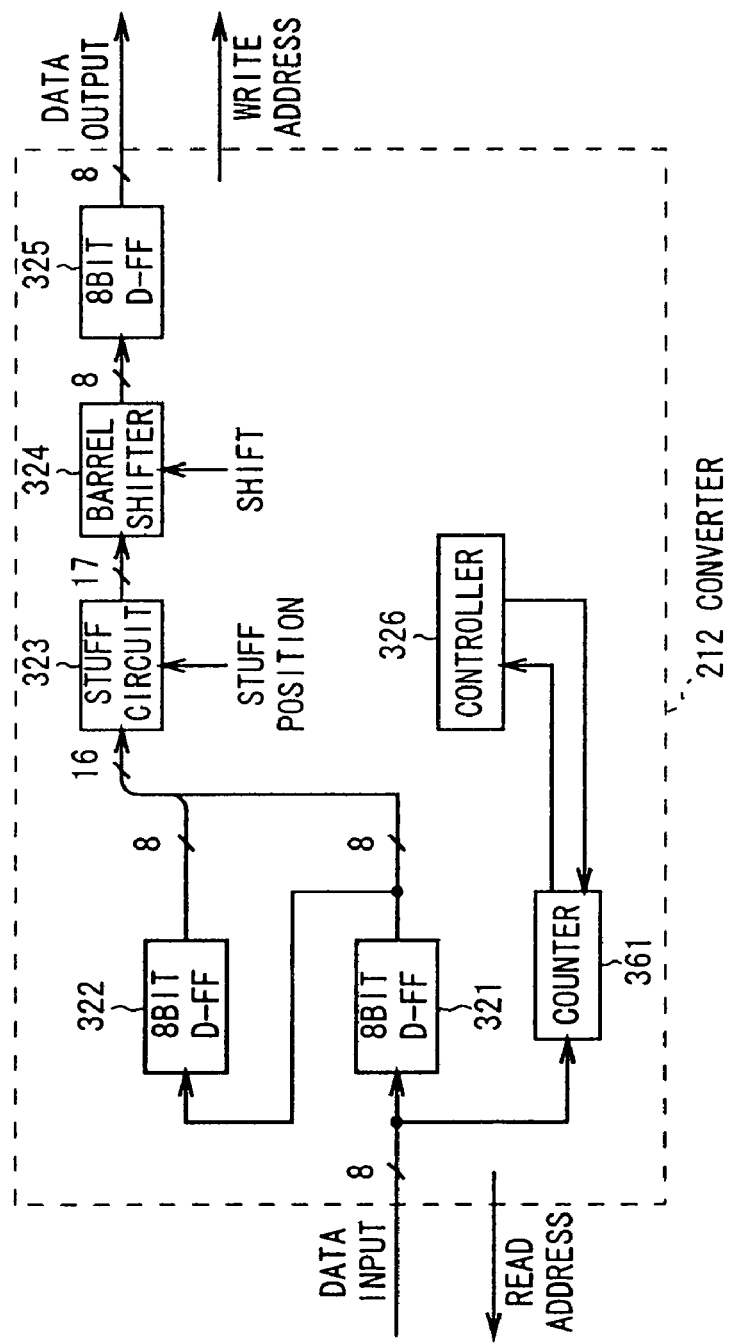
FIG. 27 is a block diagram showing another example of the configuration of the converter 212 in FIG. 15.

FIG. 27 represents another example of a configuration of the converter 212. In this example of a configuration, a counter 361 counts the number of continuous zeros in the input data and outputs a count result to the controller 326. When the counter 361 counts, for example, 22 continuous 0 bits, the controller 326 outputs the signal stuff position to the stuff circuit 323. At the same time, the controller 326 also resets the counter 361 to allow it to count continues 0 bits again.

The other part of the configuration and the other operations are the same as in FIG. 22.

Figure 28:
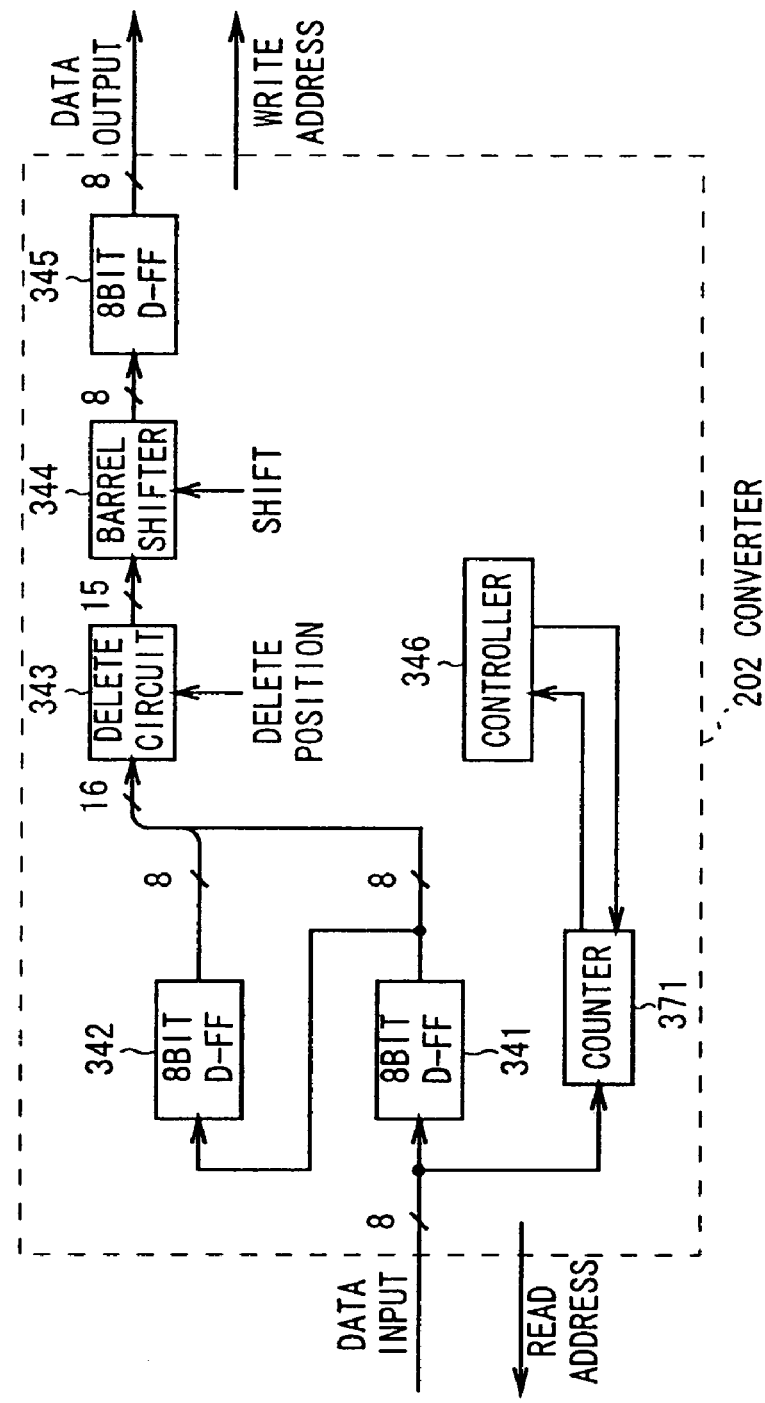
FIG. 28 is a block diagram showing another example of the configuration of the converter 202 in FIG. 15.

FIG. 28 represents another example of a configuration of the converter 202. In this example of a configuration, a counter 371 counts the number of continuous zeros in the input data and outputs a count result to the controller 346. When a count value in the counter 371 reaches 22, the controller 346 outputs the signal delete position to the delete circuit 343 and also resets the counter 371 to allow it to count continues 0 bits again. The other part of the configuration is the same as in FIG. 25.

In this manner, in this example of a configuration, the data "1" is inserted and deleted as a marker bit based on a predetermined pattern (the number of continuous data "zeros").

The configurations shown in FIGS. 27 and 28 enable more efficient processing than those shown in FIGS. 22 and 25. The code length after conversion, however, depends on the source history information.

Figure 29:
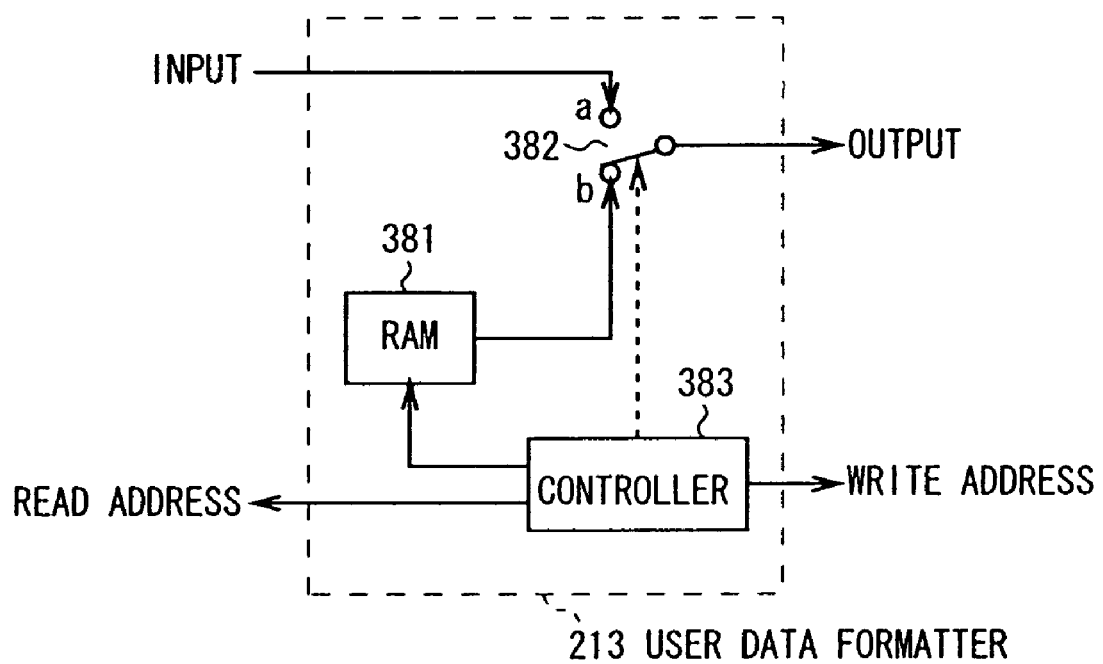
FIG. 29 is a block diagram showing an example of the configuration of a user data formatter 213 in FIG. 15.

FIG. 29 represents an example of a configuration of the user data formatter 213. In this example, when a controller 383 outputs readout addresses to a buffer memory (not shown) located between the converter 212 and the user data formatter 213, data read out from the buffer memory is supplied to a contact a side of a switch 382 of the user data formatter 213. A ROM 381 stores data such as the user data start code and data ID which are required to generate user_data( ). The controller 313 switches the switch 382 to the contacts side or a contact b side with respect to a predetermined timing to select and output as appropriate the data stored in the ROM 381 or the data supplied by the converter 212. Thus, the data in the user_data( ) format is output to the encoding device 106.

Although not shown, the user data decoder 201 can be implemented by outputting input data via a switch for deleting inserted data that has been read out from the ROM 381 in FIG. 29.

Figure 30:
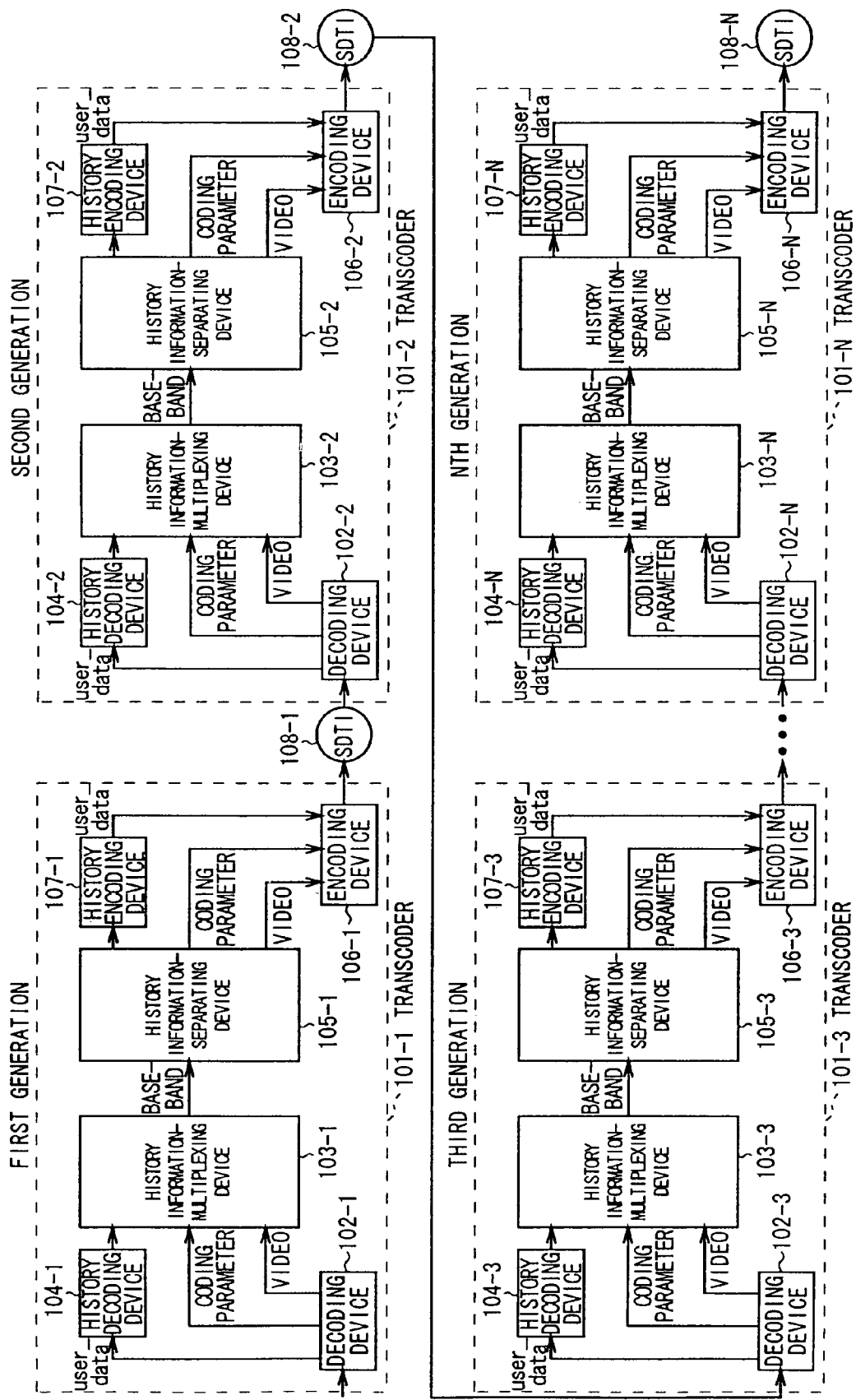
FIG. 30 is a diagram showing how the transcoder 101 in FIG. 14 is actually used.

FIG. 30 shows how a plurality of transcoders 101-1 to 101-N are connected in series for use in, for example, a video edition studio. A history information multiplexing device 103-$i$ of each transcoder 101-$i$ ($i$=1 to N) writes the latest encoding parameters it has used, into that partition of an area for the above described encoding parameters in which the oldest encoding parameters are recorded. Then, baseband image data has recorded thereon immediately close four generations of encoding parameters (generation history information) corresponding to the same macroblock (FIG. 18).

In an encoding device 106-$i$ of each encoding device 106-$i$ (FIG. 19), the variable-length encoding circuit 58 encodes video data supplied by the quantization circuit 57, based on the current encoding parameters delivered by a history information-separating device 105-$i$. A bit stream thus generated (for example, picture_header( )) has the current encoding parameters multiplexed therein.

The variable-length encoding circuit 58 also multiplexes user data (including generation history information) supplied by a history encoding device 107-$i$, into a bit stream for output (the data is multiplexed into the bit stream instead of being embedded therein as shown in FIG. 18). The bit stream output by the encoding device 106-$i$ is input to the following transcoder 101-($i$+1) via an SDTI (Serial Data Transfer Interface).

The transcoders 101-$i$ and 101-($i$+1) are each configured as shown in FIG. 15. Thus, processing by these transcoders is the same as described with reference to FIG. 15.

For actual encoding using histories of the encoding parameters, if the current I picture is to be changed to the P or B type, past histories of the encoding parameters are examined to search for the past P or B picture. If such a history exists, parameters such as its motion vectors are used to change the picture type. On the contrary, if no such history is found, changing the picture type without motion detection is abandoned. Of course, even if no such history is found, the picture type can be changed through motion detection.

Figure 31:
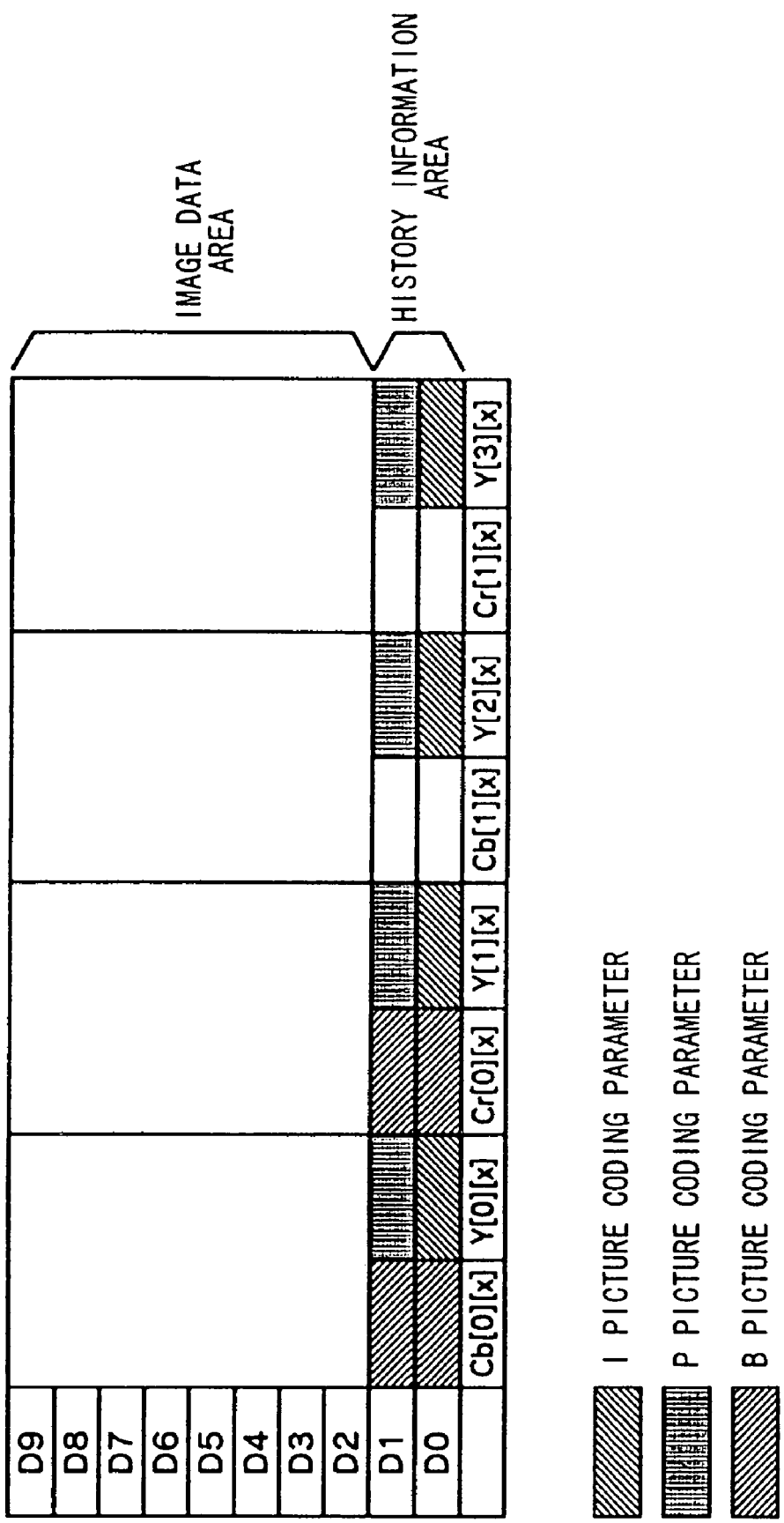
FIG. 31 is a diagram for describing an area in which encoding parameters are recorded.

Although, in the format shown in FIG. 18, four generations of encoding parameters are embedded in the data, parameters for each of the I, P, and B picture types may be embedded therein. FIG. 31 is an example of a format in this case. In this example, when the same macroblock has been encoded while changing the picture type, a generation of encoding parameters are recorded for each picture type (picture history information). Accordingly, the decoding device 102 shown in FIG. 16 and the encoding device 106 shown in FIG. 19 input and output a generation of encoding parameters corresponding to the I, P, and B pictures instead of encoding parameters for the current (latest), third, second, and first generations.

Additionally, in this case, empty areas Cb[1][x] and Cr[1][x] are not used, so that the present invention is applicable to image in a 4:2:0 format free from the areas Cb[1][x] and Cr[1][x].

In this case, the decoding device 102 obtains encoding parameters simultaneously with decoding, determines the picture type, writes the encoding parameters to a portion of the image signal corresponding to the picture type (multiplexing), and outputs the signal to the history information-separating device 105. The history information-separating device 105 can separate the encoding parameters from the signal to carry out encoding while changing the picture type taking into consideration the picture type desired for encoding and the input past encoding parameters.

Figure 32:
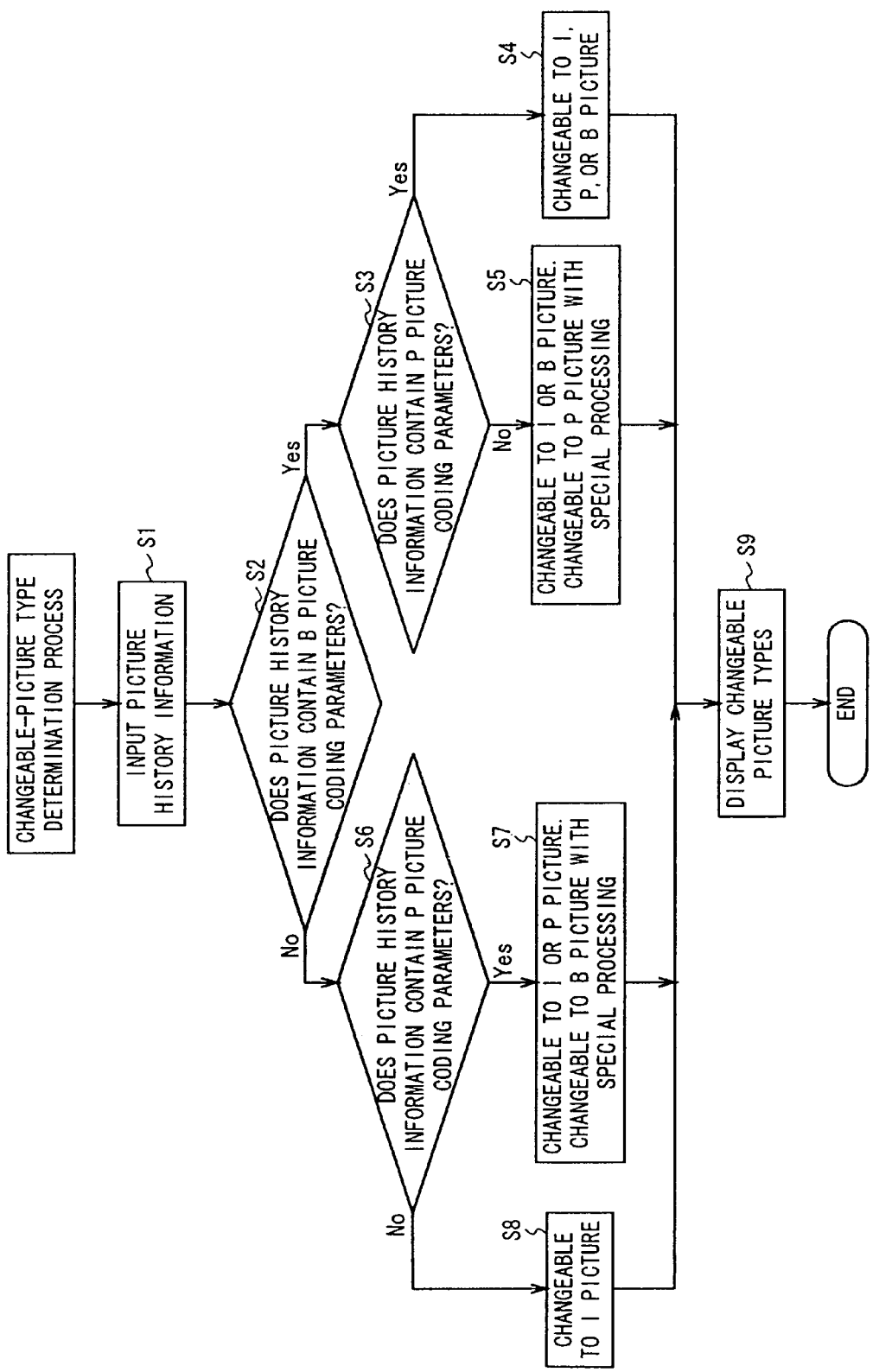
FIG. 32 is a flowchart for describing a changeable picture type determining process carried out by the encoding device 106 in FIG. 14.

Next, a process for allowing each transcoder 101 to determine possible destination picture types will be described with reference to the flowchart in FIG. 32. The picture type changing by the transcoder 101 must be carried out without motion detection because it uses part motion vectors. In addition, the processing described below is executed by the history information-separating device 105.

At step S1, a generation of encoding parameters (picture history information) are input to the history information-separating device 105 for each picture type.

At step S2, the history information-separating device 105 determines whether or not the picture history information contains encoding parameters used for a change to the B picture. If the history information-separating device 105 determines that the picture history information contains encoding parameters used for a change to the B picture, the process proceeds to step S3.

At step S3, the history information-separating device 105 determines whether or not the picture history information contains encoding parameters used for a change to the P picture. If the history information-separating device 105 determines that the picture history information contains encoding parameters used for a change to the P picture, the process proceeds to step S4.

At step S4, the history information-separating device 105 determines that the possible destination picture types are the I, P, and B pictures.

If it is determined at step S3 that the picture history information contains no encoding parameters used for a change to the P picture, the process advances to step S5.

At step S5, the history information-separating device 105 determines that the possible destination picture types are the I and B pictures. Further, the history information-separating device 105 determines that special processing (only the forward prediction vectors contained in the B picture history information are used without the backward prediction vectors) can be used to change to the P picture in a pseudo manner.

If it is determined at step S2 that the picture history information contains no encoding parameters used for a change to the B picture, the process advances to step S6.

At step S6, the history information-separating device 105 determines whether or not the picture history information contains encoding parameters used for a change to the P picture. If the history information-separating device 105 determines that the picture history information contains encoding parameters used for a change to the P picture, the process proceeds to step S7.

At step S7, the history information-separating device 105 determines that the possible destination picture types are the I and P pictures. Further, the history information-separating device 105 determines that special processing (only the forward prediction vectors contained in the P picture history information are used) can be used to change to the B picture in a pseudo manner.

If it is determined at step S6 that the picture history information contains no encoding parameters used for a change to the P picture, the process advances to step S8. At step S8, the history information-separating device 105 determines that only the possible destination picture type is the I picture because no motion vector is present (since this is the I picture, it can be changed only to the I picture).

After the processing at steps S4, S5, S7, and S8, at step S9, the history information-separating device 105 displays the possible destination picture types on the display device (not shown) for notification to the user.

Figure 33:
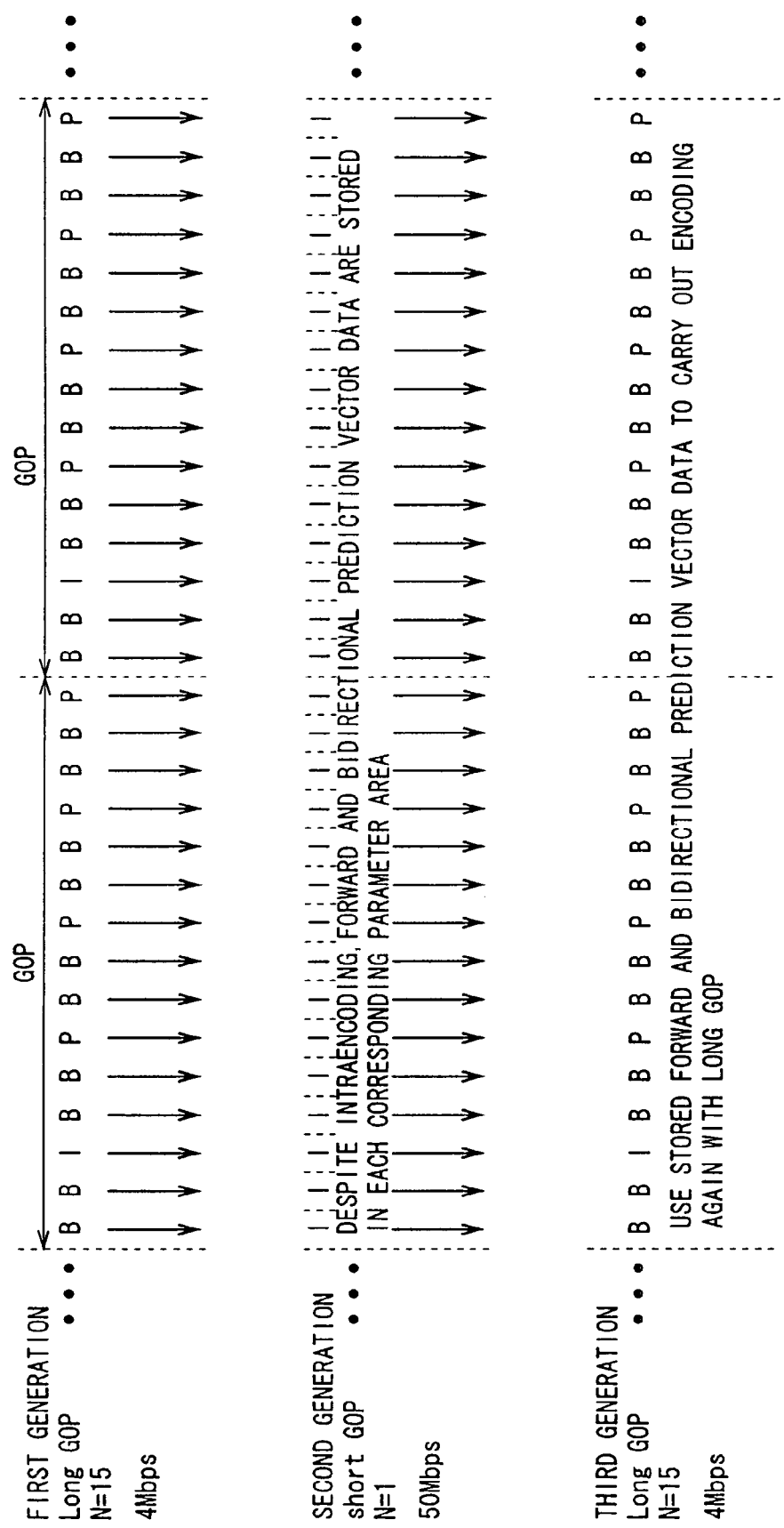
FIG. 33 is a diagram showing an example of a change in picture type.

FIG. 33 shows an example of picture type change. To change the picture type, the number of frames constituting the GOP is changed. That is, in this case, a 4-Mbps Long GOP (first generation) composed of frames of N=15 (number of GOP frames N=15) and M=3 (occurrence cycle of I or P pictures within the GOP M=3) is converted into a 50-Mbps Short GOP (second generation) composed of frames of N=1 and M=1, which is converted back into a 4-Mbps Long GOP (third generation) composed of frames of N=15 and M=3. The broken lines in the figure denote-boundaries in the GOP.

If the picture type is changed from first generation to second generation, all the frames can have their picture types changed to the I picture, as is apparent from the above description of the possible destination picture type-determining process. During this picture type change, all motion vectors calculated to convert a motion image (0th generation) into the first generation are stored (remain) in the picture history information. Then, if a conversion into a Long GOP (the picture type is changed from second generation to third generation) is executed again, since the motion vectors for each picture type which have been used to convert the 0th generation into the first generation are stored, these vectors can be reused to again execute a conversion into a Long GOP while restraining image quality degradation.

Figure 34:
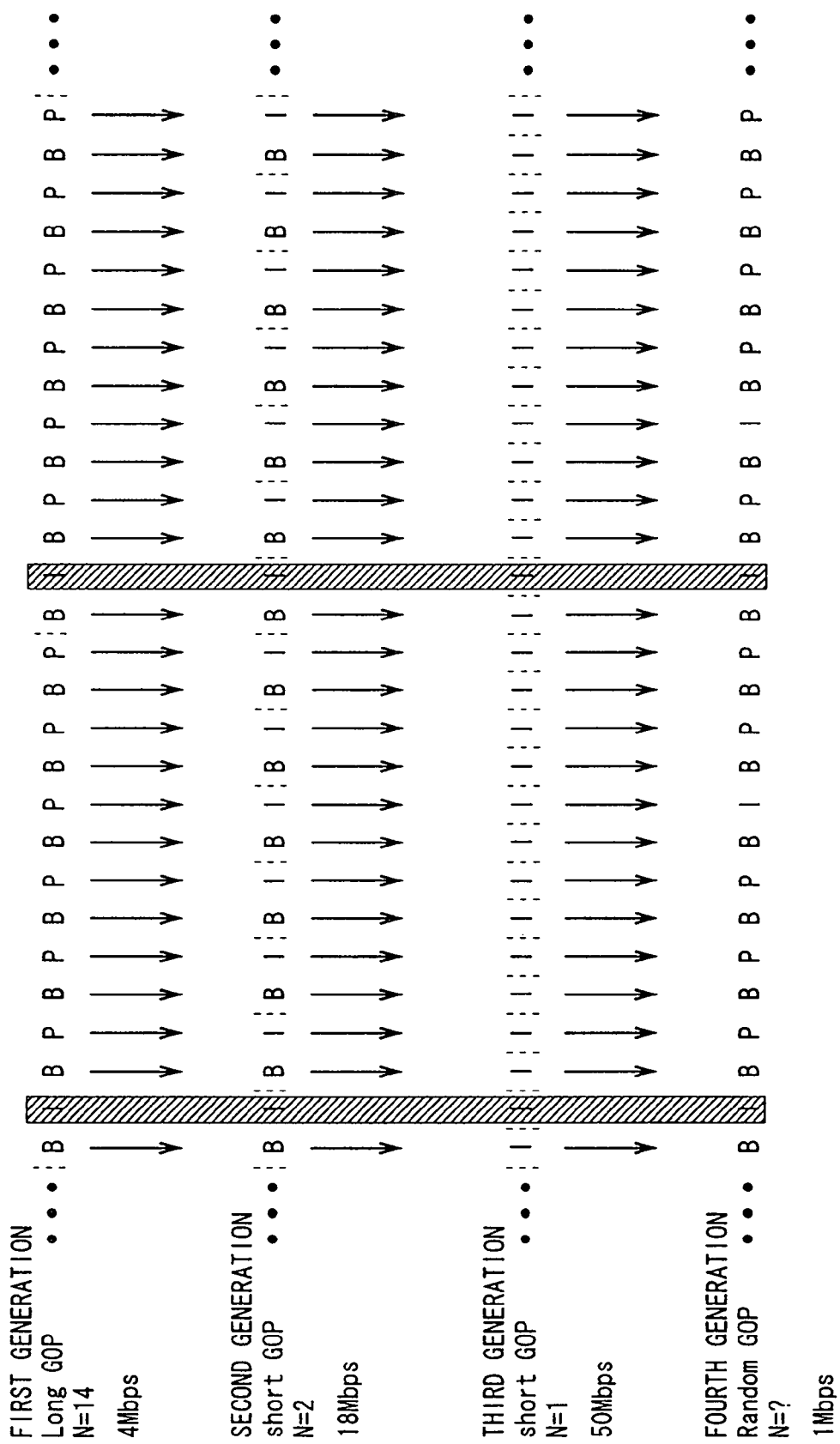
FIG. 34 is a diagram showing another example of a change in picture type.

FIG. 34 shows another example of picture type changing. In this case, a 4-Mbps Long GOP (first generation) of N=14 and M=2 is converted into an 18-Mbps Short GOP (second generation) of N=2 and M=2, which is converted into a 50-Mbps Short GOP (third generation) of N=1 and M=1, that is, having one frame, which is further converted into a 1-Mbps random GOP (fourth generation) having N frames.

In this case, the motion vectors for each picture type used for conversion from 0th generation to first generation are stored until the conversion from third generation to fourth generation. Then, as shown in FIG. 34, despite a complicated change in picture type, image quality degradation can be minimized by reusing the stored encoding parameters. Furthermore, by effectively using the quantization scale contained in the stored encoding parameters, encoding can be implemented while restraining image quality degradation.

Figure 35:
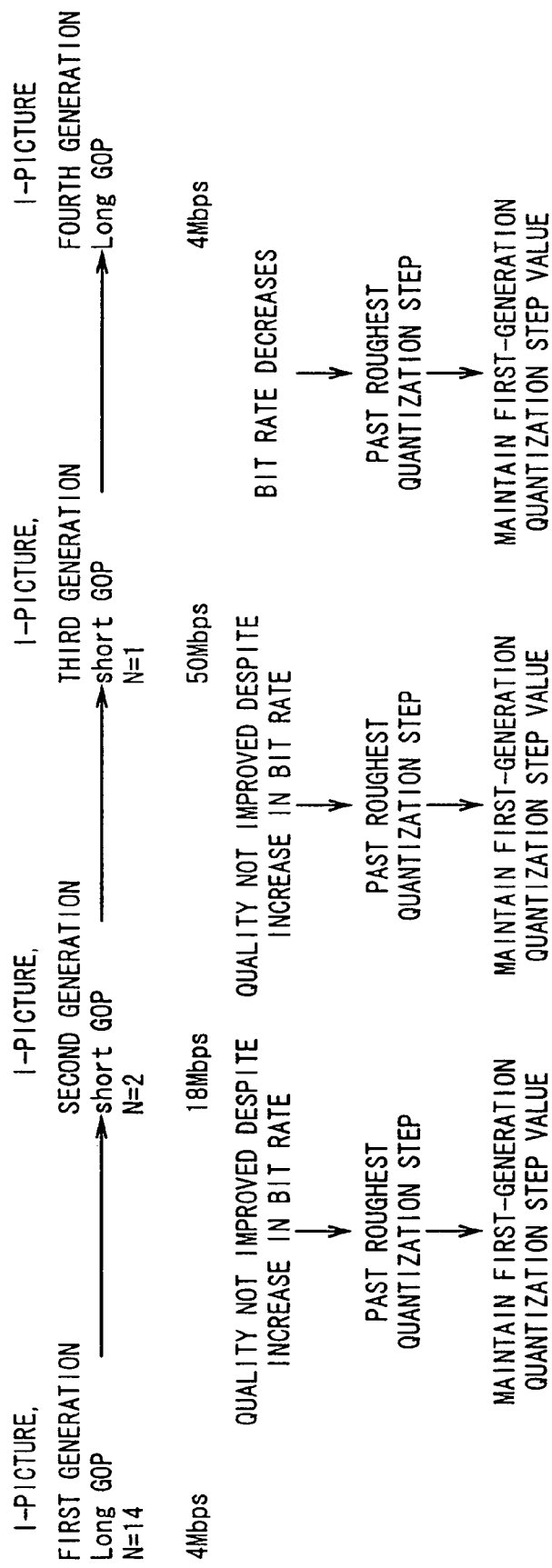
FIG. 35 is a diagram for describing a quantization controlling process carried out by the encoding device 106 in FIG. 14.

The reuse of the quantization scale will be described with reference to FIG. 35. FIG. 35 shows that a predetermined frame is constantly converted into the I picture from first generation to fourth generation, whereas only the bit rate is changed to 4, 18, or 50 Mbps.

For example, in converting the first generation (4 Mbps) into the second generation (18 Mbps), image quality is not improved even by using a finer quantization scale for encoding in response to the increase in bit rate. This is because data previously quantized with a rougher quantization scale is not restored. Thus, using a finer quantization scale for encoding in response to the increase in bit rate shown in FIG. 35 simply results in an increase in information but does not improve image quality. Accordingly, more efficient encoding is enabled by providing such control as maintains the previously roughest (largest) quantization scale.

In changing the third generation to the fourth generation, the bit rate decreases from 50 to 4 Mbps, but in this case, the previously roughest (largest) quantization scale is also maintained.

As described above, in changing the bit rate, it is very effective to use a past history of quantization scale for encoding.

Figure 36:
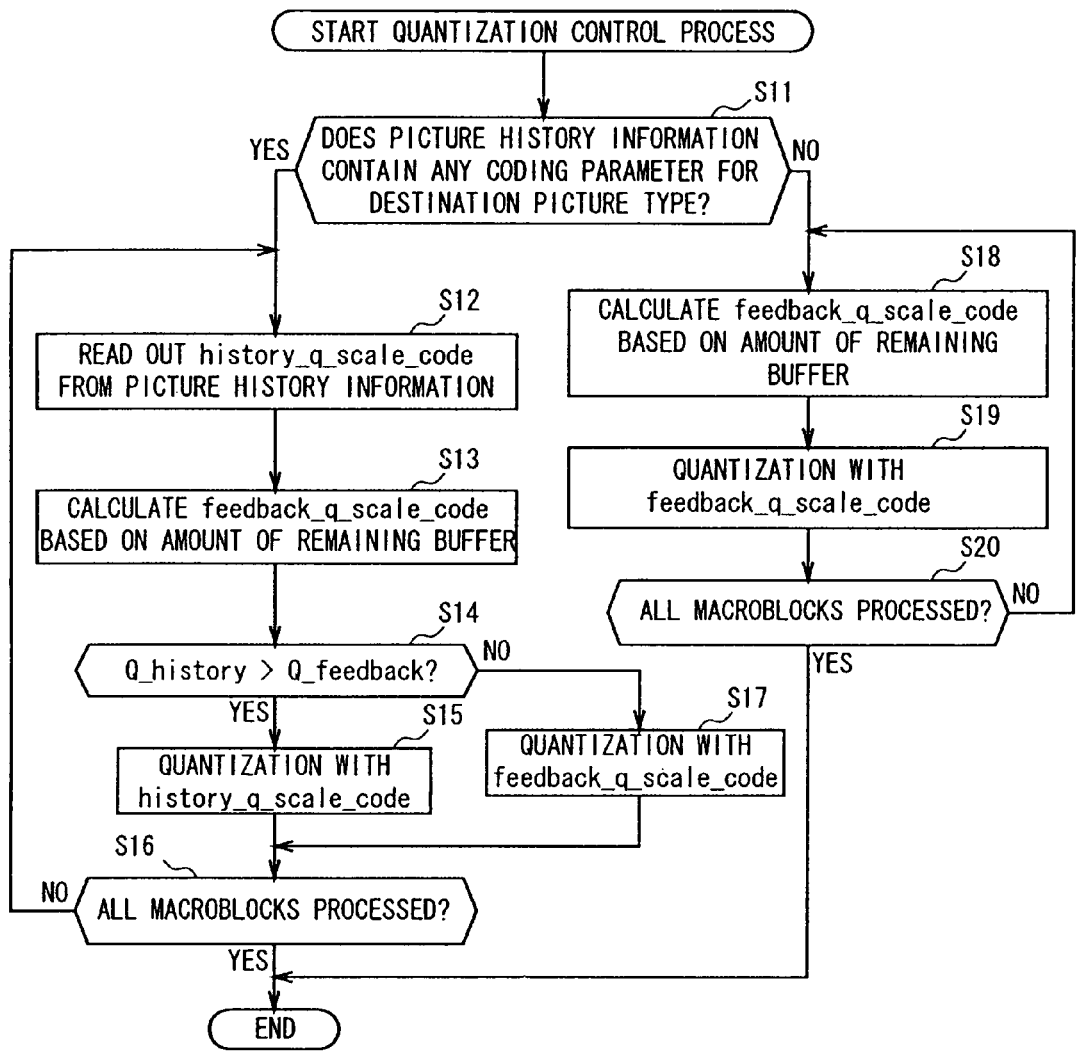
FIG. 36 is a flowchart for describing the quantization controlling process carried out by the encoding device 106 in FIG. 14.

This quantization control process will be explained with reference to the flowchart in FIG. 36. At step S11, the history information-separating device 105 determines whether or not input picture history information contains encoding parameters for a picture type to be converted. If the history information-separating device 105 determines that the input picture history information contains encoding parameters for the converted picture type, the process proceeds to step S12.

At step S12, the history information-separating device 105 extracts the history_q_scale_code from the relevant encoding parameters in the picture history information.

At step S13, the history information-separating device 105 calculates the feedback_q_scale_code based on the amount of remaining buffer fed back from the transmit buffer 59 to the quantization circuit 57.

At step S14, the history information-separating device 105 determines whether or not the history_q_scale_code is larger (rougher) than the feedback_q_scale_code. If the history information-separating device 105 determines that the history_q_scale_code is larger than the feedback_q_scale_code, the process advances to step S15.

At step S15, the history information-separating device 105 outputs the history_q_scale_code to the quantization circuit 57 as a quantization scale. The quantization circuit 57 uses history_q_scale_code to carry out quantization.

At step S16, it is determined whether all the macroblocks contained in the frame have been quantized. If it is determined that not all the macroblocks have not been quantized yet, the process returns to step S12 to repeat the processing from step S12 to step S16 until all the macroblocks have been quantized.

If it is determined at step S14 that the history_q_scale_code is not larger (finer) than the feedback_q_scale_code, the process advances to step S17.

At step S17, the history information-separating device 105 outputs the feedback_q_scale_code to the quantization circuit 57 as a quantization scale. The quantization circuit 57 uses feedback_q_scale_code to carry out quantization.

If it is determined at step S11 that the history information contains no encoding parameters for the converted picture type, the process advances to step S18.

At step S18, the history information-separating device 105 calculates the feedback_q_scale_code based on the amount of remaining buffer fed back from the transmit buffer 59 to the quantization circuit 57.

At step S19, the quantization circuit 57 uses feedback_q_scale_code to carry out quantization.

At step S20, it is determined whether or not all the macroblocks contained in the frame have been quantized. If it is determined that not all the macroblocks contained in the frame have been quantized, the process returns to step S18 to the processing from step S18 to step S20 until all the macroblocks have been quantized.

Figure 37:
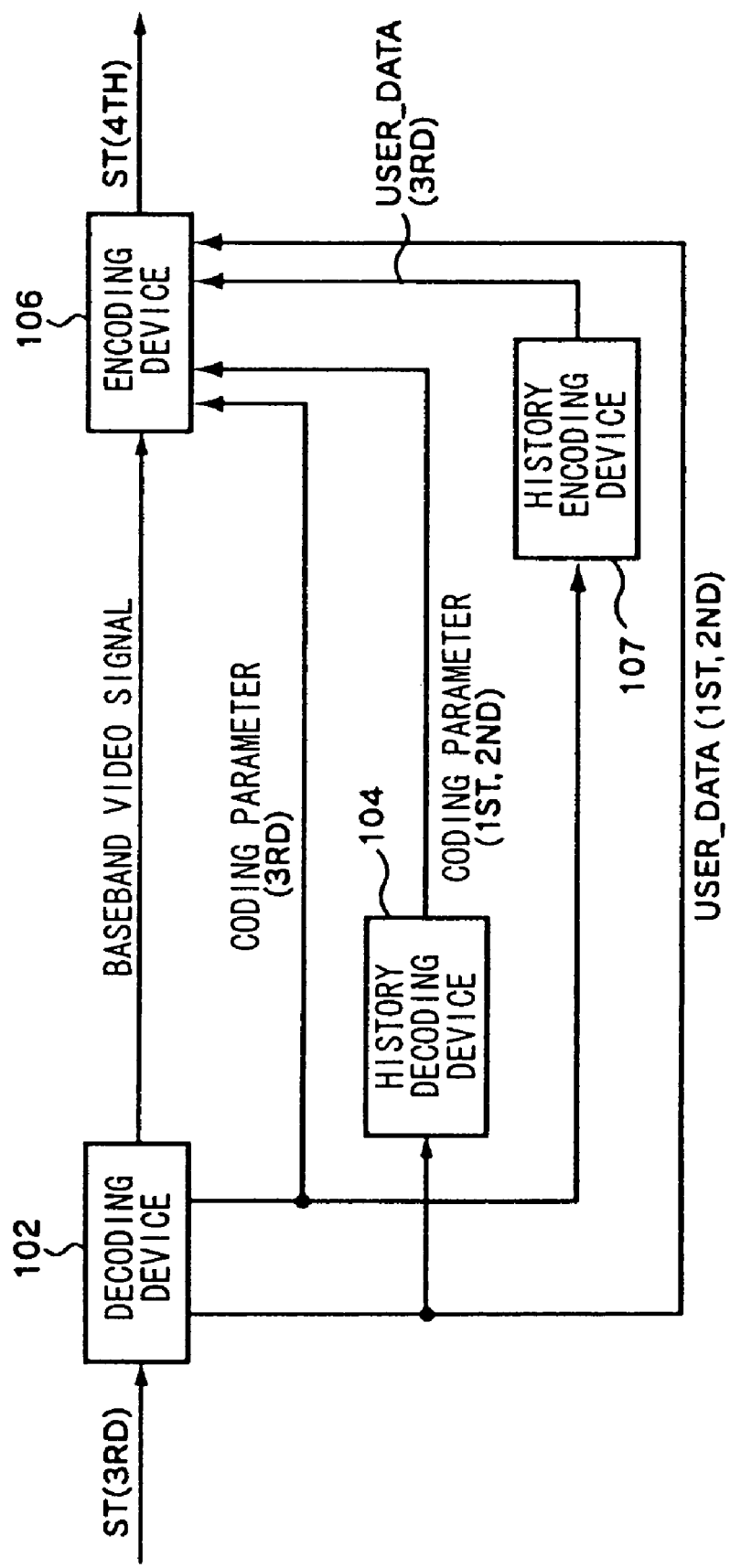
FIG. 37 is a block diagram showing the configuration of a tightly coupled transcoder 101.

Inside the transcoder 101 according to this embodiment, the decoding and encoding sides are loosely coupled together and the encoding parameters are multiplexed into the image data before transmission, as described above. As shown in FIG. 37, however, the decoding device 102 and the encoding device 106 may be directly connected (tightly coupled) together.

The transcoder 101 as described in FIG. 15 multiplexes the past encoding parameters into the baseband video data before transmission in order to supply the encoding device 106 with the past encoding parameters for the first, second, and third generations. However, multiplexing the past encoding parameters into the baseband video data is not essential for the present invention, but a transmission path (for example, the data transfer bus) different from that for the baseband video data may be used to transmit the past encoding parameters, as shown in FIG. 37.

That is, the history device 102, history decoding device 104, encoding device 106, and history encoding device 107 shown in FIG. 37 have exactly the same functions and configurations as the decoding device 102, history decoding device 104, encoding device 106, and history encoding device 107 described in FIG. 15.

The variable-length decoding circuit 112 of the decoding device 102 extracts the third-generation encoding parameters from the sequence layer, GOP layer, picture layer, slice layer, and macroblock layer of the third-generation encoded stream St(3rd) and supplies these parameters to the controller 70 for the history encoding device 107 and encoding device 106. The history encoding device 107 converts the received third-generation encoding parameters into the converted_history_stream( ) so that the parameters can be described in the user data area of the picture layer, and supplies the converted_history_stream( ) to the variable-length encoding circuit 58 of the encoding device 106 as user data.

Further, the variable-length decoding device 112 extracts the user data user_data containing the first- and second-generation encoding parameters, from the user data area of the picture layer of the third-generation encoded stream, and supplies this data to the history decoding device 104 and the variable-length encoding device 58 of the encoding device 106. The history decoding device 104 extracts the first- and second-generation encoding parameters from the history stream described in the user data area as converted_history_stream( ), and supplies these parameters to the controller for the encoding device 106.

The controller 70 for the encoding device 106 controls the encoding process by the encoding device 106 based on the first- and second-generation encoding parameters received from the history decoding device 104 and the third-generation encoding parameters received from the encoding device 102.

The variable-length encoding circuit 58 of the encoding device 106 receives from the decoding device 102 the user data user_data containing the first- and second-generation encoding parameters, while receiving from the history encoding device 107 the user data user_data containing the third-generation encoding parameters, and describes these user data in the user data area of the picture layer of the fourth-generation encoded stream as history information.

FIG. 38 represents a syntax for use in decoding MPEG video streams. The decoder decodes an MPEG bit stream in accordance with this syntax to extract a plurality of meaningful data elements from the bit stream. In the illustrated syntax, which will be described below, functions and conditional statements are represented by thin characters, while the data elements are represented by thick characters. The data elements are each described in mnemonics indicating its name, bit length, type, and transmission order.

First, the functions used in the syntax shown in FIG. 38 will be explained.

A next_start_code ( ) function searches for a start code described in the bit stream. In the syntax shown in FIG. 38, a sequence_header( ) function and a sequence_extension ( ) function are sequentially arranged after the next_start_code( ) function, so that there is described in this bit stream data elements defined by the sequence_header( ) and sequence_extension( ) functions. Consequently, during decoding of the bit stream, the next_start_code( ) function finds start codes (a kind of data element) in the bit stream, which are described in the heads of the sequence_header( ) and sequence_extension( ) functions, and uses these start codes as references to find the sequence_header( ) and sequence_extension( ) functions. The next_start_code( ) function then decodes the data elements defined by the sequence_header( ) and sequence_extension( ) functions.

The sequence_header function defines header data for the sequence layer of the MPEG bit stream, and the sequence_extension( ) function defines extension data for the sequence layer of the MPEG bit stream.

A do{ }while syntax following the sequence_extension( ) function extracts from the data stream data elements described based on a function in the { } of the do statement while a condition defined by the while statement is true. That is, the do{ }while statement executes a decoding process for extracting from the data stream the data elements described based on the function in do statement, while the condition defined by the while statement is true.

A nextbits( ) function used in the while statement compares bits or a bit string appearing in the bit stream with the next data element to be decoded. In the example of syntax in FIG. 38, the nextbits( ) function compares the bit string in the bit stream with sequence_end_code indicative of the end of the video sequence, and when the bit string in the bit stream and the sequence_end_code do not match, the condition indicated by the while statement is true. Accordingly, the do{ }while syntax following the sequence_extension( ) function indicates that the data elements defined by the function in the do statement is described in the bit stream unless the seqence_end_code indicative of the end of the video sequence appears.

In the bit stream, the data elements defined by the sequence_extension( ) function are followed by data elements defined by extension_and_user_data(0) function. The extension_and_user_data(0) function defines extension and user data for the sequence layer of the MPEG bit stream.

A do{ }while syntax following the extension_and_user_data(0) function extracts from the bit stream data elements described based on a function in the { } of the do statement while a condition defined by the while statement is true. A nextbits( ) function used in the while statement determines whether bits or a bit string appearing in the bit stream match (es) picture_start_code or group_start_code. If the bits or bit string appearing in the bit stream match(es) the picture_start_code or group_start_code, the condition defined by the while statement is true. Thus, when the picture_start_code or group_start_code appears in the bit stream, since this start code describes codes for the data elements defined by the function in the do statement, the do{ }while syntax can search for the start code indicated by the picture_start_code or group_start_code to extract from the bit stream the data elements defined in the do statement.

The if statement described at the beginning of the do statement indicates the condition that the group_start_code appears in the bit stream. If the condition indicated by this if statement is true, then in the description of this bit stream, the group_start_code is followed by data elements defined by a group_of_picture_header(1) function and an extension_and_user_data(1) function.

The group_of_picture_header(1) function defines header data for the GOP layer of the MPEG data stream.

The extension_and_user_data(1) function defines extension data (extension_data) and user data (user_data) for the GOP layer of the MPEG bit stream.

Further, in the description of this bit stream, the data elements defined by the group_of_picture_header(1) and extension_and_user_data(1) functions are followed by data elements defined by a picture_header( ) function and a picture_coding_extension( ) function. Of course, if the condition indicated by the if statement described above is not true, the data elements defined by the group_of_picture_header(1) and extension_and_user_data(1) functions are not described, so that the data elements defined by the extension_and_user_data(0) function are followed by the data elements defined by the picture_header( ) and picture_coding_extension( ) functions.

The picture_header( ) function defines header data for the picture layer of the MPEG bit stream.

The picture_coding_extension( ) function defines first extension data for the picture layer of the MPEG bit stream.

The next while statement determines whether or not a condition indicated by the next if statement is true while a condition defined by this while statement is true. A nextbits( ) function used in this while statement determines whether a bit string appearing in the bit stream matches extension_start_code or user_data_start_code. If the bit string appearing in the bit stream matches the extension_start_code or user_data start_code, the condition defined by this while statement is true.

A first if statement determines whether or not the bit string appearing in the bit stream matches the extension_start_code. If the bit string appearing in the bit stream matches the 32-bit extension_start_code, then in the description of the bit stream, the extension_start_code is followed by data elements defined by extension_data(2) function.

A second if statement determines whether or not the bit string appearing in the bit stream matches the user_data_start_code. If the bit string appearing in the bit stream matches the 32-bit user_data_start_code, it is determined whether or not a condition indicated by a third if statement is true. The user_data_start_code is a start code indicating the start of the user data area of the picture layer of the MPEG bit stream.

The third if statement is a syntax for determining whether or not a bit string appearing in the bit stream matches History_Data_ID. If the bit string appearing in the bit stream matches the 32-bit History_Data_ID, then in the description of the user data area of the picture layer of this MPEG bit stream, a code indicated by this 32-bit History_Data_ID is followed by data elements defined by a converted_history_stream( ) function.

The converted_history_stream( ) function describes history information and data to transmit all the encoding parameters used for MPEG encoding. The details of data elements defined by this converted_history_stream( ) function will be discussed below with reference to FIGS. 40 to 47 as history_stream( ). In addition, the History_Data_ID is a start code indicative of the head of the history information and data described in the user data area of the picture layer of the MPEG bit stream.

An else statement is a syntax indicating that the condition indicated by the third if statement is not true. Accordingly, if the description of the user data area of the picture layer of this MPEG bit stream does not contain the data elements defined by the converted_history_stream( ) function, it contains the data elements defined by the user_data( ) function.

In FIG. 38, the history information is described in the converted_history_stream( ) and not in the user_data( ), whereas the converted_history_stream( ) is described as a kind of user_data according to the MPEG standard. Thus, although the specification may state that the history information is described in the user_data, this means that the information is described as a kind of user_data according to the MPEG standard.

The picture_data( ) function describes data elements for the slice and macroblock layers after the user data for the picture layer of the MPEG bit stream. The data elements indicated by the picture_data( ) function are typically described after the data elements defined by the converted_history_stream( ) function described in the user data area of the picture layer of the bit stream or by the user_data( ) function. If, however, a bit stream indicating the data elements of the picture layer does not contain the extension_start_code or the user_data_start_code, the data elements indicated by the picture_data( ) function are described after the data elements defined by the picture_coding_extension( ) function.

The data elements indicated by the picture_data( ) function are followed by the data elements defined by the sequence_header( ) and sequence_extension( ) functions. The data elements defined by the sequence_header( ) and sequence_extension( ), functions are identical to the data elements described by the sequence_header( ) and sequence_extension( ) functions in the head of the video stream sequence. The identical data are described in the stream to prevent the following error: if a bit stream reception device starts receiving the middle of the data stream (for example, a portion of the bit stream corresponding to the picture layer), it cannot receive the data for the sequence layer, resulting in a failure to decode the stream.

After the data elements defined by the final sequence_header( ) and sequence_extension( ) functions, that is, at the end of the data stream, is described the 32-bit sequence_end_code indicative of the end of the sequence.

Figure 39:
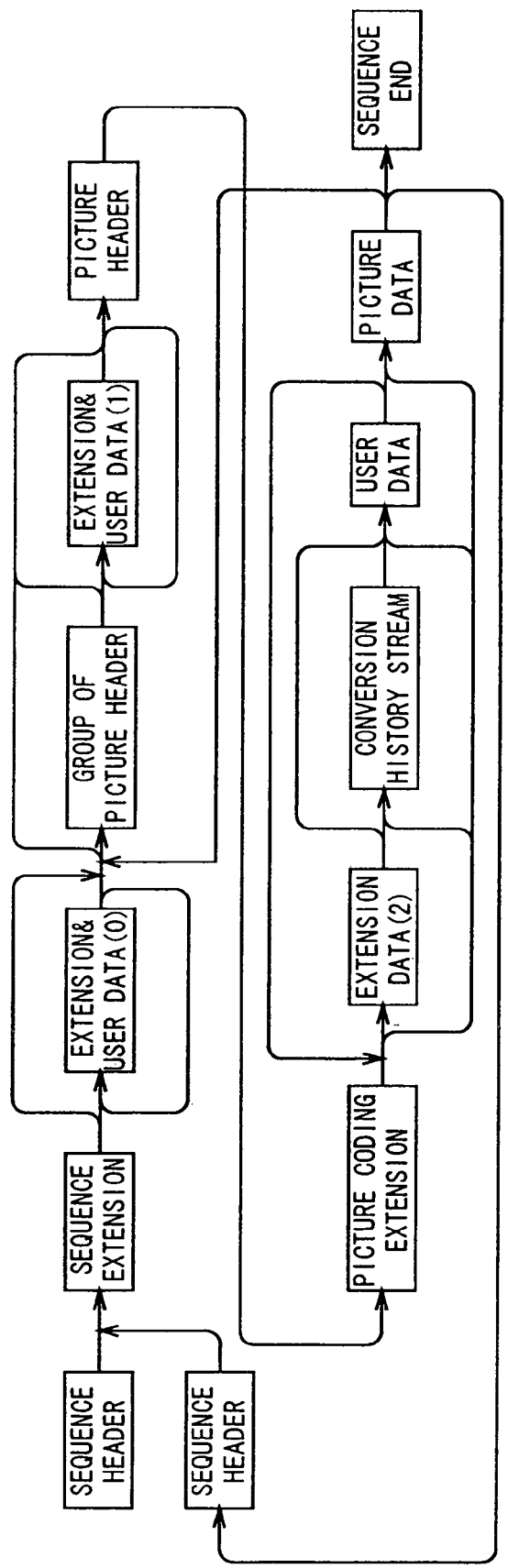
FIG. 39 is a diagram for describing the configuration of the syntax in FIG. 38.

A basic configuration for the above syntax is schematically shown in FIG. 39.

Next, the history stream defined by the converted_history_stream( ) function will be explained.

The converted_history_stream( ) is a function for inserting the history stream indicative of the history information into the user data area of the picture layer of the MPEG stream. The term "converted" means that this is a stream that has undergone a conversion process for inserting a marker bit (1 bit) into a history stream at intervals of at least 22 bits in order to prevent start emulation, the history stream being composed of history data to be inserted into the user area.

The converted_history_stream( ) is described in the form of a fixed-length history stream (FIGS. 40 to 46) or a variable length history stream (FIG. 47), which will be described below. If the encoder selects the fixed-length history stream, the decoder can advantageously use simple circuits and software to decode each data element from the history stream. On the other hand, if the encoder selects the variable-length history stream, it can arbitrarily select the history information (data elements) described in the user area of the picture layer to reduce the amount of history stream data and thus the data rate of the overall encoded bit stream.

The terms "history stream," "history information," "history data," and "history parameters," as described herein, mean the encoding parameters (or data elements) used for past encoding processes and not the encoding parameters used for the current (final) encoding process. An example will be described below where during the first-generation encoding process, a picture is encoded into the I type before transmission, where during the second-generation encoding process, this I picture is encoded into the P type before transmission, and where during the third-generation encoding process, this P picture is further encoded into the B type before transmission.

Encoding parameters used for the third-generation encoding process are described at predetermined positions in the sequence, GOP, picture, slice, and macroblock layers of the encoded bit stream generated during the third-generation encoding process. On the other hand, encoding parameters used for the first- and second-generation encoding processes, past encoding processes, are not described in the sequence or GOP layer in which the encoding parameters used for the third-generation encoding process are described but in the user data area of the picture layer as history information for encoding parameters in accordance with the above described syntax.

First, the fixed-length history stream syntax will be described with reference to FIGS. 40 to 46.

Encoding parameters contained in the sequence header of the sequence layer used for the past encoding process (for example, the first- or second-generation encoding process) are first inserted, as a history stream, into the user data area of the picture layer of a bit stream generated during the final encoding process (for example, the third-generation encoding process). It should be noted that history information such as the sequence header of the sequence layer of a bit stream generated during the past encoding process is not inserted into the sequence header of the sequence layer of the bit stream generated during the final encoding process.

Data elements contained in the sequence header (sequence_header) used for the past encoding process are composed of sequence_header_code, sequence_header_present_flag, horizontal_size_value, marker_bit, vertical_size_value, aspect_ratio_information, frame_rate_code, bit_rate_value, VBV_buffer_size_value, constrained_parameter_flag, load_intra_quantiser_matrix, load_non_intra_quantizer_matrix, intra_quantiser_matrix, and non_intra_quantiser_matrix, etc.

The sequence_header_code is data representing a start synchronization code for the sequence layer. The sequence_header_present_flag is data indicating whether or not the data in the sequence_header is valid. The horizontal_size_value is data consisting of lower 12 bits of the number of pixels in a horizontal direction of an image. The marker_bit is bit data inserted to start code emulation. The vertical_size_value is data consisting of lower 12 bits of the number of vertical lines in an image. The aspect_ratio_information is data representing an image aspect ratio or a display screen aspect ratio. The frame_rate_code is data representing an image display cycle.

The bit_rate_value is lower-18-bit (round-up using 400 bsp as a unit) data of the bit rate for limiting the amount of generated bits. The VBV_buffer_size_value is lower-10-bit data of a value determining the size of a virtual buffer (a video buffer verifier) for controlling the amount of generated codes. The constrained_parameter_flag is data indicating that each parameter is under the limit. The load_intra_quantiser_matrix is data indicating the presence of intra-MB quantization matrix data. The load_non_intra_quantiser_matrix is data indicating the presence of non_intra-MB quantization matrix data. The intra_quantiser_matrix is data indicating a value for the intra-MB quantization matrix data. The non-intra_quantiser_matrix is data indicating a value for non-intra-MB quantization matrix data.

Following these data elements, data elements representing a sequence extension of the sequence layer used for the past encoding process are described, as a history stream, in the user data area of the picture layer of the bit stream generated during the final encoding process.

The data elements representing the sequence extension (sequence_extension) used for the past encoding process are extension_start_code, extension_start_code_identifier, sequence_extension_present_flag, profile_and_level_indication, progressive_sequence, chroma_format, horizontal_size extension, vertical_size_extension, bit_rate_extension, vbv_buffer_size_extension, low_delay, frame_rate_extension_n, frame_rate_extension_d, etc.

The extension_start_code is data representing a start synchronization code for the extension data. The extension_start_code_identifier is data indicating which extension data is sent. The sequence_extension_present_flag is data indicating whether or not the data in the sequence extension is valid. The profile_and_level_indication is data specifying the profile and level of video data. The progressive_sequence is data indicating that the video data is sequentially scanned. The chroma_format is data specifying the chromatic aberration format of the video data.

The horizontal_size_extension is higher-2-bit data added to the horizontal_size_value of the sequence header. The vertical_size_extension is higher-2-bit data added to the vertical_size_value of the sequence header. The bit_rate_extension is higher-12-bit data added to the bit_rate_value of the sequence header. The vbv_buffer_size_extension is higher-8-bit data added to the vbv_buffer_size_value of the sequence header. The low_delay is data indicative of the absence of the B picture. The frame_rate_extension_n is data that is combined with the frame_rate_code of the sequence header to obtain a frame rate. The frame_rate_extension_d is data that is combined with the frame_rate_code of the sequence header to obtain the frame rate.

Following these data elements, data elements representing a sequence display extension of the sequence layer used for the past encoding process is described, as a history stream, in the user area of the picture layer of the bit stream.

The data elements described as the sequence display extension (sequence_display_extension) are composed of extension_start_code, extension_start_code_identifier, sequence_display_extension_present_flag, video_format, colour_description, colour_primaries, transfer_characteristics, matrix_coefficients, display_horizontal_size, and display_vertical_size.

The extension_start_code is data representing a start synchronization code for the extension data. The extension_start_code_identifier is a code indicating which extension data is sent. The sequence_display_extension_present_flag is data indicating whether or not the data elements in the sequence display extension are valid. The video_format is data representing the video format of a source signal. The colour_description is data indicative of the presence of detailed data on a color space. The colour_primaries is data indicative of the details of the color characteristics of the source signal. The transfer_characteristics is data indicating in detail how photoelectric conversion has been carried out. The matrix_coefficients is data indicating in detail how the primary colors have been converted into the source signal. The display_horizontal_size is data representing an active area (horizontal size) of an intended display. The display_vertical_size is data representing an active area (vertical size) of an intended display.

Following these data elements, a macroblock assignment data (macroblock_assignment_in_user_data) indicating phase information for a macroblock generated during the past encoding process is described, as a history stream, in the user area of the picture layer of the bit stream generated during the final encoding process.

The macroblock_assignment_in_user_data indicating the phase information for the macroblock is composed of data elements such as macroblock_assignment_present_flag, v_phase, and h_phase.

The macroblock_assignment_present_flag is data indicating whether or not the data elements in the macroblock_assignment_in_user_data is valid. The v_phase is data indicating vertical phase information for use in cutting out a macroblock from the image data. The h_phase is data indicating horizontal phase information for use in cutting out a macroblock from the image data.

Following these data elements, data elements representing the GOP header of the GOP layer used for the past encoding process is described, as a history stream, in the user area of the picture layer of the bit stream generated during the final encoding process.

The data elements representing the GOP header (group_of_picture_header) are composed of group_start_code, group_of_picture_header_present_flag, time_code, closed_gop, and broken_link.

The group_start_code is data indicating a start synchronization code for the GOP layer. The group_of_picture_header_present_flag is data indicating whether or not the data elements in the group_of_picture_header are valid. The time_code is a time code indicating the time from the head of the sequence of the leading picture of a GOP. The closed_gop is flag data indicating that the image in the GOP can be reproduced independently of the other GOPs. The broken_link is flag data indicating that the leading B picture in the GOP cannot be reproduced accurately due to edition or the like.

Following these data elements, data elements representing the picture header of the picture layer used for the past encoding process is described, as a history stream, in the user area of the picture layer of the bit stream generated during the final encoding process.

The data elements for the picture header (picture_header) are composed of picture_start_code, temporal_reference, picture_coding_type, vbv_delay, full_pel_forward_vector, forward_f_code, full_pel_backward_vector, and backward_f_code.

Specifically, the picture_start_code is data representing a start synchronization code for the picture layer. The temporal_reference is data indicating the display order of a picture and which is reset at the head of a GOP. The picture_coding_type is data indicating the picture type. The vbv_delay is data indicating the initial state of the virtual buffer during a random access. The full_pel_forward_vector is data indicating whether the precision of forward motion vectors is in integers or half pixels. The forward_f_code is data indicating a retrieval range of the forward motion vectors. The full_pel_backward_vector is data indicating whether the precision of backward motion vectors is in integers or half pixels. The backward_f_code is data indicating a retrieval range of the backward motion vectors.

Following these data elements, a picture coding extension of the picture layer used for the past encoding process is described, as a history stream, in the user area of the picture layer of the bit stream generated during the final encoding process.

Data elements for the picture coding extension (picture_coding_extension) are composed of extension_start_code, extension_start_code_identifier, f_code[0][0], f_code[0][1], f_code[1][0], f_code[1][1], intra_dc_precision, picture_structure, top_field_first, frame_predictive_frame_dct, concealment_motion_vectors, q_scale_type, intra_vlc_format, alternate_scan, repeat_first_field, chroma_420_type, progressive_frame, composite_display_flag, v_axis, field_sequence, sub_carrier, burst_amplitude, and sub_carrier phase.

The extension_start_code is a start code indicating the start of extension data for the picture layer. The extension_start_code_identifier is a code indicating which extension cide is sent. The f_code[0][0] is data representing a retrieval range of horizontal motion vectors in a forward direction. The f_code[0][1] is data representing a retrieval range of vertical motion vectors in the forward direction. The f_code[1][0] is data representing a retrieval range of horizontal motion vectors in a backward direction. The f_code[1][1] is data representing a retrieval range of vertical motion vectors in the backward direction.

The intra_dc_precision is data representing the accuracy of a DC coefficient. The picture_structure is data indicating whether the picture has a frame or field structure. If the picture has the field structure, this data also indicates whether the field is higher or lower. The top_field_first is data indicating the first field is higher or lower if the picture has the frame structure. The frame_predictive_frame_dct is data indicating that frame mode DCT predictions indicate only the frame mode, if the picture has the frame structure. The concealment_motion_vectors is data indicating that an intramacroblock has a motion vector for concealing transmission errors.

The q_scale_type is data indicating whether to use a linear or non-linear quantization scale. The intra_vlc_format is data indicating whether another two-dimensional VLC is used for the intramacroblock. The alternate_scan is data indicating whether to select a zigzag or alternate scan. The repeat_first_field is data used for 2:3 pull down. The chroma_420_type is data representing the same value as the next progressive_frame if the signal format is 4:2:0 and otherwise representing 0. The progressive_frame is data indicating whether or not this picture has been sequentially scanned successfully. The composite_display_flag is data indicating whether or not the source signal is composite.

The v_axis is data used if the source signal is PAL. The field_sequence is data used if the source signal is PAL. The sub_carrier is data used if the source signal is PAL. The burst_amplitude is data used if the source signal is PAL. The sub_carrier phase is data used if the source signal is PAL.

Following these data elements, a quantization matrix extension used for the past encoding process is described, as a history stream, in the user area of the picture layer of the bit stream generated during the final encoding process.

Data elements for the quantization matrix extension (quant_matrix_extension) are composed of extension_start_code, extension_start_code_identifier, quant_matrix_extension_present_flag, load_intra_quantiser_matrix, intra_quantiser_matrix[64], load_non_intra_quantiser_matrix, non_intra_quantiser_matrix[64], load_chroma_intra_quantiser_matrix, chroma_intra_quantiser_matrix[64], load_chroma_non_intra_quantiser_matrix, and chroma_non_intra_quantiser_matrix[64].

The extension_start_code is a start code indicative of the start of this quantization matrix extension. The extension_start_code identifier is a code indicating which extension data is sent. The quant_matrix_extension_present_flag is data indicating whether or not the data elements in this quantization matrix extension are valid. The load_intra_quantiser_matrix is data indicative of the presence of quantization matrix data for an intramacroblock. The intra_quantiser_matrix is data indicating a value for the quantization matrix for the intramacroblock. The load_non_intra_quantiser_matrix is data indicative of the presence of quantization matrix data for a non-intramacroblock. The non_intra_quantiser_matrix is data representing a value for the quantization matrix data for the non-intramacroblock. The load_chroma_intra_quantiser_matrix is data indicative of the presence of quantization matrix data for chromatic aberration intramacroblock. The chroma_intra_quantiser_matrix is data indicative of a value for the quantization matrix data for the chromatic aberration intramacroblock. The load_chroma_non_intra_quantiser_matrix is data indicative of the presence of quantization matrix data for chromatic aberration non-intramacroblock. The chroma_non_intra_quantiser_matrix is data indicative of a value for the quantization matrix data for the chromatic aberration non-intramacroblock.

Following these data elements, a copyright extension used for the past encoding process is described, as a history stream, in the user area of the picture layer of the bit stream generated during the final encoding process.

Data elements for the copyright extension (copyright_extension) are composed of extension_start_code, extension_start_code_identifier, copyright_extension_present_flag, copyright_flag, copyright_identifier, original_or_copy, copyright_number_1, copyright_number_2, and copyright_number_3.

The extension_start_code is a start code indicative of the start of the copyright extension. The extension_start_code_identifier is a code indicating which extension data is sent. The copyright_extension_present_flag is data indicating whether or not the data elements in the copyright extension are valid. The copyright_flag indicates whether or not a copyright is awarded to coded video data up to the next copyright extension or a sequence end.

The copyright_identifier is data identifying a copyright registration organization specified by ISO/IEC JTC/SC29. The original_or_copy is data indicating whether data in the bit stream is an original or a copy. The copyright_number_1 is data representing bits 44 to 63 of a copyright number. The copyright_number_2 is data representing bits 22 to 43 of a copyright number. The copyright_number_3 is data representing bits 0 to 21 of a copyright number.

Following these data elements, a picture display extension (picture_display_extension) used for the past encoding process is described, as a history stream, in the user area of the picture layer of the bit stream generated during the final encoding process.

Data elements for this picture display extension are composed of extension_start_code, extension_start_code_identifier, picture_display_extension_present_flag, frame_center_horizontal_offset_1, frame_center_vertical_offset_1, frame_center_horizontal_offset_2, frame_center_vertical_offset_2, frame_center_horizontal_offset_3, and frame_center_vertical_offset_3.

The extension_start_code is a start code indicative of the start of the picture display extension. The extension_start_code_identifier is a code indicating which extension data is sent. The picture_display_extension_present_flag is data indicating whether the data elements in the picture display extension are valid. The frame_center_horizontal_offset is data indicating horizontal offsets in a display area and which can define three offset values. The frame_center_vertical_offset is data indicating vertical offsets in the display area and which can define three offset values.

The present invention is characterized in that the history information representing this picture display extension is followed by data elements for re_coding_stream_information. Data elements for the re_coding_stream_information are composed of user_data_start_code, re_coding_stream_info_ID, red_bw_flag, red_bw_indicator, or the like.

The user_data_start_code is a start code indicating that the user_data starts. The re_coding_stream_info_ID is a 16-bit integer used to identify the re_coding_stream_infor( ) function. Specifically, the value of this integer is "1001 0001 1110 1100" (0x91ec).

The red_bw_flag is a 1-bit flag that is 0 for transmission of coding parameters for all history information and that is 1 for selective transmission of coding parameters for history information. The red_bw_indicator is a 2-bit integer that is an indicator for defining a data set of coding parameters.

The re_coding_stream_information, the red_bw_flag, the red_bw_indicato, and the data set will be described later in detail.

User data (user_data) used for the past encoding process is described, as a history stream, in the user area of the picture layer of the bit stream generated during the final encoding process.

Following the user data, information on the macroblock layer used for the past encoding process is described as a history stream.

The information on the macroblock layer is composed of data elements for the positions of macroblocks (macroblock) such as macroblock_address_h, macroblock_address_v, slice_header_present_flag, and skipped_macroblock_flag, data elements for a macroblock mode (macroblock_modes[ ]) such as macroblock_quant, macroblock_motion_forward, macroblock_motion_backward, macroblock_pattern, macroblock_intra, spatial_temporal_weight_code_flag, frame_motion_type, and dct_type, data elements for quantization step control such as quantiser_scale_code, data elements for motion compensation such as PMV[0][0][0], PMV[0][0][1], motion_vertical_field_select[0][0], PMV[0][1][0], PMV[0][1][1], motion_vertical_field_select[0][1], PMV[1][0][0], PMV[1][0][1], motion_vertical_field_select[1][0], PMV[1][1][0], PMV[1][1][1], and motion_vertical_field_select[1][1], data elements for a macroblock pattern such as coded_block_pattern, and data elements for the amount of generated codes such as num_mv_bits, num_coef_bits, and num_other_bits.

The data elements for the macroblock layer will be described below in detail.

The macroblock_address_h is data for defining the horizontal absolute position of the current macroblock. The macroblock_address_v is data for defining the vertical absolute position of the current macroblock. The slice_header_present_flag is data indicating whether or not this macroblock is at the head of the slice layer and includes a slice header. The skipped_macroblock_flag is data indicating whether to skip this macroblock during a decoding process.

The macroblock_quant is data derived from a macroblock type (macroblock_type), shown in FIGS. 63 and 64, described below, and indicates whether or not the quantiser_scale_code appears in the bit stream. The macroblock_motion_forward is data derived from the macroblock type shown in FIGS. 63 and 64 and is used for the decoding process. The macroblock_motion_backward is data derived from the macroblock type shown in FIGS. 63 and 64 and is used for the decoding process. The macroblock_pattern is data derived from the macroblock type shown in FIGS. 63 and 64 and indicates whether or not the coded_block_pattern appears in the bit stream.

The macroblock_intra is data derived from the macroblock type shown in FIGS. 63 and 64 and is used for the decoding process. The spatial_temporal_weight_code_flag is data derived from the macroblock type shown in FIGS. 63 and 64 and indicates whether or not the bit stream contains spatial_temporal_weight_code indicative of a method for up-sampling lower layer images using time scalability.

The frame_motion_type is a 2-bit code indicating a predicted type of a macroblock in a frame. This code is "00" if two prediction vectors are present and are of a field-base prediction type, "01" if one prediction vector is present and is of the field-base prediction type, "10" if one prediction vector is present and is of a frame-base prediction type, and "11" if one prediction vector is present and is of a dual prime prediction type. The field_motion_type is a 2-bit code indicating a motion prediction for a macroblock in a field. This code is "01" if one prediction vector is present and is of the field-base prediction type, "10" if two prediction vectors are present and are of an 18×8 macroblock-base prediction type, and "11" if one prediction vector is present and is of a dual prime prediction type. The dct_type is data indicating whether the DCT is in a frame or field DCT mode. The quantiser_scale_code is data indicating the quantization step size of a macroblock.

Next, data elements for motion vectors will be described. A motion vector is encoded into a differential from the preceding encoded vector in order to reduce the number of motion vectors required for decoding. The decoder must maintain four motion vector predicted values (each including horizontal and vertical components) to decode motion vectors. These predicted motion vectors are represented as PMV[r][s][v]. The [r] is a flag indicating a first or a second motion vector in a macroblock, and is "0" for the first motion vector and "1" for the second motion vector. The [s] is a flag indicating whether a motion vector in a macroblock is a forward or backward vector, and is "0" if this motion vector is a forward vector and "1" if it is a backward vector. The [v] is a flag indicating whether a horizontal or vertical vector component in a macroblock, and is "0" for a horizontal vector component and "1" for a vertical vector component.

Thus, the PMV[0][0][0] represents data for the horizontal component of the forward motion vector of the first vector. The PMV[0][0][1] represents data for the vertical component of the forward motion vector of the first vector. The PMV[0][1][0] represents data for the horizontal component of the backward motion vector of the first vector. The PMV[0][1][1] represents data for the vertical component of the backward motion vector of the first vector.

The PMV[1][0][0] represents data for the horizontal component of the forward motion vector of the second vector. The PMV[1][0][1] represents data for the vertical component of the forward motion vector of the second vector.

The PMV[1][1][0] represents data for the horizontal component of the backward motion vector of the second vector. The PMV[1][1][1] represents data for the vertical component of the backward motion vector of the second vector.

The motion_vertical_field_select[r][s] is data indicating which reference field is used for a prediction form. If the motion_vector_field_select[r][s] is "0," a top reference field is used. If it is "1," a bottom reference field is used.

Accordingly, motion_vertical_field_select[0][0] indicates a reference field for use in generating the forward motion vector of the first vector. motion_vertical_field_select[0][1] indicates a reference field for use in generating the backward motion vector of the first vector. motion_vertical_field_select

[1][0] indicates a reference field for use in generating the forward motion vector of the second vector. motion_vertical_field_select[1][1] indicates a reference field for use in generating the backward motion vector of the second vector.

The coded_block_pattern is data of a variable length indicating which of plural DCT blocks that store DCT coefficients has a significant coefficient (a nonzero coefficient). The num_mv_bits is data indicative of the amount of codes in a motion vector in a macroblock. The num_coef_bits is data indicative of the amount of codes in a DCT coefficient in a macroblock. The num_other_bits is data indicating the amount of codes in a macroblock other than the motion vectors and DCT coefficients.

Next, a syntax for decoding each data element from a history stream of a variable length will be explained with reference to FIGS. 47 to 67.

This variable-length history stream is composed of the next_start_code( ) function, the sequence_header( ) function, the sequence_extension( ) function, the extension_and_user_data(0) function, the group_of_picture_header( ) function, the extension_and_user_data(1) function, the picture_header( ) function, the picture_coding_extension( ) function, the re_coding_stream_info( ) function, the extension_and_user_data(2) function, and the picture_data( ) function.

Since the next_start_code( ) function searches for a start code present in the bit stream, there is described in the head of the history stream, data elements used for the past encoding process and defined by the sequence_header( ) function as shown in FIG. 48.

The data elements defined by the sequence_header( ) function is the sequence_header_code, the sequence_header_present_flag, the horizontal_size_value, the vertical_size_value, the aspect_ratio_information, the frame_rate_code, the bit_rate_value, the marker_bit, the VBV_buffer_size_value, the constrained_parameter_flag, the load_intra_quantiser_matrix, intra_quantiser_matrix, the load_non_intra_quantiser_matrixm, the non_intra_quantiser_matrix, etc.

The sequence_header_code is data representing a start synchronization code for the sequence layer. The sequence_header_present_flag indicates whether or not the data in the sequence_header is valid. The horizontal_size_value is data consisting of lower 12 bits of the number of pixels in a horizontal direction of an image. The vertical_size_value is data consisting of lower 12 bits of the number of vertical lines in an image. The aspect_ratio_information is data representing an aspect ratio of the pixel or display screen aspect ratio. The frame_rate_code is data representing a image display cycle. The bit_rate_value is lower-18-bit (round-up using 400 bsp as a unit) data of a bit rate for limiting the amount of generated bits.

The marker_bit is bit data inserted to prevent start code emulation. The VBV_buffer_size_value is lower-10-bit data of a value determining the size of a virtual buffer (a video buffer verifier) for controlling the amount of generated codes. The constrained_parameter_flag is data indicating that each parameter is under the limit. The load_intra_quantiser_matrix is data indicating the presence of intra-MB quantization matrix data. The intra_quantiser_matrix is data indicating a value for the intra-MB quantization matrix data. The load_non_intra_quantiser_matrix is data indicating the presence of non_intra-MB quantization matrix data. The non-intra_quantiser_matrix is data indicating a value for non-intra-MB quantization matrix data.

Following the data elements defined by the sequence_header( ) function, data elements defined by the sequence_extension( ) function such as those shown in FIG. 49 are described as a history stream.

The data elements defined by the sequence_extension( ) function are the extension_start_code, the extension_start_code_identifier, the sequence_extension_present_flag, the profile_and_level_indication, the progressive_sequence, the chroma_format, the horizontal_size_extension, the vertical_size_extension, the bit_rate_extension, the vbv_buffer_size_extension, the low_delay, the frame_rate_extension_n, the frame_rate_extension_d, etc.

The extension_start_code is data representing a start synchronization code for extension data. The extension_start_code_identifier is data indicating which extension data is sent. The sequence_extension_present_flag is data indicating whether or not the data in the sequence extension is valid. The profile_and_level_indication is data specifying the profile and level of video data. The progressive_sequence is data indicating that the video data is sequentially scanned. The chroma_format is data specifying the chromatic aberration format of the video data. The horizontal_size_extension is higher-2-bit data added to the horizontal_size_value of the sequence header. The vertical_size_extension is higher-2-bit data added to the vertical_size_value of the sequence header. The bit_rate_extension is higher-12-bit data added to the bit_rate_value of the sequence header. The vbv_buffer_size_extension is higher-8-bit data added to the vbv_buffer_size_value of the sequence header.

The low_delay is data indicative of the absence of the B picture. The frame_rate_extension_n is data that is combined with the frame_rate_code of the sequence header to obtain a frame rate. The frame_rate_extension_d is data that is combined with the frame_rate_code of the sequence header to obtain the frame rate.

Following the data elements defined by the sequence_extension( ) function, data elements defined by the extension_and_user_data(0) function such as those shown in FIG. 50 are described as a history stream. When "i" is not 1, the extension_and_user_data(i) function does not describe the data elements defined by the extension_data( ) function but only the data elements defined by the user_data( ) function, as a history stream.

The extension_and_user_data(0) function describes only the data elements defined by the user_data( ) function, as a history stream.

The user_data( ) function describes the user data as a history stream based on such a syntax as shown in FIG. 51.

Following the data elements defined by the extension_and_user_data(0) function, data elements defined by the group_of_picture_header( ) function and the extension_and_user_data(1) function, as a history stream, as shown in FIG. 52. However, the data elements defined by the group_of_picture_header( ) function and the extension_and_user_data(1) function are described only if the group_start_code indicative of the start code for the GOP layer is described in the history stream.

The data elements defined by the group_of_picture_header( ) function are composed of the group_start_code, the group_of_picture_header_present_flag, the time_code, the closed_gop, and the broken_link.

The group_start_code is data indicating a start synchronization code for the GOP layer. The group_of_picture_header_present_flag is data indicating whether or not the data elements in the group_of_picture_header are valid. The time_code is a time code indicating the time from the head of the sequence of the leading picture of a GOP. The closed_gop is flag data indicating that the image in the GOP can be reproduced independently of the other GOPs. The broken_link is flag data indicating that the leading B picture in the GOP cannot be reproduced accurately due to edition or the like.

Like the extension_and_user_data(0) function, the extension_and_user_data(1) function describes only the data elements defined by the user_data( ) function, as a history stream.

If the history stream does not contain the group_start_code indicative of the start code for the GOP layer, the history stream has described therein no data elements defined by the group_of_picture_header( ) function and the extension_and_user_data(1) function. In this case, following the data elements defined by the extension_and_user_data(0) function, data elements defined by the picture_header( ) function are described as a history stream.

The data elements defined by the picture_header( ) function are the picture_start_code, the temporal_reference, the picture_coding_type, the vbv_delay, the full_pel_forward_vector, the forward_f_code, the full_pel_backward_vector, the backward_f_code, extra_bit picture, and extra_information_picture, as shown in FIG. 53.

Specifically, picture_start_code is data representing a start synchronization code for the picture layer. The temporal_reference is data indicating the display order of a picture and which is reset at the head of a GOP. The picture_coding_type is data indicating the picture type. The vbv_delay is data indicating the initial state of the virtual buffer during a random access. The full_pel_forward_vector is data indicating whether the precision of forward motion vectors is in integers or half pixels. The forward_f_code is data indicating a retrieval range of the forward motion vectors. The full_pel_backward_vector is data indicating whether the precision of backward motion vectors is in integers or half pixels. The backward_f_code is data indicating a retrieval range of the backward motion vectors. The extra_bit_picture is a flag indicating the presence of subsequent additional information. If the extra_bit_picture is "1," the extra_information_picture follows, whereas if it is "0," no data follows. The extra_information_picture is information reserved for the standard.

Following the data elements defined by the picture_header( ) function, data elements defined by the picture_coding_extension( ) function such as those shown in FIG. 54 are described as a history stream.

The data elements defined by the picture_coding_extension( ) function are composed of the extension_start_code, the extension_start_code_identifier, the f_code[0] [0], the f_code[0] [1], the f_code[1][0], the f_code[1][1], the intra_dc_precision, the picture_structure, the top_field_first, the frame_predictive_frame_dct, the concealment_motion_vectors, the q_scale_type, the intra_vlc_format, the alternate_scan, the repeat_firt_field, the chroma_420_type, the progressive_frame, composite_display_flag, the v_axis, the field_sequence, the sub_carrier, the burst_amplitude, and the sub_carrier_phase.

The extension_start_code is a start code indicating the start of extension data for the picture layer. The extension_start_code_identifier is a code indicating which extension code is sent. The f_code[0][0] is data representing a retrieval range of horizontal motion vectors in a forward direction. The f_code [0][1] is data representing a retrieval range of vertical motion vectors in the forward direction. The f_code[1][0] is data representing a retrieval range of horizontal motion vectors in a backward direction. The f_code[1][1] is data representing a retrieval range of vertical motion vectors in the backward direction. The intra_dc_precision is data representing the accuracy of a DC coefficient.

The picture_structure is data indicating whether the picture has a frame or field structure. If the picture has the field structure, this data also indicates whether the field is higher or lower. The top_field_first is data indicating whether the first field is higher or lower if the picture has the frame structure. The frame_predictive_frame_dct is data indicating that frame mode DCT predications indicate only the frame mode, if the picture has the frame structure. The concealment_motion_vectors is data indicating that an intramacroblock has a motion vector for concealing transmission errors. The q_scale_type is data indicating whether to use a linear or non-linear quantization scale. The intra_vlc_format is data indicating whether another two-dimensional VLC is used for the intramacroblock.

The alternate_scan is data indicating whether to select a zigzag or alternate scan. The repeat_firt_field is data used for 2:3 pull down. The chroma_420_type is data representing the same value as the next progressive_frame if the signal format is 4:2:0 and otherwise representing 0. The progressive_frame is data indicating whether or not this picture has been sequentially scanned successfully. The composite_display_flag is data indicating whether or not the source signal is composite. The v_axis is data used if the source signal is PAL. The field_sequence is data used if the source signal is PAL. The sub_carrier is data used if the source signal is PAL. The burst_amplitude is data used if the source signal is PAL. The sub_carrier_phase is data used if the source signal is PAL.

Following the data elements defined by the picture_coding_extension( ) function, data elements defined by the re_coding_stream_info( ) function are described as a history stream. The re_coding_stream_info( ) function is characteristic of the present invention and is principally used to describe a combination of history information. The details will be discussed later with reference to FIG. 68.

Following the data elements defined by the re_coding_stream_info( ) function, data elements defined by the extensions_and_user_data(2) function are described as a history stream. As shown in FIG. 50, if the extension start code (extension_start_code) is present in the bit stream contains, the data elements defined by the extension_data( ) function are described in the extension_and_user_data(2) function. Following these data elements, the data elements defined by the user_data( ) function are described if the user data start code (user_data_start_code) is present in the bit stream. If the extension start code and the user data start code are absent from the bit stream, the data elements defined by the extension_data( ) and user_data( ) functions are not described in the bit stream.

The extension_data( ) function describes in the bit stream as a history stream, the data elements indicating the extension_start_code and data elements defined by the quant_matrix_extension( ), copyright_extension( ), and picture_display_extension( ) functions, as shown in FIG. 55.

The data elements defined by the quant_matrix_extension( ) function are, the extension_start_code, the extension_start_code_identifier, the quant_matrix_extension_present_flag, the load_intra_quantiser_matrix, the intra_quantiser_matrix[64], load_non_intra_quantiser_matrix, non_intra_quantiser_matrix[64], the load_chroma_intra_quantiser_matrix, the ckroma_intra_quantiser_matrix [64], the load_chroma_non_intra_quantiser_matrix, and the chroma_non_intra_quantiser_matrix[64], as shown in FIG. 56.

The extension_start_code is a start code indicative of the start of this quantization matrix extension. The extension_start_code_identifier is a code indicating which extension data is sent. The quant_matrix_extension_present_flag is data indicating whether or not the data elements in this quantization matrix extension are valid. The load_intra_quantiser_matrix is data indicative of the presence of quantization matrix data for an intramacroblock. The intra_quantiser_matrix is data indicating a value for the quantization matrix for the intramacroblock. The load_non_intra_quantiser_matrix is data indicative of the presence of quantization matrix data for a non-intramacroblock. The non_intra_quantiser_matrix is data representing a value for the quantization matrix data for the non-intramacroblock. The load_chroma_intra_quantiser_matrix is data indicative of the presence of quantization matrix data for chromatic aberration intramacroblock. The chroma_intra_quantiser_matrix is data indicative of a value for the quantization matrix data for the chromatic aberration intramacroblock. The load_chroma_non_intra_quantiser_matrix is data indicative of the presence of quantization matrix data for chromatic aberration non-intramacroblock. The chroma_non_intra_quantiser_matrix is data indicative of a value for the quantization matrix data for the chromatic aberration non-intramacroblock.

The data elements defined by the copyright_extension( ) function are comprised of the extension_start_code, the extension_start_code_identifier, the copyright_extension_present_flag, the copyright_flag, the copyright_identifier, the original_or_copy, the copyright_number_1, the copyright_number_2, and the copyright_number_3, as shown in FIG. 57.

The extension_start_code is a start code indicative of the start of the copyright extension. The extension_start_code_identifier is a code indicating which extension data is sent. The copyright_extension_present_flag is data indicating whether or not the data elements in the copyright extension are valid.

The copyright_flag indicates whether or not a copyright is awarded to coded video data up to the next copyright extension or a sequence end. The copyright_identifier is data identifying a copyright registration organization specified by ISO/IEC JTC/SC29. The original_or_copy is data indicating whether data in the bit stream is an original or a copy. The copyright_number_1 is data representing bits 44 to 63 of a copyright number. The copyright_number_2 is data representing bits 22 to 43 of a copyright number. The copyright_number_3 is data representing bits 0 to 21 of a copyright number.

The data elements defined by the picture_display_extension( ) function are the extension_start_code_identifier, the frame_center_horizontal_offset, the frame_center_vertical_offset, and the like, as shown in FIG. 58.

The extension_start_code_identifier is a code indicating which extension data is sent. The frame_center_horizontal_offset is data indicating horizontal offsets in a display area and which can define a defined umber of offset values using number_of_frame_center_offsets. The frame_center_vertical_offset is data indicating vertical offsets in the display area and which can define a defined number of offset values using number_of_frame_center_offsets.

Referring back to FIG. 47, following the data elements defined by the extension_and_user_data(2) function, data elements defined by the picture_header( ) function are described as a history stream. The picture_data( ) function, however, is present if the red_bw_flag is not 1 or if the red_bw_indicator is 2 or less. The red_bw_flag and the red_bw_indicator are described in the re_coding_stream_info( ) function and will be described later with reference to FIGS. 68 and 69.

The data elements defined by the picture_data( ) function are those defined by the slice( ) function as shown in FIG. 59. At least one of these data elements defined by the slice( ) function is described in the bit stream.

The slice( ) function describes as a history stream data elements such as the slice start_code, the slice_quantiser_scale_code, the intra_slice_flag, the intra_slice, the reserved_bits, the extra_bit_slice, the extra_information_ slice, and the extra_bit_slice and data elements defined by the macroblock( ) function.

The slice_start_code is a start code indicative of the start of the data elements defined by the slice( ) function. The slide_quantiser_scale_code is a data indicating a quantization step size set for a macroblock present in this slice layer. If, however, the quantiser_scale_code is set for each macroblock, data in macroblock_quantiser_scale_code set for each macroblock is used preferentially.

The intra_slice_flag is a flag indicating whether or not the intra_slice and the reserved_bits are present in the bit stream. The intra_slice is data indicating whether or not a non-intramacroblock is present in the slice layer. If any of the macroblocks in the slice layer is a non-intramacroblock, the intra_slice is "0." If all the macroblocks in the slice layer are non-intramacroblocks, the intra_slice is "1." The reserved_bits is 7-bit data and is "0." The extra_bit_slice is a flag indicative of the presence of additional information as a history stream. If the extra_information_slice follows, this flag is set to "1," whereas if no additional information follows, it is set to "0."

Following these data elements, the data elements defined by the macroblock( ) function are described as a history stream.

The macroblock( ) function describes data elements such as macroblock_escape, macroblock_address_increment, macroblock_quantiser_scale_code, and marker_bit, and data elements defined by a macroblock_modes function, a motion_vectors (s) function, and a code_block_pattern( ) function.

The macroblock_escape is a fixed bit string indicating whether or not the difference between a reference macroblock and the preceding macroblock is 34 or more. If the difference between the reference macroblock and the preceding macroblock is 34 or more, 33 is added to the value of the macroblock_address_increment. The macroblock_address_increment is data indicating a difference in the horizontal direction between the reference macroblock and the preceding macroblock. If one macroblock_escape is present before the macroblock_address_increment, the data indicative of the actual differential in the horizontal direction between the reference macroblock and the preceding macroblock is obtained by adding 33 to the value of the macroblock_address_increment.

The macroblock_quantiser_scale_code is a quantization step size set for each macroblock and is present only when the macroblock_quant is "1." Each slice layer has the slice_quantiser_scale_code set therefor and indicating the quantization step size therefor, and this quantization step size is selected if the macroblock_quantiser_scale_code is set for the reference macroblock.

Following the macroblock_address_increment, data elements defined by the macroblock_modes( ) function are described. The macroblock_modes( ) function describes data elements such as macroblock_type, frame_motion_type, field_motion_type, and dct_type as a history stream, as shown in FIG. 62.

The macroblock_type is data indicative of the encoding type of a macroblock. The details will be discussed later with reference to FIGS. 65 to 67.

If the macroblock_motion_forward or the macroblock_motion_backward is "1," the picture structure is the frame, and the frame_pred_frame_dct is "0." then data elements representing the frame_motion_type are described after the data elements representing the macroblock_type. The frame_pred_frame_dct is a flag indicating whether or not the field_motion_type is present in the bit stream.

The frame_motion_type is a 2-bit code indicating the prediction type of a macroblock in a frame. This code is "00" if two prediction vectors are present and are of the field-base prediction type, "01" if one prediction vector is present and is of the field-base prediction type, "10" if one prediction vector is present and is of the frame-base prediction type, and "11" if one prediction vector is present and is of a dual prime prediction type.

If conditions for the description of the frame_motion_type are not met, the data elements representing the field_motion_type are described after the data elements representing the macroblock_type.

The field_motion_type is a 2-bit code indicating a motion prediction for a macroblock in a field. This code is "01" if one prediction vector is present and is of the field-base prediction type, "10" if two prediction vectors are present and are of an 18×8 macroblock-base prediction type, and "11" if one prediction vector is present and is of a dual prime prediction type.

If the picture structure is the frame, the frame_pred_frame_dct indicates that the frame_motion_type and the dct type are present in the bit stream, data elements representing the dct_type are described after the data elements representing the macroblock_type. The dct_type is data indicating whether the DCT is in a frame or field DCT mode.

Referring back to FIG. 61, if the reference macroblock is of the forward prediction type or is an intramacroblock with a concealing macroblock, data elements defined by the motion_vectors(0) are described. Additionally, if the reference macroblock is of the backward prediction type, data elements defined by the motion_vectors(1) function are described.

The motion_vectors(0) function describes data elements for a first motion vector, and the motion_vectors(1) function describes data elements for a second motion vector.

The motion_vectors (s) function describes data elements for motion vectors as shown in FIG. 63.

If one motion vector is present and the dual prime prediction mode is not used, data elements defined by motion_vertical_field_select[0][s] and motion_vector[0,s] are described.

The motion_vertical_field_select[r][s] is a flag indicating whether the first motion vector (that may be a forward or backward vector) is obtained by referencing a bottom or a top field. The indicator "r" indicates either the first or second vector, and the "s" indicates whether the prediction direction is forward or backward.

The motion_vector[r,s] function describes a data string for motion_code[r][s][t], a data string for motion_residual[r][s][t], and data representing dmvector[t], as shown in FIG. 64.

The motion_code[r][s][t] is data of a variable length representing the magnitude of a motion vector between −16 and +16. Thus, the values of the motion_code[r][s][t] and the motion_residual[r][s][t] can describe detailed motion vectors. The dmvector[t] is data that operates in the dual prime prediction mode to generate motion vectors in one of the fields (for example, the top field is referred to as "one of the fields" compared to the bottom field) by scaling existing motion vectors depending on temporal distances while making corrections so as to reflect interline vertical offsets between the top field and the bottom field. The indicator "r" indicates either the first or second vector, and the "s" indicates whether the prediction direction is forward or backward.

The motion_vector[r,s] function describes a data string representing motion_code[r][s][0] for the horizontal direction, as a history stream, as shown in FIG. 64. Since the number of bits in both motion_residual[0][s][t] and motion_residual[1][s][t] is indicated by f_code[s][t], the f_code[s][t] of a value other than 1 indicates the presence of motion_residual[r][s][t] in the bit stream. When motion_residual[r][s][0] for a horizontal component is not "1" and the motion_code[r][s][0] for a horizontal component is not "0", this means that data elements representing the motion_residual[r][s][0] are present in the bit stream and the motion vector has a horizontal Component. In this case, data elements representing the motion_residual[r][s][0] for a horizontal component are described.

Following these data elements, a data string representing motion_code[r][s][1] for the vertical direction is described as a history stream. As described above, since the number of bits in both motion_residual[0][s][t] and motion_residual[1][s][t] is indicated by the f_code[s][t], the f_code[s][t] of a value other than 1 indicates the presence of motion_residual[r][s][t] in the bit stream. When motion_residual[r][s][1] is not "1" and motion_code[r][s][1] is not "0," this means that data elements representing the motion_residual[r][s][1] are present in the bit stream and the motion vector has a vertical component. In this case, data elements representing the motion_residual[r][s][1] for a vertical component are described.

Next, the macroblock_type will be described with reference to FIGS. 65 to 67. The macroblock_type is data of a variable length generated by flags such as the macroblock_quant, the dct_type_flag, the macroblock_motion_forward, and the macroblock_motion_backward. The macroblock_quant is a flag indicating whether or not the macroblock_quantiser_scale_code has been set, which sets a quantization step size for a macroblock. The macroblock_quant is "1" if the macroblock_quantiser_scale_code is present in the bit stream.

The dct_type_flag is a flag indicating whether or not the dct_type is present, which indicates whether or not the reference macroblock has been encoded using the frame or field DCT (in other words, this flag indicates whether the reference macroblock has been subjected to the DCT). If the dct_type is present in the bit stream, the dct_type_flag is "1." The macroblock_motion_forward is a flag indicating whether or not the reference macroblock has been forward predicted. This flag is 1 if the reference macroblock has been forward predicted. The macroblock_motion_backward is a flag indicating whether or not the reference macroblock has been backward predicted. This flag is 1 if the reference macroblock has been backward predicted.

With the variable-length format, the history information can be reduced to diminish the bit rate for transmissions.

That is, if the macroblock_type and the motion_vectors( ) are transferred and not the quantiser_scale_code, the bit rate can be lessened by setting the slice_quantiser_scale_code at "00000."

In addition, if only the macroblock_type is transferred and not the motion_vectors( ), the quantiser_scale_code, and the dct_type, the bit rate can be diminished by using "not coded" as the macroblock_type.

Further, if only the picture_coding_type is transferred and not the slice( ) and subsequent information, the bit rate can be reduced by using the picture_data( ) that does not have the slice_start_code.

In the above description, to prevent continuous 23 bits of 0s from appearing in the user_data, "1" is inserted into the data at intervals of 22 bits, but the interval may not be 22 bits. In addition, instead of counting the number of continuous 0s, Byte_allign can be examined for insertion.

Further, although the MPEG prohibits the occurrence of continuous 23 bits of 0s, it actually deals only with continuous 23 bits of 0s starting at the head of the byte and not with such bits starting at the middle of the byte. Thus, "1" may be inserted at positions other than LSBs, for example, at intervals of 24 bits.

Additionally, in the above description, the history information is in a form similar to video elementary streams, but it may be substantially in the form of packetized elementary streams or transport streams. In addition, although the user_data in the elementary stream precedes the picture_data, it may be located somewhere else.

The transcoder 101 described in FIG. 15 provides the subsequent process with encoding parameters for a plurality of generations as history information, but all the above described history information is not required. For example, if this transcoder is followed by a recording and reproducing system including a large-capacity recording medium that is relatively free from limitations on the storage capacity, no problem occurs if all the above described information is described in the encoding parameters. If, however, the transcoder is followed by a recording and reproducing system including a recording medium of a relatively small capacity, only required history information is desirably described in the encoding parameters instead of all the history information, in order to more or less reduce the data rate of encoded streams. By way of another example, if this transcoder is followed by a transmission path including a large-transmission-capacity recording medium that is relatively free from limitations on the transmission capacity, no problem occurs if all the above described information is described in the encoding parameters. If, however, the transcoder is followed by a transmission path having a relatively small transmission capacity, only required history information is desirably described in the encoding parameters instead of all the history information, in order to more or less reduce the data rate of encoded streams.

The present invention is characterized in that history information required for each of various applications following the transcoding device is described in the encoded stream adaptively and selectively depending on the application. To achieve this, this embodiment describes the information re-coding_stream_info in the encoded stream.

A syntax and data elements for the re-coding_stream_info will be described below in detail with reference to FIG. 68.

As shown in FIG. 68, the re_coding_stream_info( ) function is composed of the user_data_start_code, the re_coding_stream_info_ID, the red_bw_flag, the red_bw_indicator, the marker_bit, the num_other_bits, the num_mv_bits, the num_coef_bits, etc.

The user_data_start_code is a start code indicative of the start of the user_data. The re_coding_stream_info_ID is a 16-bit integer used to identify the re_coding_stream_info( ) function. Specifically, this integer has a value of "1001 0001 1110 1100" (0x91ec).

The red_bw_flag is a 1-bit flag that is 0 if the coding parameters for all the history information are transmitted and that is 1 if the coding parameters for the history information are selectively transmitted. Specifically, as shown in FIG. 69, if the red_bw_flag is 1, checking the red_bw_indicator following this flag enables determination of which of five data sets is used to transmit the corresponding coding parameters for the history information. This data set contains information for determining a combination of coding parameters to be transmitted with the re-coded encoded stream. Accordingly, the coding parameters to be described in the encoded stream are selected in accordance with this data set.

The red_bw_indicator is a 2-bit integer acting as an indicator for defining a data set for the coding parameters. Specifically, the red_bw_indicator is data indicating which of data sets 2 to 5 is represented as shown in FIG. 69.

Thus, by referencing the red_bw_flag and the red_bw_indicator, which are described in the encoded stream, it can be determined which of the five data sets is used to transmit the coding parameters for the history information.

Next, the coding parameters for the history information transmitted in each data set will be explained with reference to FIG. 70.

The history information can be roughly classified into information in pictures and information in macroblocks. Information in slices is obtained by collecting macroblock information contained in such information, and information in GOPs is obtained by collecting the information in pictures contained in such information.

Since the information in pictures is transmitted only once per frame, its bit rate is not so high compared to the history information inserted into the encoded stream. On the contrary, since the information in macroblocks is transmitted for each macroblock, if, for example, in a video system with 525 scan lines for one frame and with a field rate of 60 fields/sec., 720×480 pixels are contained in one frame, then the information in macroblocks must be transmitted 1,350 (=(720/16)× (480/16)) times per frame. As a result, a relatively large part of the history information is occupied by the information in macroblocks.

Accordingly, in this embodiment, as the history information inserted into the encoded stream, at least the information in pictures is constantly transmitted but the information in macroblocks is selectively transmitted depending on the application, thereby reducing transmitted information.

As shown in FIG. 70, the information in macroblocks transmitted as the history information includes, for example, the num_coef_bits, the num_mv_bits, the num_other_bits, the q_scale_code, the q_scale_type, the motion_type, the mv_vert_field_sel[ ][ ], the mv[ ][ ][ ], the mb_mfwd, the mb_mbwd, the mb_pattern, the coded_block_pattern, the mb_intra, slice_start, the dct_type, the mb_quant, the skipped_mb, etc. These information is represented by using the element of macroblock_rate_information defined in SMPTE-327M.

The num_coef_bits represents the amount of macroblock codes required for DCT coefficients. The num_mv_bits represents the amount of macroblock codes required for motion vectors. The num_other_bits represents the amount of macroblock codes other than the num_coef_bits and the num_mv_bits.

The q_scale_code represents q_scale_code applied to the macroblock. The motion_type represents the type of the motion vectors applied to the macroblock. The mv_vert_field_sel[ ][ ] represents a field selection for the motion vectors applied to the macroblock.

The mv[ ][ ][ ] represents the motion vectors applied to the macroblock. The mb_mfwd is a flag indicating that the prediction mode for the macroblock is forward prediction. The mb_mbwd is a flag indicating that the prediction mode for the macroblock is backward prediction. The mb_pattern is a flag indicating the presence a non-zero DC coefficient of the macroblock.

The coded_block_pattern is a flag indicating the presence of a non-zero DC coefficient of the macroblock for each DCT block. The mb_intra is a flag indicating whether or not the macroblock is an intra_macro. The slice_start is a flag indicating whether or not the macroblock is the head of a slice. The dct_type is a flag indicating whether or not the macroblock is the field_dct or the flame_dct.

The mb_quant is a flag indicating whether or not the macroblock transmits the quantiser_scale_code. The skipped_mb is a flag indicating whether or not the macroblock is skipped macroblock.

Not all these coding parameters are constantly required, but required coding parameters vary depending on the application following the transcoder. For example, coding parameters such as the num_coef_bits and the slice_start are required for applications that involves a transparent request that requests a bit stream to be recovered to its original form as closely as possible during re-coding. The "transparent request" enables an output bit stream to be generated with its image quality prevented from degradation compared to an input bit stream.

That is, applications that request only a change in bit rate for a transcoding process do not require the coding parameters such as the num_coef_bits and the slice start. In addition, if there are very strict limitations on the transmission path, certain applications require only the encoding type of each picture.

In view of these circumstances, this embodiment provides a data set such as that shown in FIG. 70, as an example of a data set for coding parameters that is used in transmitting history information.

In FIG. 70, the value "2" corresponding to coding parameters in each data set means that the corresponding information is present in the encoded stream and available as the history information, and "0" means that the corresponding information is absent from the encoded stream. "1" means that the corresponding information is present for support for the presence of other information or for the syntax, but has no meaning, for example, no relations with the source bit stream information. For example, the slice_start is "1" for the macroblock at the head of a slice for transmitting history information but has no meaning as history information if the slice does not necessarily maintain the same locational relationship with the original bit stream.

In this embodiment, the coding parameters (num_coef_bits, num_mv_bits, num_other_bits), (q_scale_code, q_scale_type), (motion_type, mv_vert_field_sel[ ][ ], mv[ ][ ][ ]), (mb_mfwd, mb_mbwd), (mb_pattern), (coded_block_pattern), (mb_intra), (slice_start), (dct_type), (mb_quant), and (skipped_mb) are selectively described in the encoded stream depending on the selected data set.

The data set 1 is intended to reconstruct a completely transparent bit stream. The data set 1 enables accurate transcoding that outputs a bit stream with little image quality degradation compared to an input bit stream. The data set 2 is also intended to reconstruct a completely transparent bit stream. The data set 3 cannot reconstruct a completely transparent bit stream but reconstructs a substantially visually transparent bit stream. The data set 4 is inferior to the data set 3 in terms of transparency but enables reconstruction of a bit stream with no visual problem. The data set 5 is inferior to the data set 4 in terms of transparency but can reconstruct a bit stream with a little history information despite the incompleteness of the reconstruction.

These data sets are functionally higher as their data set numbers are smaller, but functionally higher data sets require a larger capacity for transmission of history information. Consequently, the transmitted data set is determined taking into consideration the assumed application and the capacity available for the history information.

Of the five data sets shown in FIG. 70, for the data set 1, the red_bw_flag is 0, while for the data sets 2 to 5, the red_bw_flag is 1. In contrast, the red_bw_indicator is 0 for the data set 2, 1 for the data set 3, 2 for the data set 4, and 3 for the data set 5.

Thus, the red_bw_indicator is specified if the red_bw_flag is 1 (that is, for the data sets 2 to 5).

Furthermore, if the ref_bw_flag is 0 (the data set 1), the marker_bit, the num_other_bits, the num_mv_bits, and the num_coef_bits are described for each macroblock. These four data elements are not described in the encoded stream for the data sets 2 to 5 (that is, if the red_bw_flag is 1).

For the data set 5, the other syntax elements are not transmitted including the picture_data( ) function (see FIG. 59). That is, no encoding parameters are transmitted for a plurality of slice( ) functions contained in the picture_data( ) function. Accordingly, for the data set 5, selected history information is intended to transmit only coding parameters in pictures such as the picture_type.

For the data sets 1 to 4, coding parameters are present for the plurality of slice( ) functions contained in the picture_data( ) function. However, address information for slices determined by the slice( ) function and for slices in the source bit stream depend on the selected data set. For the data set 1 or 2, the address information for the slices in the source bit stream for the history information must be identical to the address information for the slices determined by the slice( ) function.

The syntax elements of the macroblock( ) function (see FIG. 61) depend on the selected data set. The macroblock_escape, macroblock_address_increment, and macroblock_modes( ) functions are constantly present in the encoded stream. The effectiveness of the macroblock_escape and macroblock_address_increment as information, however, is determined by the selected data set. If the data set 1 or 2 is used for the coding parameters for the history information, information identical to the skipped_mb in the source bit stream must be transmitted.

For the data set 4, the motion_vectors( ) function is absent from the encoded stream. For the data sets 1 to 3, the macroblock_type of the macroblock_modes( ) function determines the presence of the motion_vectors( ) function in the encoded stream. For the data set 3 or 4, the coded_block_pattern( ) function is absent from the encoded stream. For the data sets 1 and 2, the macroblock_type of the macroblock_modes( ) function determines the presence of the coded_block_pattern( ) function in the encoded stream.

The syntax elements of the macroblock_modes ( ) function (see FIG. 62) depend on the selected data set. The macroblock_type exists constantly. For the data set 4, the flame_motion_type, the field_motion_type, and the dct_type are absent from the encoded stream.

The effectiveness as information of a parameter obtained from the macroblock_type is determined by the selected data set.

For the data set 1 or 2, the macroblock_quant must be the same as in the source bit stream. For the data set 3 or 4, the macroblock_quant represents the presence of the quantiser_scale_code in the macroblock( ) function and need not be the same as in the source bit stream.

For the data sets 1 to 3, the macroblock_motion_forward must be the same as in the source bit stream. This is not necessary for the data set 4 or 5.

For the data set 1 or 2, the macroblock_pattern must be the same as in the source bit stream. For the data set 3, the macroblock_pattern is used to indicate the presence of the dct_type. The relations for the data sets 1 to 3 are not established for the data set 4.

If the data sets 1 to 3 are used for the coding parameters for the history information, the macroblock_intra must be the same as in the source bit stream. This does not apply to the data set 4.

Next, processing executed by the transcoder 101 on an encoded stream containing information on the data sets and to generate an encoded stream based on the set data sets will be described with reference to the transcoder 101 shown in FIG. 15.

The example of a transcoder shown in FIG. 15 receives an encoded stream ST (3rd) generated by the third-generation encoding process to convert the GOP structure or/and bit rate thereof in order to generate a new encoded stream ST (4th).

First, the decoding device 102 extracts from the third-generation encoded stream St (3rd) third-generation coding parameters used to encode this encoded stream St (3rd), and decodes the encoded stream ST (3rd) based on the extracted coding parameters to generate a baseband video signal. Further, the decoding device 102 outputs the extracted third-generation coding parameters (3th) to the history information-multiplexing device 103. Further, the decoding device 102 extracts the user_data( ) from the picture layer of the third-generation encoded stream ST (3rd) to supply the data to the history decoding device 104.

The history decoding device 104 extracts the history_stream( ) from the user_data( ) supplied by the decoding device 102. Since the history_stream( ) is a stream consisting of variable-length-encoded data elements, the history decoding device 104 carries out a variable-length decoding process on the history_stream( ). As a result, a stream can be generated which consists of data elements each having a predetermined data length. Next, the history decoding device 104 parses a syntax for the variable-length decoded data stream. The parsing refers to interpretation of the syntax for the stream.

During the parsing process, the history decoding device 104 references the red_bw_flag and red_bw_indicator described in the re_coding_stream_info( ) in the history_stream( ) function. By referring the red_bw_flag and red_bw_indicator extracted from the stream, the history decoding device 104 determines which of the five data sets are set for the received history_stream( ). Thus, by determining the type of the data set from the red_bw_flag and the red_bw_indicator, the history decoding device 104 can determine which coding parameters are contained in the history_stream( ).

Specifically, if the red_bw_flag=0, the data set 1 is set. Thus, all the coding parameters are described in the history_stream( ) as the picture_data( ) function, including the num_coef_bits, the num_mv_bits, the num_other_bits, the q_scale_code, the q_scale_type, the motion_type, the mv_vert_field_sel[ ][ ], the mv[ ][ ][ ], the mb_mfwd, the mb_mbwd, mb_pattern, the coded_block_pattern, mb_intra, the slice_start, the dct_type, the mb_quant, and the skipped_mb.

If the red_bw_flag=1 and the red_bw_indicator=0, the data set 2 is set. Accordingly, coding parameters are described in the history_stream( ) as the picture_data( ) function, including the q_scale_code, the q_scale_type, the motion_type, the mv_vert_field_sel[ ][ ], the mv[ ][ ][ ], the mb_mfwd, the mb_mbwd, the mb_pattern, the coded_block_pattern, the mb_intra, the slice_start, the dct_type, the mb_quant, and the skipped_mb.

If the red_bw_flag=1 and the red_bw_indicator=1, the data set 3 is set. Accordingly, coding parameters are described in the history_stream( ) as the picture_data( ) function, including the q_scale_code, the q_scale_type, the motion_type, the mv_vert_field_sel[ ][ ], the mv[ ][ ][ ], the mb_mfwd, the mb_mbwd, the mb_pattern, the mb_intra, the slice_start, the dct_type, the mb_quant, and the skipped_mb.

If the red_bw_flag=1 and the red_bw_indicator=2, the data set 4 is set. Accordingly, coding parameters including the q_scale_code and the q_scale_type are described in the history_stream( ) as the picture_data( ) function.

If the red_bw_flag=1 and the red_bw_indicator=3, the data set 5 is set. Accordingly, no coding parameter is described in the history_stream( ) as the picture_data( ) function.

The history decoding device 104 references the information in the red_bw_flag and red_bw_indicator to extract the coding parameters from the history_stream( ). In the embodiment of the transcoder shown in FIG. 15, the input encoded stream supplied to the history decoding device 104 transcoder has been generated by the third-generation encoding process, so that output history information is the first- and second-generation coding parameters.

The history information-multiplexing device 103 multiplexes the third-generation coding parameters (3th) supplied by the decoding device 102 and the past coding parameters (1st, 2nd) supplied by the history decoding device 104, into the baseband video data supplied by the decoding device 102, in accordance with such a format as shown in FIGS. 68 to 73.

The history information-separating device 105 receives the baseband video data supplied by the history information-multiplexing device 103 and extracts the first-, second-, and third-generation coding parameters (1st, 2nd, 3rd) from the baseband video data to supply them to the encoding device 106.

The encoding device 106 receives the baseband video data and the coding parameters (1st, 2nd, 3rd) from the history information-separating device 105 to re-code the baseband video data based on the received coding parameters. In this case, the encoding device 106 selects coding parameters optimal for the encoding process, from the coding parameters (1st, 2nd, 3rd) generated during the past encoding processes and the coding parameters newly generated from the supplied baseband video data. The encoding device 106 carries out the above described "normal encoding process" if it uses for the encoding the coding parameters newly generated from the supplied baseband video data. The encoding device 106 carries out the above described "parameter-reused encoding process" if it uses any of the past coding parameters (1st, 2nd, 3rd).

The computer 100 provided on the network controls the decoding process executed by the decoding device 102 and the encoding process executed by the encoding device 106. For example, the computer 100 detects the capacity of the transmission path for transmitting an encoded stream output by the encoding device 106 and selects an appropriate one of the five data sets depending on the transmission capacity. It also detects the storage capacity of a device connected to an output of the encoding device 106 and selects an appropriate one of the five data sets depending on the storage capacity.

The encoding device 106 receives information indicative of the data set from the computer 100 to generate the red_bw_flg and the red_bw_indicator based on this information. If the information provided by the computer 100 indicates the data set 1, the red_bw_flag=0. If the information indicates the data set 2, the red_bw_flag=1 and the red_bw_indicator=0. If the information indicates the data set 3, the red_bw_flag=1 and the red_bw_indicator=1. If the information indicates the data set 4, the red_bw_flag=1 and the red_bw_indicator=2. If the information indicates the data set 5, the red_bw_flag=1 and the red_bw_indicator=3.

Depending on the determined values of the red_bw_flag and the red_bw_indicator, the encoding device 106 selects coding parameters for description in the encoded stream as the history_stream( ), and describes the selected coding parameters in the encoded stream as the history_stream( ), while describing the red_bw_flag and the red_bw_indicator in the encoded stream as the re_coding_stream_info( ). The coding parameters transmitted as the history_stream( ) are selected for each of the first, second, and third generations of coding parameters.

If the red_bw_flag=0, then, the encoding device 106 describes all the coding parameters in the encoded stream as the picture_data( ) function, including the num_coef_bits, the num_mv_bits, the num_other_bits, the q_scale_code, the q_scale_type, the motion_type, the mv_vert_field_sel[ ][ ], the mv[ ][ ][ ], the mb_mfwd, the mb_mbwd, mb_pattern, the coded_block_pattern, mb_intra, the slice_start, the dct_type, the mb_quant, and the skipped_mb.

If the red_bw_flag=1 and the red_bw_indicator=0, the encoding device 106 describes coding parameter in the history_stream( ) as the picture_data( ) function, including the q_scale_code, the q_scale_type, the motion_type, the mv_vert_field_sel[ ][ ], the mv[ ][ ][ ], the mb_mfwd, mb_mbwd, the mb_pattern, the coded_block_pattern, the mb_intra, the slice_start, the dct_type, the mb_quant, and the skipped_mb.

If the red_bw_flag=1 and the red_bw_indicator=1, the encoding device 106 describes coding parameters in the history_stream( ) as the picture_data( ) function, including the q_scale_code, the q_scale_type, the motion_type, the mv_vert_field_sel[ ][ ], the mv[ ][ ][ ], the mb_mfwd, the mb_mbwd, the mb_pattern, the mb_intra, the slice_start, the dct_type, the mb_quant, and the skipped_mb.

If the red_bw_flag=1 and the red_bw_indicator=2, the encoding device 106 describes coding parameters including the q_scale_code and the q_scale_type, in the history_stream( ) as the picture_data( ) function.

If the red_bw_flag=1 and the red_bw_indicator=3, the encoder 106 describes no coding parameter in the history_stream( ) as the picture_data( ) function.

That is, the encoding device 106 selects from the coding parameters transmitted as the history_stream ( ) based on the information indicating data set specified by the computer 100, instead of transmitting all the supplied past coding parameters as the history_stream( ). Thus, based on the received information indicating the data set, the encoding device 105 can generate an encoded stream containing history_stream( ) with various data capacities. In addition, the encoding device 105 can generate an encoded stream containing history_stream( ) consisting of an amount of data appropriate for the transmission capacity of a transmission media following the encoding device 105, for the storage capacity of a recording media, or for the application. According to the transcoder of this embodiment, the coding parameters transmitted as the history_stream( ) in this way are selected in accordance with an application connectively following the encoding device. Therefore, the history corresponding to the application can be transmitted in an optimal data amount.

Next, a format in which the history information is multiplexed into the baseband video signal output by the history information-multiplexing device 103 will be described with reference to FIGS. 71 to 74.

FIG. 71 is a diagram showing the format "Re_Coding information Bus macroblock format," in which the history information is multiplexed into the baseband video signal for transmission. This mask block is configured by 16×16 (=256) bits. In FIG. 71, the 32 bits shown in each of the third and fourth rows from the top are picrate_element. Picture rate elements, shown in FIG. 72 to 74, are described in the picrate_element. The 1-bit red_bw_flag is specified in the second row from the top in FIG. 72, and the 3-bit red_bw_indicator is specified in the third row from the top. That is, the flags red_bw_flag and red_bw_indicator are transmitted as the picrate_element in FIG. 71.

The other data in FIG. 71 will be explained below. SRIB_sync_code is a code representing that the first row of a macroblock in this format is aligned at the left end of the stream. Specifically, this code is set at "11111." If the picture_structure indicates the frame picture structure (that is, its value is "11"), fr_fl_SRIB is set to 1, indicating that more than 16 lines of Re_Coding Information Bus macroblock are transmitted. If the picture_structure doe not indicate the frame structure, the fr_fl_SRIB is set to 0, indicating that more than 16 lines of Re_Coding Information Bus are transmitted. This mechanism allows the Re_Coding Information Bus to be locked to corresponding pixels in a spatially and temporally decoded video frame or field.

SRIB_top_field first is set at the same value as top_field_first held in the source bit stream and represents, with repeat_first_field, the temporal alignment of the Re_Coding Information Bus for a related video. SRIB_repeat_field_first is set at the same value as repeat_first_field held in the source bit stream. The contents of the Re_Coding Information Bus for a first field must be repeated as indicated by this flag.

422_420_chroma represents whether the source bit stream is of 4:2:2 or 4:2:0. The 422_420_chroma of 0 represents that the bit stream is of 4:2:0 and that a chromatic aberration signal has been up-sampled so as to output a 4:2:2 video. The 422_420_chroma of 0 represents that the chromatic aberration signal has not been filtered.

rolling_SRIB_mb_ref represents a 16-bit modulo 65521, the value of which is incremented consistently with the number of macroblocks. This value must be continuous across frames of the frame picture structure. Otherwise, it must be continuous across fields. It is initialized to a predetermined value between 0 and 65520. This allows a unique identifier of the Re_Coding Information Bus to be incorporated in a recorder system.

The meaning of the other data for the Re_Coding Information Bus macroblock is as described above and is thus omitted.

As shown in FIG. 75, the 256-bit data for the Re_Coding Information Bus in FIG. 71 is arranged, by one bit at a time, in Cb[0][0], Cr[0][0], Cb[1][0], and Cr[1][0], which are LSBs of chromatic aberration data. Since the format shown in FIG. 75 allows 4-bit data to be sent, the 256-bit data in FIG. 71 can be transmitted by sending the format in FIG. 75 sixty-four times (=256/4).

According to the transcoder of the present invention, the coding parameters generated during the past encoding processes are reused for the current encoding process, thereby precluding image quality degradation despite repetition of the decoding and encoding processes. That is, the present invention can restrain the accumulation of image quality degradation originating from repetition of the decoding and encoding processes.

Figure 76:
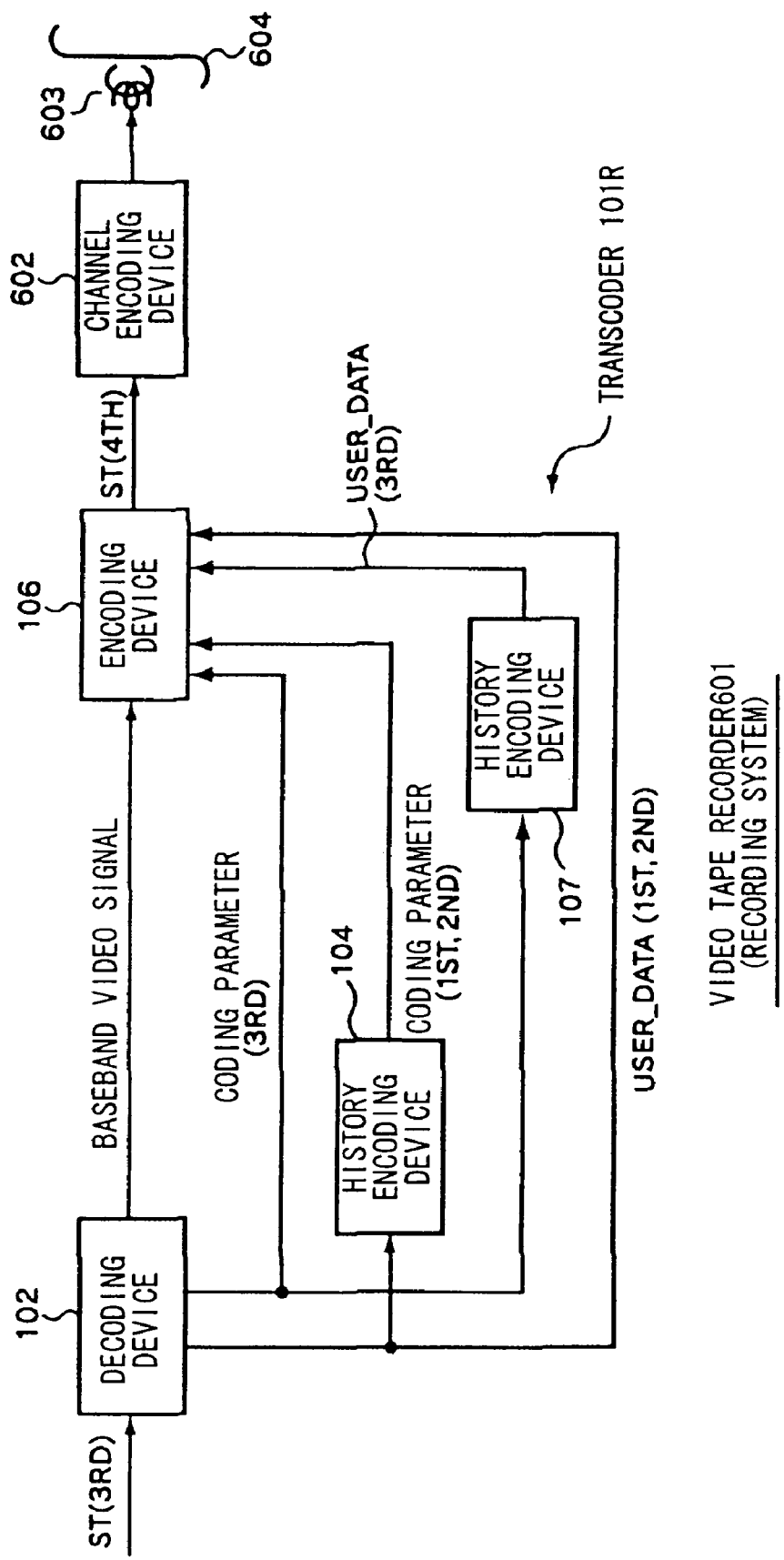
FIG. 76 is a block diagram representing an example of the configuration of a video tape recorder recording system.
Figure 77:
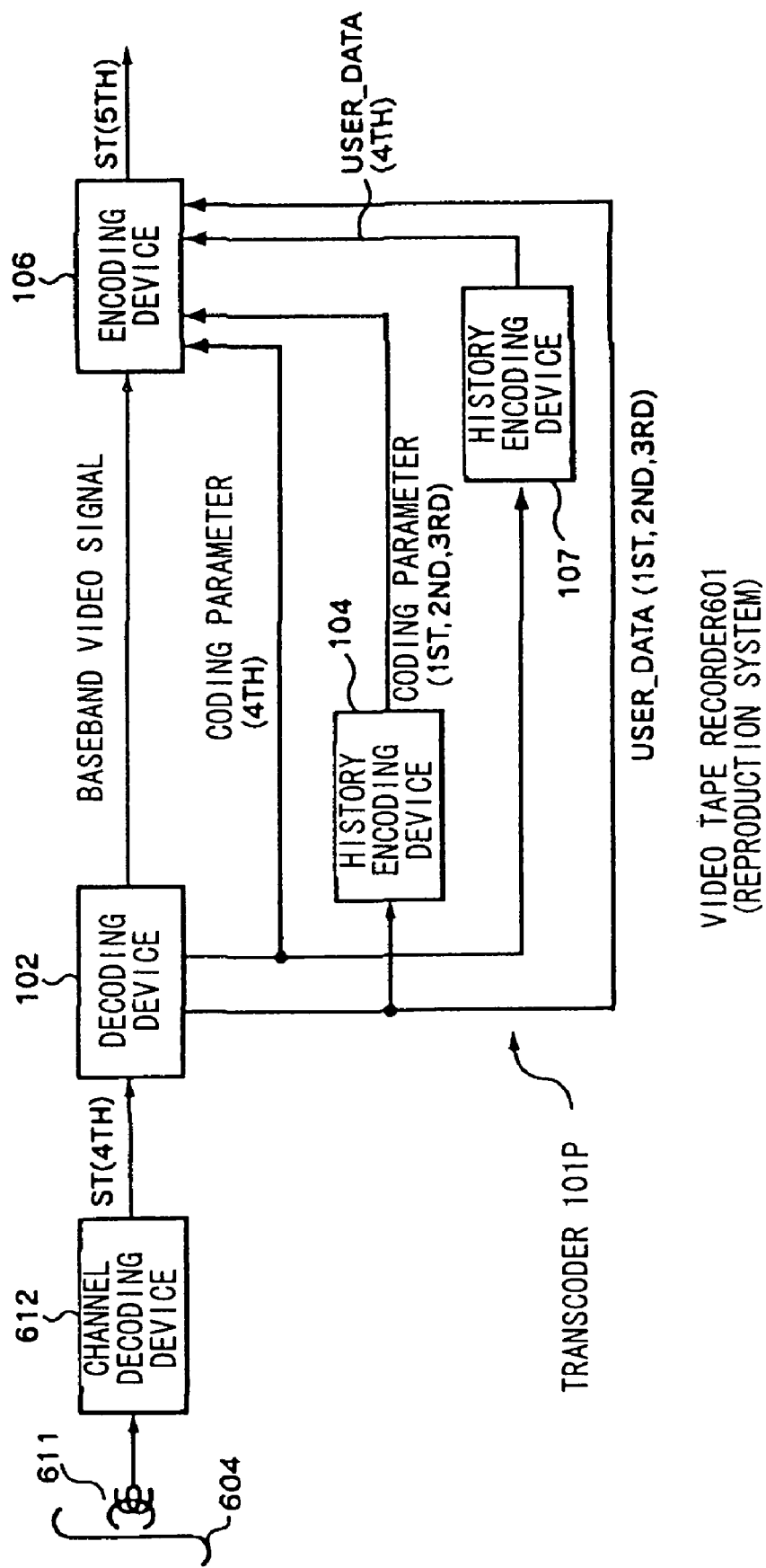
FIG. 77 is a block diagram representing an example of the configuration of a video tape recorder reproducing system.

FIGS. 76 and 77 show examples of configurations of a video tape recorder with the transcoder of the present invention applied thereto. FIG. 76 shows an example of a configuration of a recording system of a video tape recorder 601. FIG.

77 shows an example of a configuration of a reproduction system of the video tape recorder 601.

The video tape recorder 601 in FIG. 76 is configured by a transcoder 101R, a channel encoding device 602, and a recording head 603. The transcoder 101R is configured basically in the same manner as the transcoder shown in FIG. 37. In this example of configuration, the transcoder 101R converts a bit stream ST of a Long GOP into one of a Short GOP.

A fourth-generation encoded stream ST output from the encoding device 106 of the transcoder 101R is supplied to the channel encoding device 602. As described above, the user_data containing the first- to third-generation coding parameters is recorded in the user data area of the picture layer of the fourth-generation encoded stream ST.

The channel encoding device 602 appends a parity code for error correction to the input fourth-generation encoded stream subsequently carries out channel encoding using, for example, the NRZI modulation method, and then supplies the encoded stream to a recording head 603. The recording head 603 records the input encoded stream on a magnetic tape 604.

As shown in FIG. 77, in the reproduction system, a reproduction head 611 generates a signal from the magnetic tape 604 to supply it to a channel decoding device 612. The channel decoding device 612 channel-decodes the signal supplied by the reproduction head 611 and then corrects errors therein using the parity.

The fourth-generation encoded stream ST output by the channel decoding device 612 is input to a transcoder 101P. The transcoder 101P has a basic configuration similar to that of the transcoder shown in FIG. 37.

The decoding device 102 of the transcoder 101P extracts from the fourth-generation encoded stream the user data user_ data containing the first- to third-generation coding parameters, and supplies the data to the history encoding device 104 and the encoding device 106. The history decoding device 104 decodes the input user data user_data to deliver the obtained first- to third-generation coding parameters to the encoding device 106.

The decoding device 102 also decodes the fourth-generation encoded stream ST to output the baseband video signal and the fourth-generation coding parameters. The baseband video signal is supplied to the encoding device 106, while the fourth-generation coding parameters are delivered to the encoding device 106 and the history encoding device 107.

The history encoding device 107 converts the input fourth-generation coding parameters into the user data user_data to supply the data to the encoding device 106.

As described above, the controller 70 for the encoding device 106 determines whether or not the picture type of each picture determined from the GOP structure specified by the operator is the same as the picture type contained in the history information (user data user_data). Depending on a result of the determination, the encoding device 106 carries out the above described "normal encoding process" or "parameter-reused encoding process." After this process, the encoding device 106 outputs the fourth-generation encoded stream ST with the Long GOP into which the Short GOP has been converted. The user data user_data in the encoded stream ST has the first- to fourth-generation coding parameters recorded therein as history information.

Figure 78:
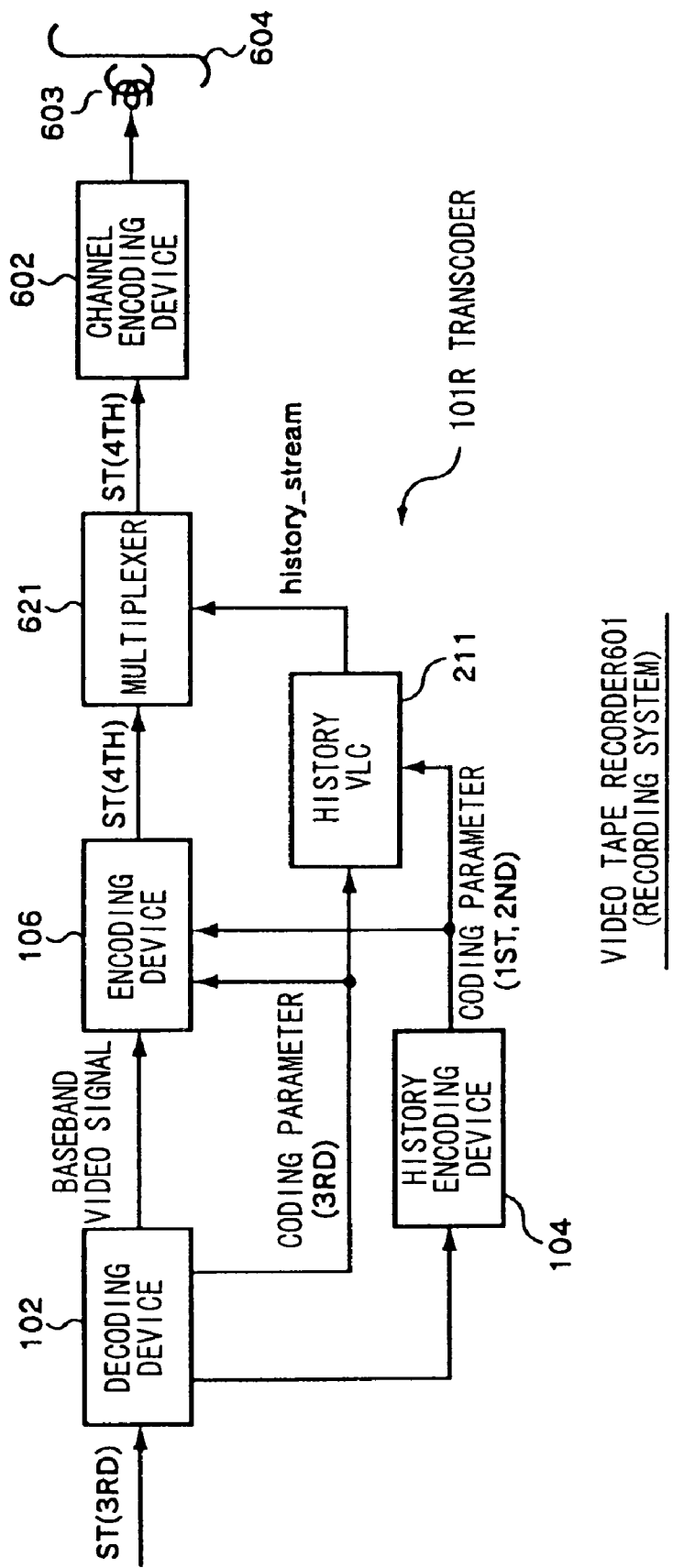
FIG. 78 is a block diagram representing another example of the configuration of the video tape recorder recording system.
Figure 79:
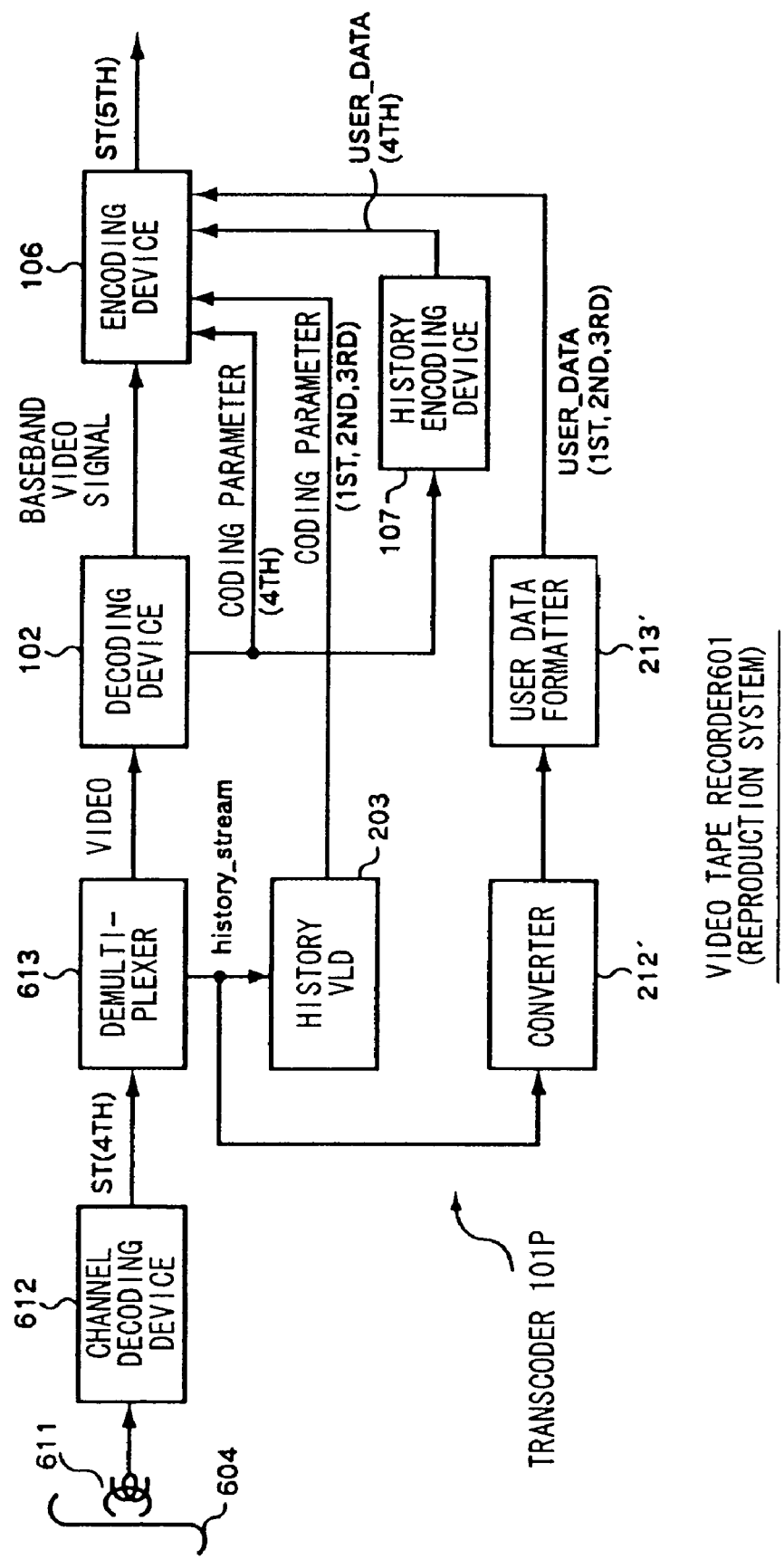
FIG. 79 is a block diagram representing an example of the configuration of the video tape recorder reproducing system.

Although the video tape recorder 601 shown in FIGS. 76 and 77 records the history information in the user_data of the picture layer, the history information can be recorded in an area of the magnetic tape 604 which is different from an area for video data. FIGS. 78 and 79 show examples of configurations of the video tape recorder 601 in this case. FIG. 78 shows an example of a configuration of a recording system of the video tape recorder 601. FIG. 79 shows an example of a configuration of a reproduction system of the video tape recorder 601.

As shown in FIG. 78, in the video tape recorder 601, user data user_data output by the decoding device 102 of the transcoder 101R is input to the history decoding device 104, which then decodes past coding parameters (in this example, the first- and second-generation coding parameters) for supply to the encoding device 106. In addition, this example need not record history information on the magnetic tape 604 as user data user_data and thus employs only the history VLC 211 instead of the entire history encoding device 107 shown in FIG. 15. The history VLC 211 is supplied with coding parameters (in this case, third-generation coding parameters) output by the decoding device 102 and with the coding parameters (in this case, the first- and second-generation coding parameters) output after being decoded from the user data user_data by the history decoding device 104. The history VLC 211 variable-length encodes the first- to third-generation coding parameters to generate the history_stream shown in FIGS. 40 to 46 or 47 for supply to a multiplexer 621.

The multiplexer 621 also receives a fourth-generation encoded stream ST output by the encoding device 106. The multiplexer 621 multiplexes the encoded stream (bit stream) supplied by the encoding device 106 into an area that is safer than an area in which the history supplied by the history VLC 211 is recorded.

Figure 80:
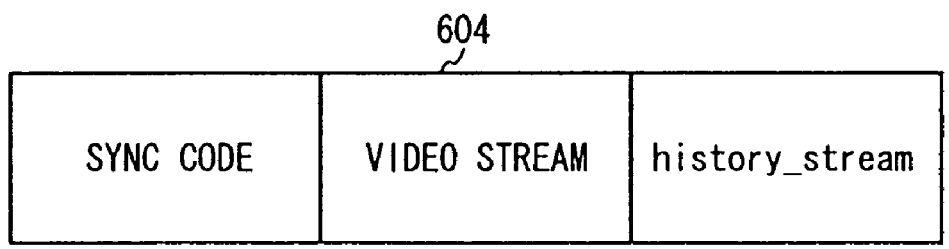
FIG. 80 is a diagram for describing the recording positions of a video stream and history_stream.

For example, as shown in FIG. 80, the video stream output by the encoding device 106 is recorded on the magnetic tape 604 near a sync code, while the history_stream output by the history VLC 211 is recorded more remotely from the sync code than the video stream. When the video stream is retrieved during, for example, special reproduction, the sync code is first detected and the subsequent video stream is retrieved using the sync code as a reference. Consequently, by locating the video stream closer to the sync code, the vide data can be reliably reproduced even during fast reproduction. The history_stream is not required for fast reproduction. Thus, adverse effects are avoided even when the history_stream is located away from the sync code.

The signal multiplied by the multiplexer 621 is input to the channel encoding device 602. After channel encoding, the recording head 603 records the signal on the magnetic tape 604.

In this manner, this example multiplexes the history_stream in the position different from that for the video data. Consequently, even if the start code appears at that position, it can be sufficiently distinguished from the video data. As a result, this example does not require insertion of the marker bit as required for conversion of the history_stream into the converted_history_stream.

In addition, the coding parameters can be supplied to the multiplexer 621 for multiplexing instead of being converted into the format of the history_stream. In this case, however, the data is not compressed, thereby increasing the amount of data for the coding parameters to reduce the operational efficiency of the magnetic tape 604. Thus, the history VLC 211 is desirably used to compress the data into the format of the history_stream before multiplexing.

As shown in FIG. 79, in the reproduction system of the video tape recorder 601, the signal reproduced from the magnetic tape 604 by the recording head 611 is channel-decoded by the channel decoding device 612. A demultiplexer 631 is channel-decoded by the channel decoding device 612. The demultiplexer 631 separates the fourth-generation encoded stream ST supplied by the channel decoding device 612, into the video stream and the history_stream, and supplies the video stream to the decoding device 102, while delivering the history_stream to the history VLD 203.

That is, this example employs only the history VLD 203 instead of the entire history decoding device 104 shown in FIG. 15.

The history VLD 203 variable-length decodes the history_stream to output the obtained first- to third-generation coding parameters to the encoding device 106.

In addition, the history_stream output by the demultiplexer 631 is input to a converter 212'. The converter 212' and a following user data formatter 213' are separate from the converter 212 and user data formatter 213 (see FIG. 15) built into the history encoding device 107 but provide the same functions.

That is, the converter 212' adds the marker bit to the history stream input by the demultiplexer 631 to generate the converted_history_stream and outputs it to the user data formatter 213'. The user data formatter 213' converts the input converted_history_stream into the user_data to output the data to encoding device 106. The user_data contains the first- to third-generation coding parameters.

The decoding device 102 decodes the video stream input by the demultiplexer 631 to output the baseband video signal to the encoding device 106. The decoding device 102 also supplies the fourth-generation coding parameters to the encoding device 106, while outputting them to the history encoding device 107. The history encoding device 107 generates the user_data from the input fourth-generation coding parameters to output the data to the encoding device 106.

Similarly to the encoding device 106 in FIG. 77, the encoding device 106 executes the "normal encoding process" or the "parameter-reused encoding process" to output a fifth-generation encoded stream ST. This fifth-generation encoded stream ST has the first- to fourth-generation coding parameters recorded in the user_data of the picture layer thereof.

As appreciated from the above description, according to the transcoder of the present invention, the coding parameters generated during the past encoding processes are described in the user data area of the encoded stream generated during the current encoding process, and the generated bit stream is an encoded stream conformable to the MPEG standard. Consequently, any current decoder can be used for the decoding process. Further, the transcoder according to the present invention requires no dedicated line or the like for transmitting the coding parameters for the past encoding processes, whereby conventional data stream transmission environments can be directly used to transmit the past coding parameters.

According to the transcoder of this embodiment, the coding parameters generated during the past encoding processes are selectively described in the encoded stream generated during the current encoding process. As a result, the past coding parameters can be transmitted without the need to extremely increase the bit rate of the output bit stream.

According to the transcoder of this embodiment, coding parameters optimal for the current encoding process are selected from the past and current coding parameters for encoding. Consequently, the accumulation of image quality is avoided despite repetition of the decoding and encoding processes.

According to the transcoder of this embodiment, coding parameters optimal for the current encoding process are selected from among the past coding parameters in accordance with the picture type for encoding. Consequently, levels of deterioration in image quality are prevented from worsening despite repetition of the decoding and encoding processes.

The transcoder according to this embodiment also determines whether or not to reuse the past coding parameters based on the picture types contained in the past coding parameters, thereby enabling an optimal encoding process.

Computer programs for the above processes can be provided by recording them on a recording medium such as a magnetic disc, an optical disc, a photo-electro-magnetic disc, or a semiconductor memory, or transmitting them via a network such as the Internet, an ATM, or a digital satellite so that they can be recorded on a user's recording medium.

Additionally, according to the transcoder of this embodiment, the information for the data set representing a combination of coding parameters for the past encoding processes is described in the encoded stream re-coded by the transcoder. This configuration can generate stream containing history information that can be transmitted via a transmission path of a small capacity.

According to the transcoder of this embodiment, the plurality of coding parameters used for the past encoding processes are selectively combined to generate encoding history information, which is then superposed on the encoded stream. As a result, a stream capable of restraining image degradation stemming from re-coding can be transmitted via a small-capacity medium.

According to the transcoder of this embodiment, coding parameters are extracted based on the information indicating a data set to generate the re-coded encoded stream based on the extracted coding parameters. Consequently, a stream capable of restraining image degradation stemming from re-coding and of being transmitted to a transmission medium with small transmission capacity can be encoded.

The transcoder according to this embodiment records the detected encoding history of the past encoding processes on the recording medium, thereby restraining image quality degradation even if the encoded stream is recorded on the recording medium.

The transcoder according to this embodiment detects the encoding history contained in the encoded stream reproduced from the recording medium to multiplex the history with the re-coded encoded stream for output, thereby restraining image quality degradation even if the encoded stream reproduced from the recording medium is transcoded again.

INDUSTRIAL APPLICABILITY

The present invention relates to a coding system and method, an encoding device and method, a decoding device and method, a recording device and method, and reproducting device and method, and is particularly applicable to a transcoder for re-coding an encoded stream that have been encoded pursuant to the MPEG standard in order to generate an re-coded stream having a different GOP (Group of Pictures) or bit rate.

EXPLANATION OF REFERENCE NUMERALS 1, 106 . . . Encoding device, 2, 102 . . . Decoding device, 3 . . . Recording medium, 14, 33 . . . Frame memory, 17, 32 . . . Format converting circuit, 18, . . . Encoder, 19 . . . Recording circuit, 30 . . . Reproduction circuit, 31 . . . Decoder, 50 . . . Motion vector-detecting circuit, 57 . . . Quantization circuit, 58 . . . Variable-length encoding circuit, 59 . . . Transmit buffer, 64, 87 . . . Motion compensating circuit, 70 . . . Controller, 81 . . . Reception buffer, 82 . . . Variable-length decoding circuit, 83 . . . Quantization circuit, 84 . . . IDCT circuit, 100 . . . Computer, 101 . . . Transcoder, 103 . . . History information-multiplexing device, 104 . . .

History decoding device, 105 ... History information-separating device, 107 ... History encoding device, 201 ... User data decoder, 202, 212 ... Converter, 203 ... History VLC.

The invention claimed is:

1. A decoding apparatus for decoding an encoded stream, comprising:
   receiving means for receiving the encoded stream and past encoding parameters from a plurality of generations of past encoding/decoding processes for the encoded stream, and for receiving current encoding parameters utilized to produce the encoded stream, said receiving means further receiving selection information indicating a combination selected from the past encoding parameters and the current encoding parameters;
   decoding means for decoding the received encoded stream by utilizing the received current encoding parameters to produce image data; and
   outputting means for outputting the past encoding parameters and the current encoding parameters together with the image data so that, when a re-encoding process is to be performed on the image data, the received past encoding parameters and current encoding parameters indicated by said selection information are used as the encoding parameters in the re-encoding process.

2. The decoding apparatus according to claim 1, wherein said outputting means multiplexes the past encoding parameters, the current encoding parameters and the selection information into the image data produced by said decoding means.

3. The decoding apparatus according to claim 1, wherein the past encoding parameters, the current encoding parameters and the selection information are described in the encoded stream, and
   said receiving means acquires from the received encoded stream the past encoding parameters, the current encoding parameters and the selection information.

4. The decoding apparatus according to claim 3, wherein the past encoding parameters and the current encoding parameters are described in different areas of the encoded stream.

5. The decoding apparatus according to claim 1, wherein the encoded stream is encoded in accordance with an MPEG standard which has a sequence layer, a GOP layer, a picture layer, a slice layer, and a macro block layer.

6. The decoding apparatus according to claim 1, wherein the encoded stream comprises pictures encoded as I pictures.

7. The decoding apparatus according to claim 1, wherein the past encoding parameters are encoding parameters utilized a limited number of times in the past encoding process or decoding process for the encoded stream.

8. The decoding apparatus according to claim 1, wherein the past encoding parameters are encoding parameters utilized four times in the past encoding process or decoding process for the encoded stream.

9. A method for decoding an encoded stream, comprising the steps of:
   receiving the encoded stream, past encoding parameters from a plurality of generations of past encoding/decoding processes for the encoded stream, and current encoding parameters utilized to produce the encoded stream, receiving selection information indicating a combination selected from the past encoding parameters and the current encoding parameters;
   decoding the received encoded stream by utilizing the received current encoding parameters to produce image data; and
   outputting the past encoding parameters and the current encoding parameters together with the image data so that, when a re-encoding process is to be performed on the image data, the received past encoding parameters and current encoding parameters indicated by said selection information are used as the encoding parameters in the re-encoding process.

10. A decoding apparatus for decoding an encoded stream, comprising:
    a receiver for receiving the encoded stream and past encoding parameters from a plural of generations of past encoding/decoding processes for the encoded stream, and for receiving current encoding parameters utilized to produce the encoded stream, said receiver further receiving selection information indicating a combination selected from the past encoding parameters and the current encoding parameters;
    a decoder for decoding the received encoded stream by utilizing the received current encoding parameters to produce image data; and
    an output for outputting the past encoding parameters and the current encoding parameters together with the image data so that, when a re-encoding process is to be performed on the image data, the received past encoding parameters and current encoding parameters indicated by said selection information are used as the encoding parameters in the re-encoding process.

11. A decoding apparatus for decoding an encoded stream, comprising:
    receiving means for receiving, when a decoding process is to be performed for an encoded stream to produce image data, past encoding parameters from a plurality of generations of past encoding/decoding processes for the encoded stream, and for receiving current encoding parameters utilized to produce the encoded stream, said receiving means further receiving selection information indicating a combination selected from the past encoding parameters and the current encoding parameters; and
    transmission means for transmitting the past encoding parameters and the current encoding parameters together with image data so that, when a re-encoding process is to be performed on the image data produced by decoding means included in said receiving means, the received past encoding parameters and current encoding parameters are selected according to the received selection information as utilization encoding parameters to be utilized in the re-encoding process.

12. A decoding method for decoding an encoded stream, comprising the steps of:
    receiving, when a decoding process is to be performed to produce image data from an encoded stream, past encoding parameters from a plurality of generations of past encoding/decoding processes for the encoded stream, current encoding parameters utilized to produce the encoded stream, and selection information indicating a combination selected from the past encoding parameters and the current encoding parameters; and
    transmitting the past encoding parameters and the current encoding parameters together with image data so that, when a re-encoding process is to be performed on the decoded image data, the received past encoding parameters and current encoding parameters are selected according to the received selection information as utilization encoding parameters to be utilized in the re-encoding process.

13. A decoding apparatus for decoding an encoded stream, comprising:

a receiver for receiving, when a decoding process is to be performed for an encoded stream to produce image data, past encoding parameters from a plurality of generations of past encoding/decoding processes for the encoded stream, and current encoding parameters utilized to produce the encoded stream, said receiver further receiving selection information indicating a combination selected from the past encoding parameters and the current encoding parameters; and a transmitter for transmitting the past encoding parameters and the current encoding parameters together with image data so that, when a re-encoding process is to be performed on the image data produced by a decoder included in said receiver, the received past encoding parameters and current encoding parameters are selected according to the received selection information as utilization encoding parameters to be utilized in the re-encoding process.

* * * * *